United States Patent
Gao et al.

(10) Patent No.: US 9,855,549 B2
(45) Date of Patent: Jan. 2, 2018

(54) METAL OXIDE NANOROD ARRAYS ON MONOLITHIC SUBSTRATES

(71) Applicant: University of Connecticut, Farmington, CT (US)

(72) Inventors: Pu-Xian Gao, Coventry, CT (US); Yanbing Guo, Vernon Rockville, CT (US); Zheng Ren, Willimantic, CT (US)

(73) Assignee: UNIVERSITY OF CONNECTICUT, Farmington, CT (US)

( * ) Notice: Subject to any disclaimer, the term of this patent is extended or adjusted under 35 U.S.C. 154(b) by 0 days.

(21) Appl. No.: 14/347,850

(22) PCT Filed: Sep. 28, 2012

(86) PCT No.: PCT/US2012/057974
§ 371 (c)(1),
(2) Date: Mar. 27, 2014

(87) PCT Pub. No.: WO2013/049606
PCT Pub. Date: Apr. 4, 2013

(65) Prior Publication Data
US 2014/0256534 A1   Sep. 11, 2014

Related U.S. Application Data
(60) Provisional application No. 61/540,221, filed on Sep. 28, 2011.

(51) Int. Cl.
*B01J 23/83* (2006.01)
*B01J 37/02* (2006.01)
(Continued)

(52) U.S. Cl.
CPC .......... *B01J 23/83* (2013.01); *B01D 53/944* (2013.01); *B01J 21/063* (2013.01); *B01J 23/002* (2013.01);
(Continued)

(58) Field of Classification Search
CPC . B01J 23/83; B01J 23/464; B01J 23/42; B01J 23/66; B01J 23/44; B01J 23/462;
(Continued)

(56) References Cited

U.S. PATENT DOCUMENTS

| 4,795,616 A | 1/1989 | Mondt et al. |
| 7,115,305 B2 | 10/2006 | Bronikowski et al. |

(Continued)

FOREIGN PATENT DOCUMENTS

| CN | 101456580 B | 1/2009 |
| CN | 102417201 B | 6/2014 |

(Continued)

OTHER PUBLICATIONS

Wang et al., "Compacted nanoscale sensors by merging ZnO nanorods with interdigitated electrodes," Proc. SPIE 8031, Micro- and Nanotechnology Sensors, Systems, and Applications III, 80312J (May 13, 2011).*

(Continued)

*Primary Examiner* — Anthony J Zimmer
(74) *Attorney, Agent, or Firm* — Hamilton, Brook, Smith & Reynolds, P.C.

(57) ABSTRACT

A metal oxide nanorod array structure according to embodiments disclosed herein includes a monolithic substrate having a surface and multiple channels, an interface layer bonded to the surface of the substrate, and a metal oxide nanorod array coupled to the substrate surface via the interface layer. The metal oxide can include ceria, zinc oxide, tin oxide, alumina, zirconia, cobalt oxide, and gallium (Continued)

oxide. The substrate can include a glass substrate, a plastic substrate, a silicon substrate, a ceramic monolith, and a stainless steel monolith. The ceramic can include cordierite, alumina, tin oxide, and titania. The nanorod array structure can include a perovskite shell, such as a lanthanum-based transition metal oxide, or a metal oxide shell, such as ceria, zinc oxide, tin oxide, alumina, zirconia, cobalt oxide, and gallium oxide, or a coating of metal particles, such as platinum, gold, palladium, rhodium, and ruthenium, over each metal oxide nanorod. Structures can be bonded to the surface of a substrate and resist erosion if exposed to high velocity flow rates.

18 Claims, 68 Drawing Sheets

(51) Int. Cl.

| | | |
|---|---|---|
| B01J 37/03 | (2006.01) | |
| B01J 21/06 | (2006.01) | |
| B01J 23/00 | (2006.01) | |
| B01J 23/60 | (2006.01) | |
| B01J 23/63 | (2006.01) | |
| B01J 23/89 | (2006.01) | |
| B01J 35/00 | (2006.01) | |
| B01J 35/04 | (2006.01) | |
| B01J 35/10 | (2006.01) | |
| B01D 53/94 | (2006.01) | |
| B01J 23/34 | (2006.01) | |
| B01J 23/42 | (2006.01) | |
| B01J 23/44 | (2006.01) | |
| B01J 23/46 | (2006.01) | |
| B01J 23/66 | (2006.01) | |

(52) U.S. Cl.
CPC .............. *B01J 23/34* (2013.01); *B01J 23/42* (2013.01); *B01J 23/44* (2013.01); *B01J 23/462* (2013.01); *B01J 23/464* (2013.01); *B01J 23/60* (2013.01); *B01J 23/63* (2013.01); *B01J 23/66* (2013.01); *B01J 23/8913* (2013.01); *B01J 35/002* (2013.01); *B01J 35/006* (2013.01); *B01J 35/0013* (2013.01); *B01J 35/04* (2013.01); *B01J 35/1009* (2013.01); *B01J 37/0244* (2013.01); *B01J 37/031* (2013.01); *B01J 37/038* (2013.01); *B01D 2255/10* (2013.01); *B01D 2255/1021* (2013.01); *Y10T 428/24612* (2015.01)

(58) Field of Classification Search
CPC . B01J 23/34; B01J 23/63; B01J 23/002; B01J 23/60; B01J 23/8913; B01J 37/0244; B01J 37/031; B01J 37/038; B01J 35/002; B01J 35/0013; B01J 35/006; B01J 35/1009; B01J 21/063; B01D 53/944; B01D 2255/10; B01D 2255/1021; Y10T 428/24612

See application file for complete search history.

(56) References Cited

U.S. PATENT DOCUMENTS

| 8,835,285 B2 * | 9/2014 | Grimes | H01L 29/0665 257/E21.09 |
|---|---|---|---|
| 2005/0019799 A1 * | 1/2005 | Grasso | G01N 21/76 435/6.11 |
| 2005/0223969 A1 * | 10/2005 | Chen et al. | 117/105 |
| 2006/0270229 A1 | 11/2006 | Corderman et al. | |
| 2007/0273264 A1 | 11/2007 | Choi et al. | |
| 2007/0275499 A1 | 11/2007 | Corderman et al. | |
| 2009/0242416 A1 | 10/2009 | Yun et al. | |
| 2010/0180950 A1 | 7/2010 | Gao et al. | |
| 2010/0230286 A1 | 9/2010 | Lifchits | |
| 2015/0258531 A1 | 9/2015 | Gao et al. | |

FOREIGN PATENT DOCUMENTS

| EP | 1015384 B1 | 7/2005 |
|---|---|---|
| KR | 10-2007-0113763 A | 11/2007 |
| WO | WO 2006-138071 | 12/2006 |
| WO | WO 2013/049606 A2 | 4/2013 |
| WO | WO 2014/043514 | 3/2014 |

OTHER PUBLICATIONS

Joshi et al., "Au Decorated Zinc Oxide Nanowires for CO Sensing," J. Phys. Chem. C. 2009, 113, 16199-16202.*
International Preliminary Report on Patentability from PCT/US2012/057974 dated Apr. 1, 2014; entitled "Metal Oxide Nanorod Arrays on Monolithic Substrates".
International Search Report of PCT/US2012/057974 dated Mar. 27, 2013, entitled "Metal Oxide Nanorod Arrays on Monolithic Substrates".
Andonova, S.M., et al., "Fine-Tuning the Dispersion and the Mobility of BaO Domains on $NO_x$ Storage Materials via $TiO_2$ Anchoring Sites," *J. Phys. Chem.*, 114:17003-17016 (2010).
Buonsanti, R., et al., "Nonhydrolytic Synthesis of High-Quality Anisotropically Shaped Brookite $TiO_2$ Nanocrystals," *J. Am. Chem. Soc.*, 130:11223-11233 (2008).
Chen, S.Y., et al., "Formation of Core/Shell-Type ZnO/$CeO_2$Nanorods and $CeO_2$Nanotube Arrays by Aqueous Synthesis and Wet-Etching," *Advanced Science Letters*, 1:123-127 (2008).
Chen, C.A. et al., "Growth and characterization of well-aligned densely-packed rutile TiO2 nanocrystals on sapphire substrates via metal—organic chemical vapor deposition," *Nanotechnology* 19:075611 (2008).
Despres, J., et al., "Storage of $NO_2$ on $BaO/TiO_2$ and the influence of NO," *Applied Catalysis B: Environmental*, 43:389-395 (2003).
Feng, X., et al., "Vertically Aligned Single Crystal TiO2 Nanowire Arrays Grown Directly on Transparent Conducting Oxide Coated Glass: Synthesis Details and Applications," *Nano Letters*, 8(11): 3781-3786 (2008).
Hosono, E., et al.., "Growth of Submicrometer-Scale Rectangular Parallelepiped Rutile TiO2 Films in Aqueous TiCl3 Solutions under Hydrothermal Conditions," *J. Am. Chem. Soc.* 126:7790-7791 (2004).
Hu, W., et al., "High Quality Brookite $TiO_2$ Flowers: Synthesis, Characterization, and Dielectric Performance," *Crystal, Growth and Design*, 9(8): 3676-3682 (2009).
Kim, C. H., et al., "Strontium-Doped Perovskites Rival Platinum Catalysts for Treating NOx in Simulated Diesel Exhaust," *Science*, 327: 1624-1626 (2010).
Wang, Y., et al., "Preparation of Tractable Platinum, Rhodium, and Ruthenium Nanoclustcrs with Small Particle Size in Organic Media," *Chem. Matter.*, 12(6):1622-1627 (2000).
Xie, X., et al., "Low-Temperature Oxidation of CO catalyzed by $Co_3O_4$ Nanorods," *Nature*, 458: 746-749 (2009).
Zhou, H.P., et al., "Thermally Stable $Pt/CeO_2$ Hetero-Nanocomposities with High Catalytic Activity," *J. Am. Chem. Soc.*, 132(14):4998-4999 (2010).
Guo, Yanbing et al., "Single Crystalline Brookite Titanium Dioxide Nanorod Arrays rooted on Ceramic Monoliths: A Hybrid nanocatalyst Support With Ultra-High Surface Area and Thermal Stability," Crystengcomm, vol. 15, No. 41, Aug. 19, 2013, p. 8345.
Zhang, Z., et al., "In situ TPR Removal: a generic method for fabricating tubular array devices with mechanical and structural soundness, and functional robustness on various substrates," *J. of Materials Chemistry*, 22(43): 23098-23105 (Sep. 6, 2012).
Feng, Y., et al., "Hydrothermal synthesis and automotive exhaust catalytic performance of Ce02 nanotube arrays," *J. of Materials Chemistry*, 21(39): 15442-15448 (Sep. 6, 2011).

(56) References Cited

OTHER PUBLICATIONS

Guo, Y. et al. "Ultrahigh Surface Area Titanium Dioxide Nanorod Arrays Rooted on Monoliths." Poster presentation at 22nd North American Catalysis Society Meeting, Detroit, Michigan (Jun. 5-10, 2011).
Williams, J.L., "Monolithic structures, materials, properties and uses," Catalysis Today 69 (2001) 3-9.
Jian, D. et al., "Synthesis, characterization, and photocatalytic properties of ZnO/(La,Sr)CoO3 composite nanorod arrays," *J. Mater. Chem.*, 19: 970-975 (2009).
Satterfield, C. W., Heterogeneous Catalysis in Industrial Practice, 2nd Edition, McGraw-Hill, Inc., New York, 1991.
Shimpi, P. et al., "Low temperature synthesis and characterization of MgO/ZnO composite nanowire arrays," *Nanotechhology*, 20: 125608, 1-8 (2009).
Written Opinion from PCT/US2012/057974 dated Mar. 27, 2013; entitled "Metal Oxide Nanorod Arrays on Monolithic Substrates".
PCT/US2013/059727 ("Method of Making Nanotube Array Structure"): International Search Report and Written Opinion, dated Nov. 22, 2013.
PCT/US2013/059727 ("Method of Making Nanotube Array Structure"): International Preliminary Report on Patentability, dated Mar. 17, 2015.
Chung et al. "Structural and optical properties of Be-doped ZnO nanocrystalline films by pulsed laser deposition". Thin solid films. 516 (2007) 4190-4193.
Gao, P.X. et al., "Nanowire Piezoelectric Nanogenerators on Plastic Substrates as Flexible Power Sources for Nanodevices," Adv. Mater., 19:67-72, (2007).
Gayen, R. et al., "Zinc Magnesium Oxide Nanofibers on Glass Substrate by Solution Growth Technique," Journal of Crystal Growth, 310:4073-4080, (2008).
Han et al. "Transition metal oxide core-shell nanowires: Generic synthesis and transport studies". Nano Letters 2004, vol. 4, No. 7. p. 1241-1246.
Hsu, H.C. et al., "Band Gap Engineering and Stimulated Emission of ZnMgO Nanowires," Applied Physics Letters, 89:3 pages, (2006).
Hwang, D.K. et al., "Effects of Deposition Temperature on the Properties of Zn1-xMgxO Thin Films," Applied Surface Sciences, 225:217-222, (2004).
Kar, J.P. et al., "Fabrication and Characterization of Vertically Aligned ZnMgO/ZnO Nanowire Arrays," Materials Science and Engineering B, 147:74-78, (2008).
Kling, R et al., "Analysis of ZnO and ZnMgO Nanopillars Grown by Self-Organization," Nanotechnology, 15:1043-1046, (2004).
Liu, W. et al., "The Deposition and Annealing Study of MOCVD ZnMgO," Journal of Crystal Growth, 227:416-421, (2005).
Lorenz, M. et al., "$Mg_xZn_{1-x}O(\leq x<0.2)$ Nanowire Arrays on Sapphire Grown by High-Pressure Pulsed-Laser Deposition," Applied Physics Letters, 86:3 pages, (2005).
Ohtomo, A. et al., "Structure and Optical Properties of $ZnO/Mg_{0.2}Zn_{0.8}O$ Superlattices," Applied Physics letters, 75(7):980-982, (1999).
Plank et al. "A simple low temperature synthesis route for ZnO—MgO core-shell nanowires". Nanotechnology 19 (2008) 465603.
Shan et al. "A simple route to porous ZnO and ZnCdO nanowires". J. Phys. Chem. B 2006, 110, 11176-11179.
Shimpi, P. et al., "Annealing Induced Nanostructure and Photoluminescence Property Evolution in Solution-Processed Mg-Alloyed ZnO Nanowires," Applied Physics Letters, 97:3 pages, (2010).
Tang et al. "ZnO nanowires grown along the non-polar direction". Materials Letters 62 (2007) 1393-1395.
Wang, G. et al., "Growth and Properties of ZnO/Hexagonal ZnMgO/Cubic ZnMgO Nanopagoda heterostructures," J. Phys. D: Appl. Phys., 40:5287-5290, (2007).
Yuhas et al. "Transition-metal doped zinc oxide nanowires". Angew. Chem. 2006, 118, 434-437.
Zhang; "One-dimensional metal oxide nanostructures for heterogeneous catalysis," Nanoscale, 2013, 5, 7175.
Zhu, L. et al., "Catalyst-Free Two-Step Growth of Quasialigned ZnMgO Nanorods and Their Properties," Applied Physics Letters, 88:3 pages, (2006).
Shaikh et al., "Thermal conductivity of an aligned carbon nanotube array," Carbon, vol. 45, 2007, pp. 2608-2613.

\* cited by examiner

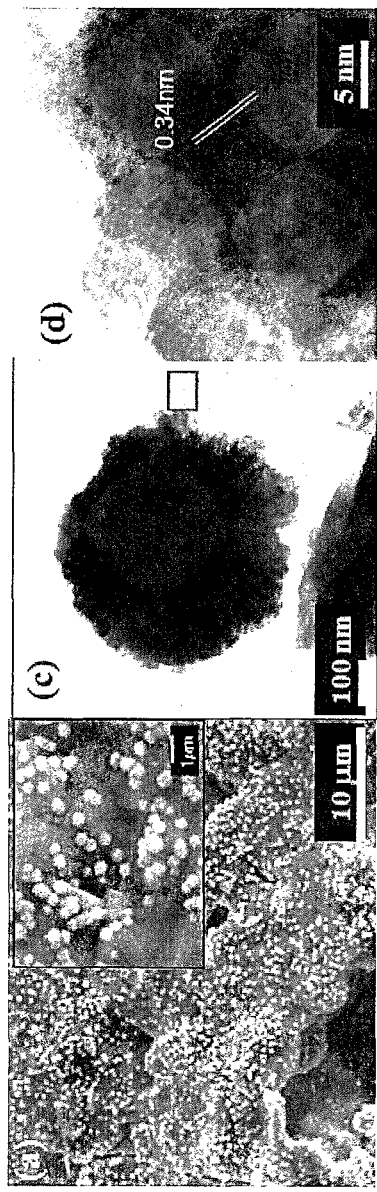
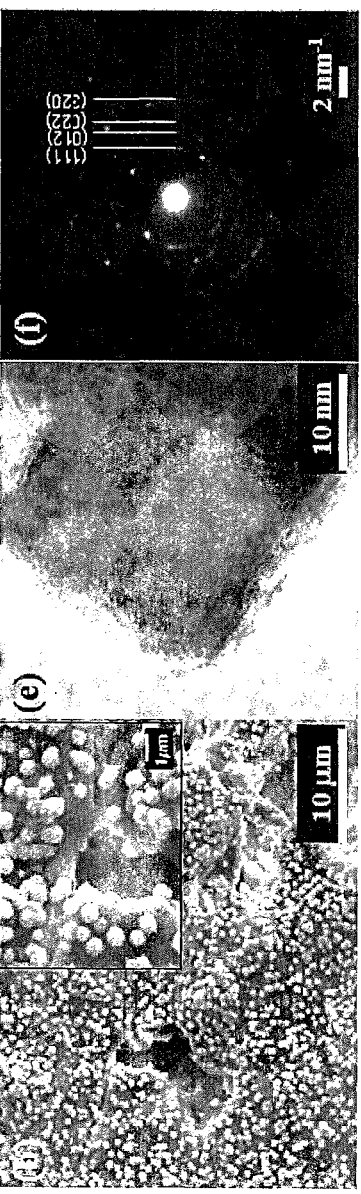
FIG. 3a FIG. 3b FIG. 3c FIG. 3d FIG. 3e FIG. 3f

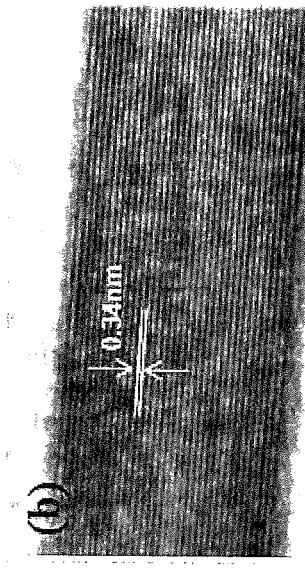
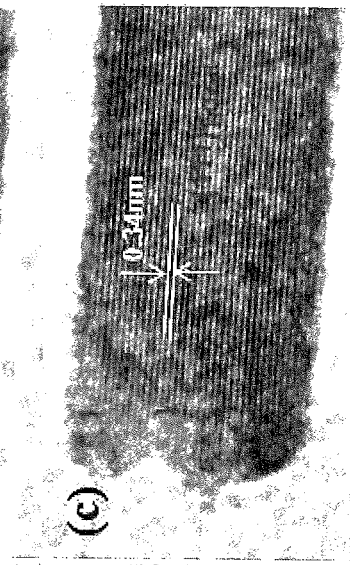
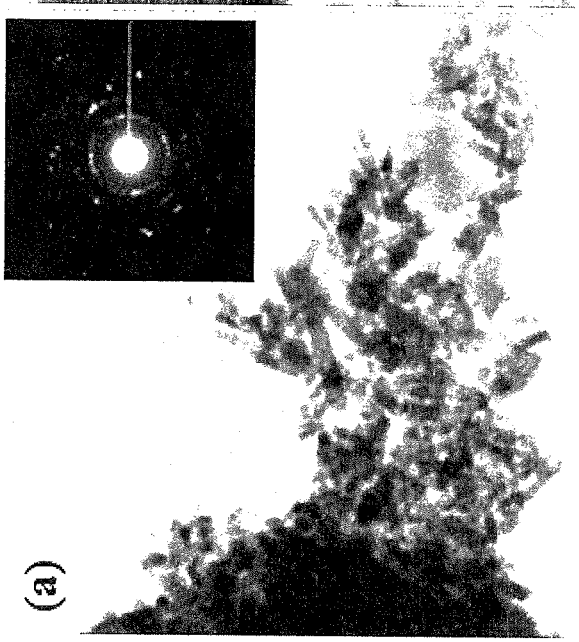

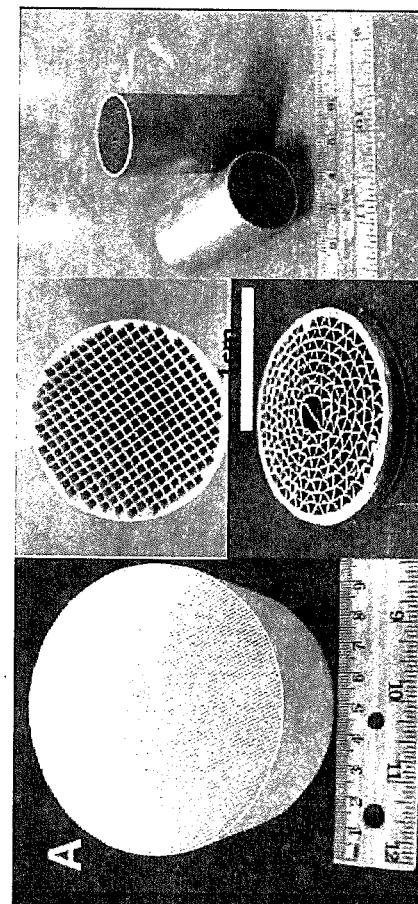
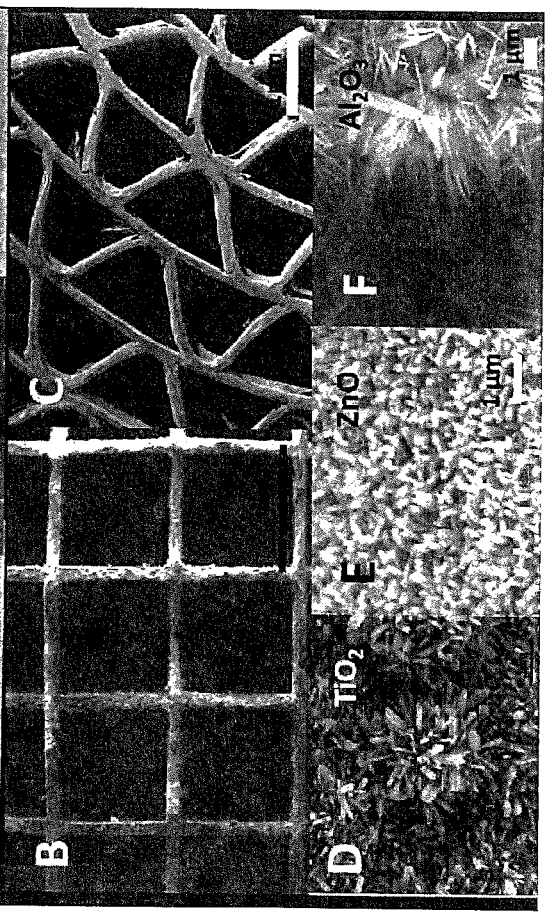
FIG. 8A    FIG. 8B    FIG. 8C
FIG. 8D    FIG. 8E    FIG. 8F

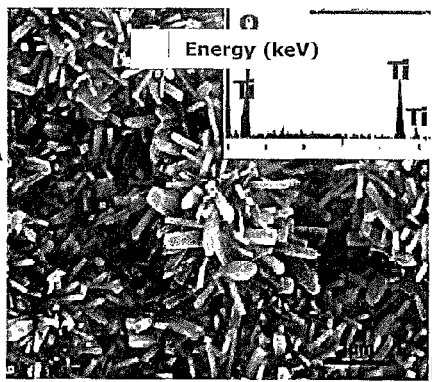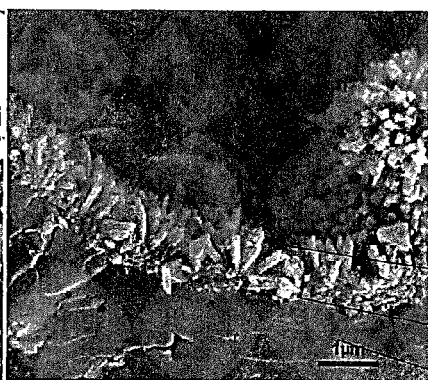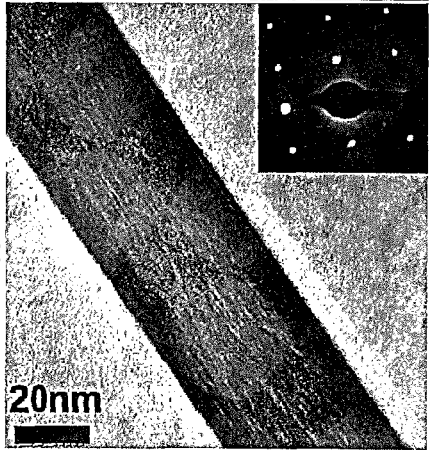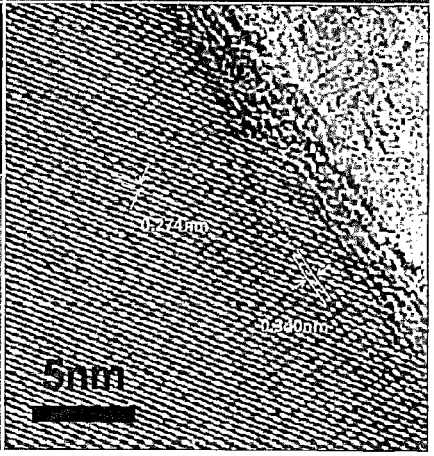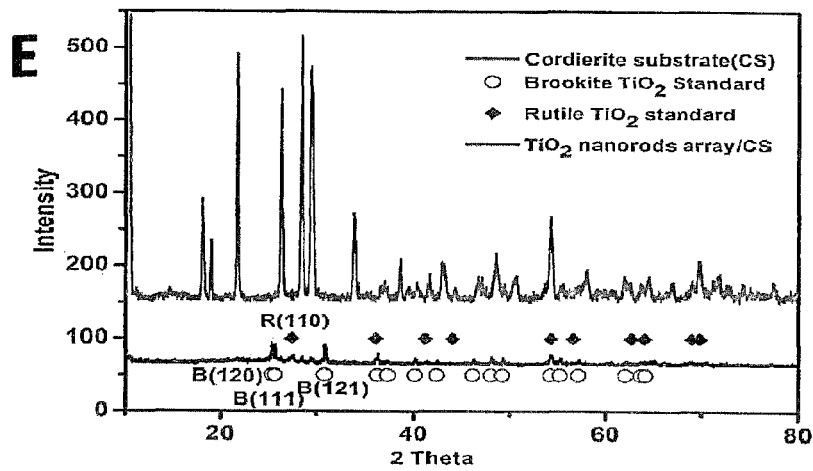
FIG. 10E

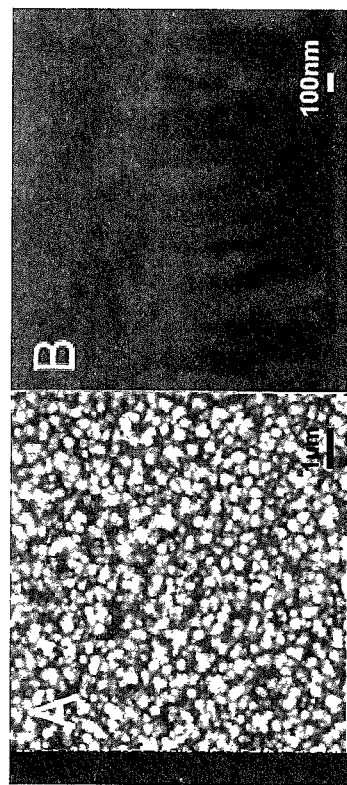
FIG. 11A
FIG. 11B
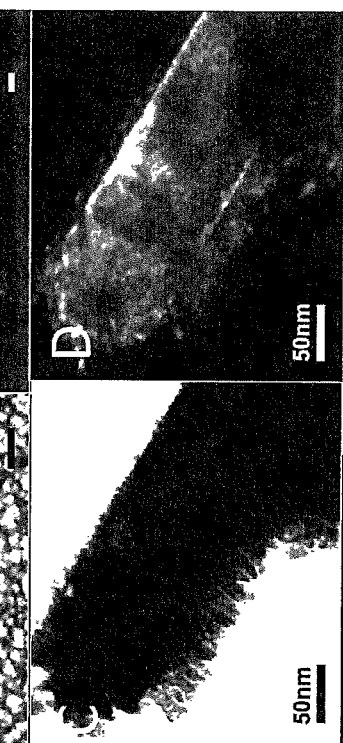
FIG. 11C
FIG. 11D
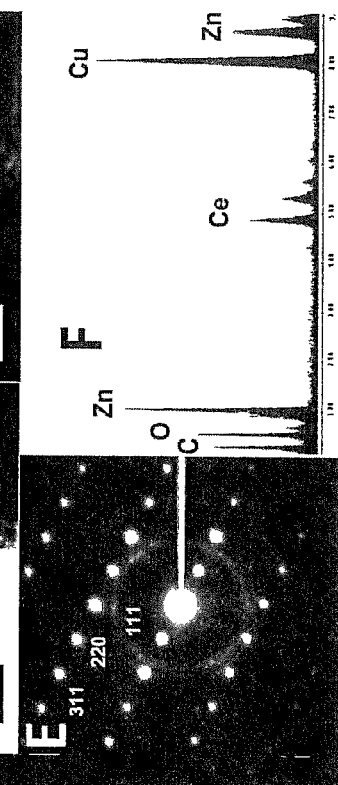
FIG. 11E
FIG. 11F

FIG. 12B
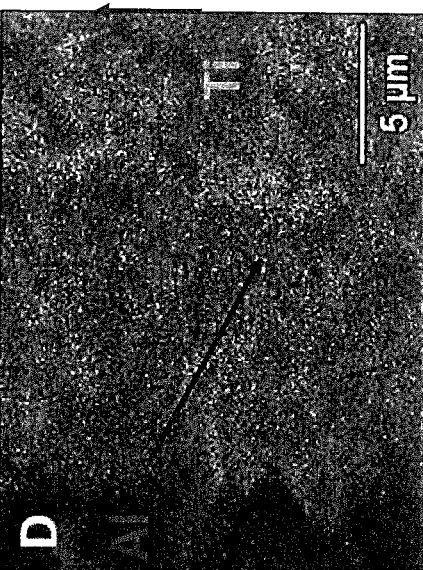
FIG. 12D
FIG. 12A
FIG. 12C

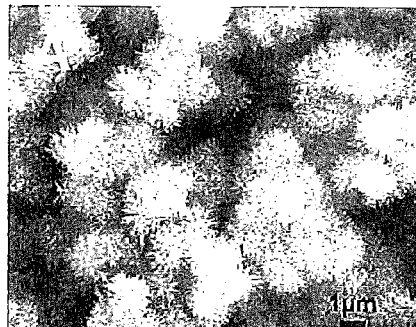
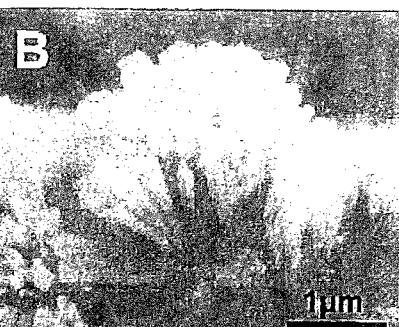
FIG. 13A
FIG. 13B
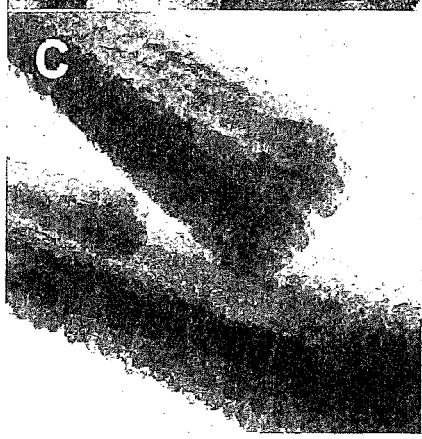
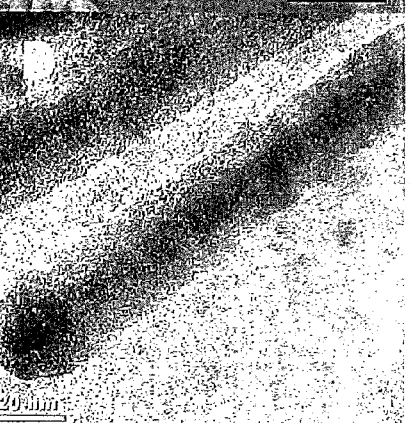
FIG. 13C
FIG. 13D
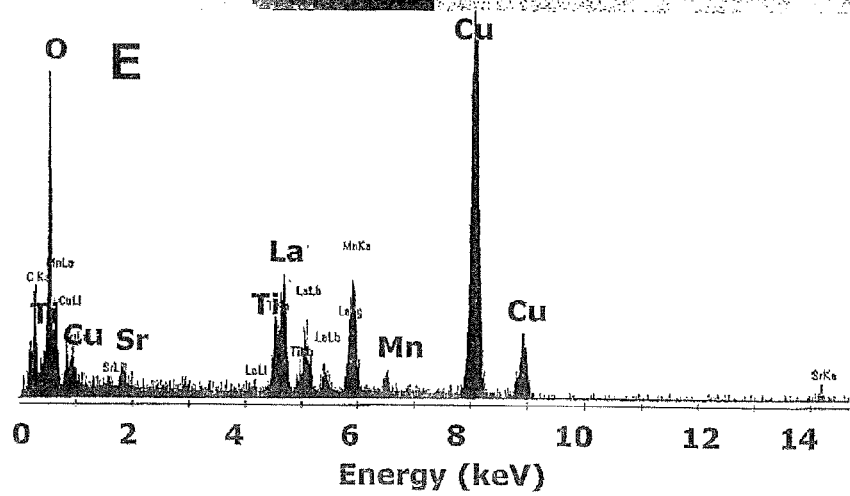
FIG. 13E

METAL OXIDE NANOROD ARRAYS ON MONOLITHIC SUBSTRATES

RELATED APPLICATIONS

This application is the U.S. National Stage of International Application No. PCT/US2012/057974, filed on Sep. 28, 2012, published in English, which claims the benefit of U.S. Provisional Application No. 61/540,221, filed on Sep. 28, 2011. The entire teachings of the above applications are incorporated herein by reference.

GOVERNMENT SUPPORT

This invention was made with government support under contract No. DE-EE0000210 awarded by the Department of Energy. The government has certain rights in the invention.

BACKGROUND OF THE INVENTION

Ceramic monoliths are widely applied as catalyst supports as a result of their high inertness to undesired reactions, mechanical and thermal stability, and high flow rates along multiple channels. See Satterfield, C. W., Heterogeneous Catalysis in Industrial Practice, 2nd Edition, McGraw-Hill, Inc., New York, 1991. Monoliths, however, have relatively low surface area, and therefore usually require a high surface area porous alumina particulate washcoat to help increase their surface area before or while loading the catalytically active materials such as noble metal nanoparticles. Unfortunately, the intrinsically non-adherent particle-based washcoat can be easily subjected to erosion by high velocity flow rates.

SUMMARY OF THE INVENTION

Therefore, there is a need for a high surface area catalyst structure having an adherent layer bonded to the surface of the substrate.

A metal oxide nanorod array structure includes a monolithic substrate having a surface and multiple channels, an interface layer bonded to the surface of the substrate, and a metal oxide nanorod array coupled to the substrate surface via the interface layer.

In some embodiments, the metal oxide nanorod array can be vertically aligned relative to the surface of the substrate. In certain embodiments, the metal oxide can be titania ($TiO_2$), such as brookite titania. In other embodiments, the metal oxide can include one of the following: ceria ($CeO_2$), zinc oxide (ZnO), tin oxide ($SnO_2$), alumina ($Al_2O_3$), zirconia ($ZrO_2$), cobalt oxide ($Co_3O_4$), and gallium oxide ($Ga_2O_3$). The substrate can include at least one of the following: a glass substrate, a plastic substrate, a silicon substrate, a ceramic monolith, and a stainless steel monolith. In some embodiments, the ceramic can include one of the following: cordierite, alumina, tin oxide, and titania.

In certain embodiments, the nanorod array structure can further include a perovskite $ABO_3$ (A=La, Ba, Sr, and/or Pb, B=Co, Cr, Fe, Mn, or Ni) shell over each metal oxide nanorod, such as a lanthanum-based transition metal oxide, $LaMO_3$ (M=Co, Cr, Fe, Mn, and Ni), such as lanthanum strontium cobaltate and lanthanum strontium manganate. In other embodiments, the nanorod array structure can further include a metal oxide shell over each metal oxide nanorod, such as a metal oxide including one of the following: ceria ($CeO_2$), zinc oxide (ZnO), tin oxide ($SnO_2$), alumina ($Al_2O_3$), zirconia ($ZrO_2$), cobalt oxide ($Co_3O_4$), and gallium oxide ($Ga_2O_3$). In yet other embodiments, the nanorod array structure can further include an alkaline oxide shell over each metal oxide nanorod, such as a barium oxide and/or potassium oxide shell. In still other embodiments, the nanorod array structure can further include a coating of metal particles over each metal oxide nanorod, such as platinum, gold, palladium, rhodium, and ruthenium.

Another embodiment is a titania nanorod array structure made by the process of mixing an aqueous titanium trichloride solution with saturated sodium chloride to form a precursor solution, submerging a monolithic substrate having a surface and multiple channels in the precursor solution, and heating the substrate and the precursor solution at elevated, relative to ambient, pressure and temperature for a time sufficient to form brookite titania nanorod arrays coupled to the substrate surface via an interface layer, and vertically aligned relative to the substrate surface. The titanium trichloride solution can have a concentration in a range of between about 0.001 M and about 1.0 M, such as about 0.15 M. In some embodiments, heating the substrate and the precursor solution can be conducted in an autoclave, to a temperature in a range of between about 90° C. and about 240° C., such as about 180° C. The time for heating the substrate and the precursor solution can be in a range of between about 4 hours and about 24 hours. Some embodiments can further include radio frequency (RF) magnetron sputtering lanthanum strontium manganate (LSMO) nanofilm on the brookite titania nanorod arrays, thereby forming LSMO shells over the titania nanorod arrays. Other embodiments can further include submerging the substrate, including the brookite titania nanorod arrays, in a metal colloid solution, followed by drying the substrate, thereby forming metal-loaded brookite titania nanorod arrays on the substrate. The metal can include at least one of the following: platinum, gold, palladium, rhodium, and ruthenium. Yet other embodiments can further include submerging the monolithic substrate, including the brookite titania nanorod arrays, in a metal hydroxide solution, followed by drying the substrate, thereby forming metal-loaded brookite titania nanorod arrays on the substrate. Still other embodiments can further include submerging the monolithic substrate, including the brookite titania nanorod arrays, into a reactor containing $H_2MCl_6$ solution (M=Pt, Au, Pd, Rh, or Ru), and injecting a reductant solution or hydrogen gas into the reactor, followed by drying the substrate, thereby forming metal-loaded brookite titania nanorod arrays on the substrate. The reductant solution can include sodium borohydride.

Yet another embodiment is a nanorod array structure made by the process of submerging a monolithic substrate having a surface and multiple channels in a precursor solution, and heating the substrate and the precursor solution at elevated, relative to ambient, pressure and temperature for a time sufficient to form nanorod arrays coupled to the substrate surface via an interface layer. The precursor solution can be an aqueous metal salt solution, the metal including one of the following: aluminum, cerium, tin, zirconium, cobalt, and gallium. The interface layer can be made of the same materials as the nanorod arrays, or dissimilar materials, which can be grown prior to or during the nanorod growth process.

In still another embodiment, a method of making titania nanorod arrays includes mixing an aqueous titanium trichloride solution with saturated sodium chloride to form a precursor solution, submerging a monolithic substrate having a surface and multiple channels in the precursor solution, and heating the substrate and the precursor solution at elevated, relative to ambient, pressure and temperature for a time sufficient to form brookite titania nanorod arrays coupled to the substrate surface via an interface layer and vertically aligned relative to the substrate surface.

In yet another embodiment, a method of making zinc oxide nanorod arrays includes dip coating a zinc oxide nanoparticle seed film on a monolithic substrate having a surface and multiple channels, annealing the coated substrate, and submerging the coated substrate in a stirred aqueous solution of a zinc salt and a weak base, such as hexamethylenetetramine, for a time sufficient to form zinc oxide nanorod arrays coupled to the substrate surface via an interface layer. The coated substrate can be annealed at a temperature in a range of between about 200° C. and about 500° C. The time for submerging the coated substrate can be in a range of between about 0.1 hours and about 100 hours. Some embodiments can further include radio frequency (RF) magnetron sputtering cerium oxide nanofilms on the zinc oxide nanorod arrays, thereby forming zinc oxide/cerium oxide composite nanorod arrays. Other embodiments can further include submerging the substrate, including the zinc oxide nanorod arrays, in a metal colloid solution, followed by drying the substrate, thereby forming metal-loaded zinc oxide nanorod arrays on the substrate. Yet other embodiments can further include submerging the monolithic substrate, including the zinc oxide nanorod arrays, in a metal hydroxide solution, followed by drying the substrate, thereby forming metal-loaded zinc oxide nanorod arrays on the substrate. Still other embodiments can further include submerging the substrate, including the zinc oxide nanorod arrays, into a reactor containing $H_2MCl_6$ solution (M=Pt, Au, Pd, Rh, or Ru), and injecting a reductant solution or hydrogen gas into the reactor, followed by drying the substrate, thereby forming metal-loaded zinc oxide nanorod arrays on the substrate.

In still another embodiment, a method of making metal oxide nanowire arrays includes electrodepositing metal oxide onto a monolithic substrate having a surface and multiple channels from an electrolytic solution of metal-chloride or -nitrate and potassium chloride, the metal oxide nanowire arrays being coupled to the substrate surface via an interface layer. The concentration of metal-chloride or -nitrate and potassium chloride can each independently be in a range of between about 0.001 M and about 1.0 M. The electrodeposition can be conducted at a temperature in a range of between about 25° C. and about 90° C., such as about 70° C. The metal oxide can include one of the following: cerium oxide, zinc oxide, titania, zirconia, and tin oxide.

Embodiments of this invention have many advantages, including enabling catalytic structures with high surface area, high thermal stability, sulfur poisoning resistance, and multi-functional catalytic tailoring ability to be applied in various ways, such as being bonded via an adherent layer to the surface of a substrate.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 1(a)-1(e) are photographs of: FIG. 1(a) and FIG. 1(b) top views of optical FIG. 1(a) and SEM FIG. 1(b) images of a honeycomb monolithic substrate, FIG. 1(c) side view SEM images of the honeycomb monolith and the corresponding EDX spectrum, FIG. 1(d) and FIG. 1(e) SEM images of $TiO_2$ nanorod arrays grown using 2 mL of $TiCl_3$, and 18 mL of NaCl-saturated DI water at 180° C. for 4 h on 3D honeycomb monolithic substrate.

FIG. 2(a) 1 h, FIG. 2(b) 1.5 h, FIG. 2(c) 2 h, FIGS. 2(e, f) 24 h. Single $TiO_2$ nanorods were also found on the substrate surface when the hydrothermal treatment time was 2 h, as indicated by the boxes in FIG. 2(c).

FIGS. 3(a)-3(f) are photographs of: SEM images of the dandelion-like $TiO_2$ nanorod clusters inside the 3D honeycomb monolithic substrate grown at 180° C. for 1.5 h in FIGS. 3(a) and 2 h in FIG. 3(b). Low magnification and (FIGS. 3d and 3e) high magnification (FIG. 3d: body part; FIG. 3e: tip part) TEM images of a dandelion-like $TiO_2$ nanorod cluster grown inside the 3D honeycomb monolithic substrate at 180° C. for 2 h. FIG. 3(f) is an illustration of an electron diffraction (ED) pattern of the $TiO_2$ nanorod cluster. The distance between the lattice fringes in FIGS. 3(d)-3(e) is 3.4 nm, which can be assigned to brookite (111).

FIGS. 4(a)-4(c) are photographs of: FIG. 4(a) low-resolution TEM image of the $TiO_2$ nanorods grown inside the 3D honeycomb monolithic substrate at 180° C. for 4 h. Inset of FIG. 4(a) is the ED pattern of the grown $TiO_2$. FIGS. 4(b, c) are high-resolution TEM images of the body portion and top portion of one grown $TiO_2$ nanorod, respectively.

FIGS. 8A-8F are photographs of: FIG. 8(A) typical 3-D monolithic substrates used in the invention: cordierite honeycomb substrate, stainless steel substrate; FIG. 8(B) higher magnification SEM image of cordierite substrate channels; FIG. 8(C) higher magnification SEM image of stainless steel substrate channels; FIGS. 8(D-F) top view images of $TiO_2$, ZnO and $Al_2O_3$ arrays, respectively, grown on cordierite or stainless steel monolithic substrates.

FIGS. 10A-10E are: FIG. 10A shows top-view FE-SEM images of $TiO_2$ nanorod arrays on the inside wall of a ceramic honeycomb monolithic substrate in a relatively high magnification; the inset of FIG. 10A is the EDS confirming the composition of $TiO_2$; FIG. 10B shows a cross-section view of the $TiO_2$ nanorods arrays on cordierite honeycomb monolithic substrate; FIG. 10C shows a TEM image of a typical $TiO_2$ nanorod; the inset is the selected diffraction pattern on the single nanorod; FIG. 10D shows a HRTEM image of TiO$_2$ nanorod; FIG. 10E shows X-ray diffraction (XRD) patterns of blank cordierite monolithic substrate and TiO$_2$ nanorod arrays on cordierite monolithic substrate. FIG. 10B shows the TiO$_2$ nanorod arrays 10, the TiO$_2$ interface layer 20, and the cordierite monolithic substrate 30.

FIGS. 11A-11F are EM images of the prepared samples: FIG. 11A shows a top view of CeO$_2$/ZnO nanofilm-nanorod arrays in low magnification; FIG. 11B shows a cross section of CeO$_2$/ZnO nanofilm-nanorod arrays; FIG. 11C shows a bright field TEM image of a typical CeO$_2$/ZnO core-shell nanorod; FIG. 11D shows a corresponding dark field image of CeO$_2$/ZnO core-shell nanorod in FIG. 11C; FIG. 11E shows a selective area diffraction pattern of CeO$_2$/ZnO core-shell nanorods; FIG. 11F shows an EDS spectrum of CeO$_2$/ZnO core-shell nanorods.

FIGS. 12A-12D are SEM images of Al$_2$O$_3$—TiO$_2$ heterogeneous nanorod arrays: FIG. 12A shows a top view of Al$_2$O$_3$—TiO$_2$ heterogeneous nanorod arrays; FIG. 12B shows typical morphology of Al$_2$O$_3$ nanorods; FIG. 12C shows a cross-sectional view of Al$_2$O$_3$—TiO$_2$ heterogeneous nanorod arrays; FIG. 12D shows element mapping across part of the Al$_2$O$_3$—TiO$_2$ heterogeneous nanorod arrays shown in FIG. 12C.

FIGS. 13A-13E are electron microscopy images of TiO$_2$/LSMO core-shell nanorod arrays: FIG. 13A large area scanning electron microscopy (SEM) image of TiO$_2$/LSMO core-shell nanorod array, FIG. 13B cross-sectional view SEM image of TiO$_2$/LSMO nanorod array, FIG. 13C transmission electron microscopy (TEM) image of TiO$_2$/LSMO core-shell nanorods, FIG. 13D high resolution TEM image of TiO$_2$/LSMO core-shell nanorods, FIG. 13E EDS spectrum of TiO$_2$/LSMO nanorods under TEM.

FIG. 14A bright field image of TiO$_2$ nanorods; FIG. 14B dark field image of the same TiO$_2$/Pt composite nanorods; FIG. 14C TEM images of a typical TiO$_2$/Pt composite nanorod in a higher magnification; FIG. 14D high-resolution TEM images of the TiO$_2$—Pt interface.

FIG. 15 shows schematic illustrations of 3-D configured nano-array catalysts, and typical metal oxide nano-array based monolithic catalysts. FIGS. 15f and 15j, 15g and 15k, 15h and 15l, and 15i and 15m, are, respectively, ZnO nanorod arrays, TiO$_2$ nanorod arrays, CeO$_2$ nanotube arrays, Co$_3$O$_4$ porous nanowire arrays on cordierite monolith and their corresponding TEM images. Scale bar in all the insets is 2 nm.

FIG. 16 shows the thermal and mechanical robustness of metal oxide nano-array based monolithic catalysts in ambient atmosphere. Time dependent Thermo-Gravimetric Analysis (TGA), Brunauer-Emmett-Teller (BET) specific surface area, morphology and crystal phase change, and time dependent morphology and weight loss at constant air flow of 50 L/min. Plots.

FIG. 17 shows CO oxidation over Pt-loaded metal oxide nano-array based monolithic catalysts. Low magnification TEM images of individual metal oxide nanostructure loaded with Pt nanoparticles and its high magnification HRTEM lattice image (inset)

FIG. 18 shows CO oxidation over well-defined Pt—ZnO nano-array based monolithic catalysts. SEM images of well-defined ZnO nano-array.

FIG. 27 shows mechanical stability test using static or pulsatile flow.

FIG. 30 shows TPR-$H_2$ spectra and corresponding SEM images after testing.

DETAILED DESCRIPTION OF THE INVENTION

Figure 1A:
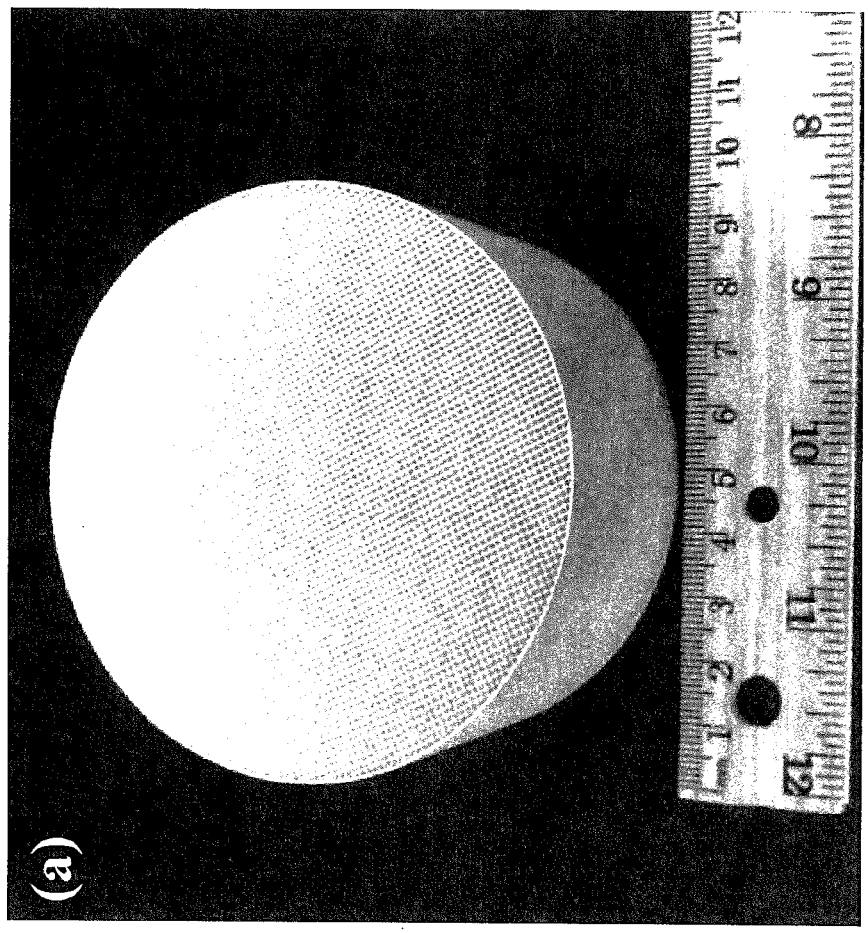
Figure 1B:
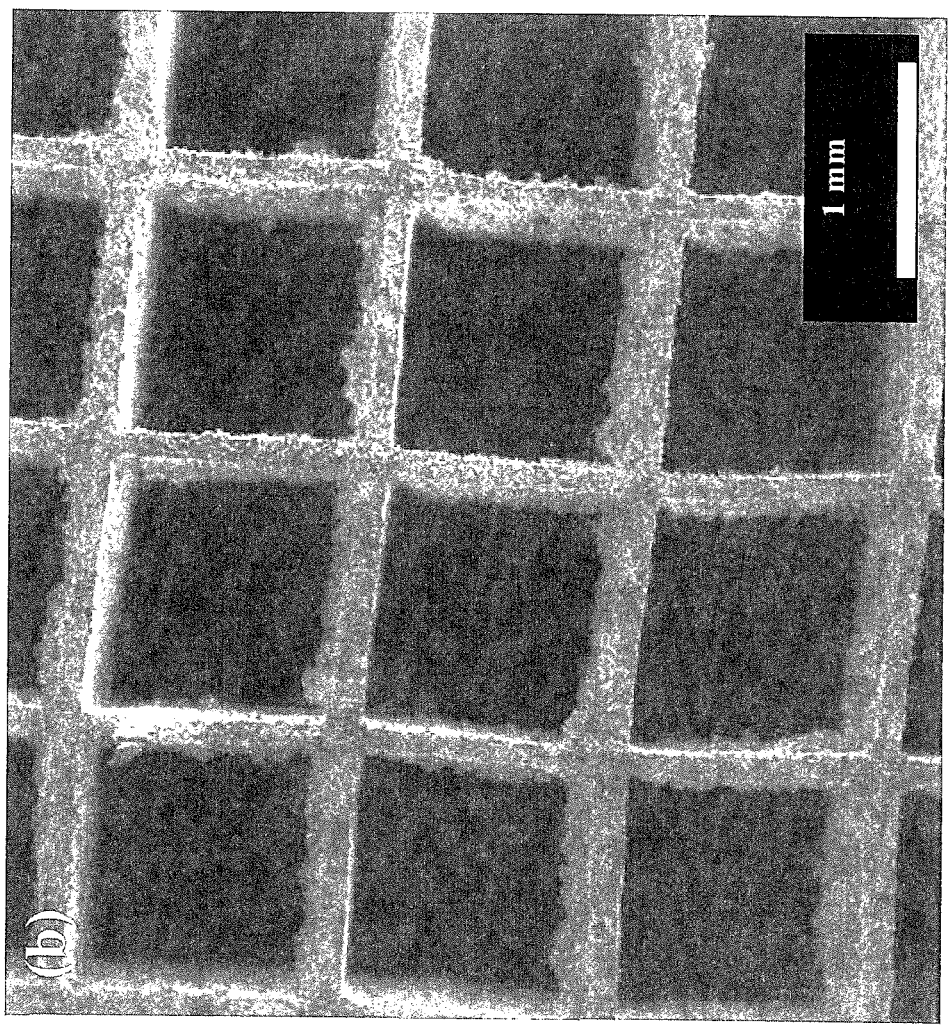
Figure 1C:
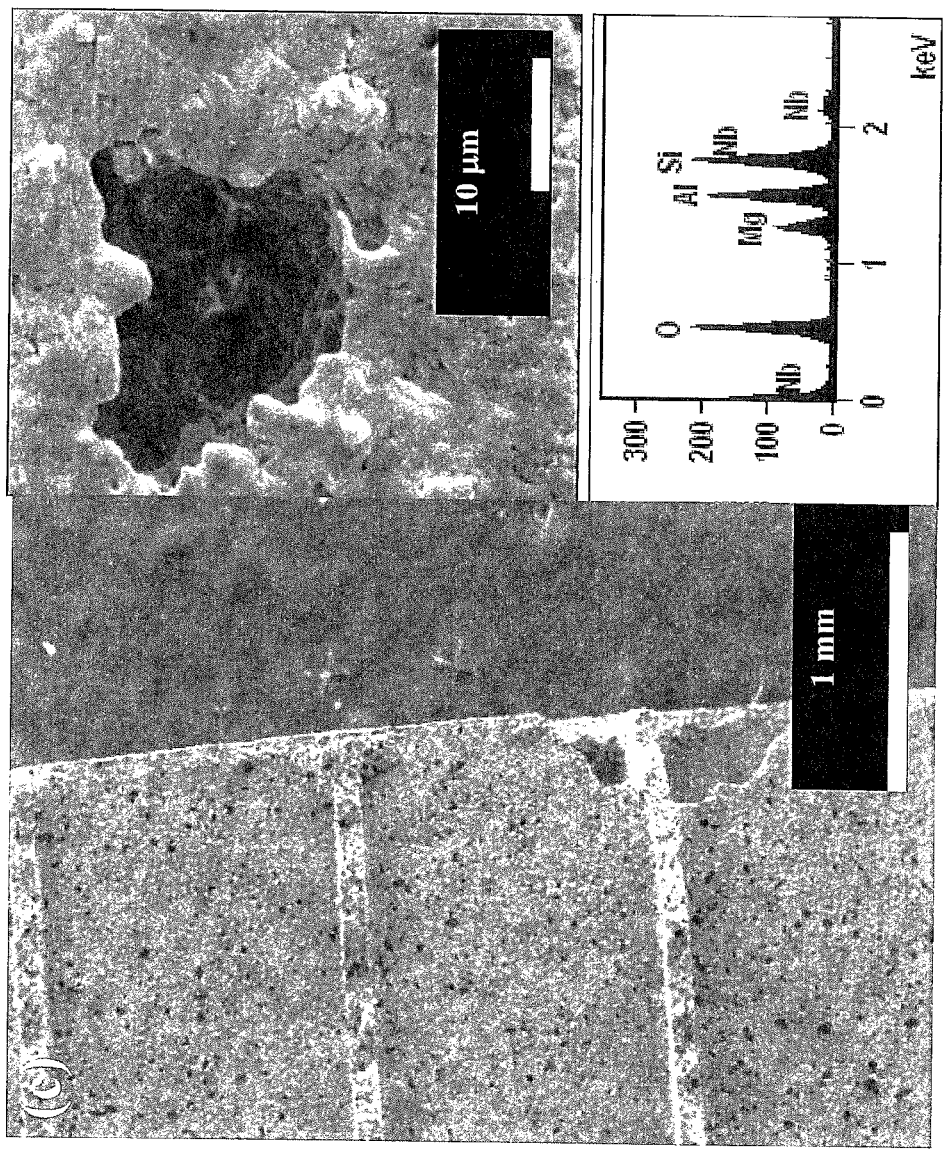
Figure 1D:
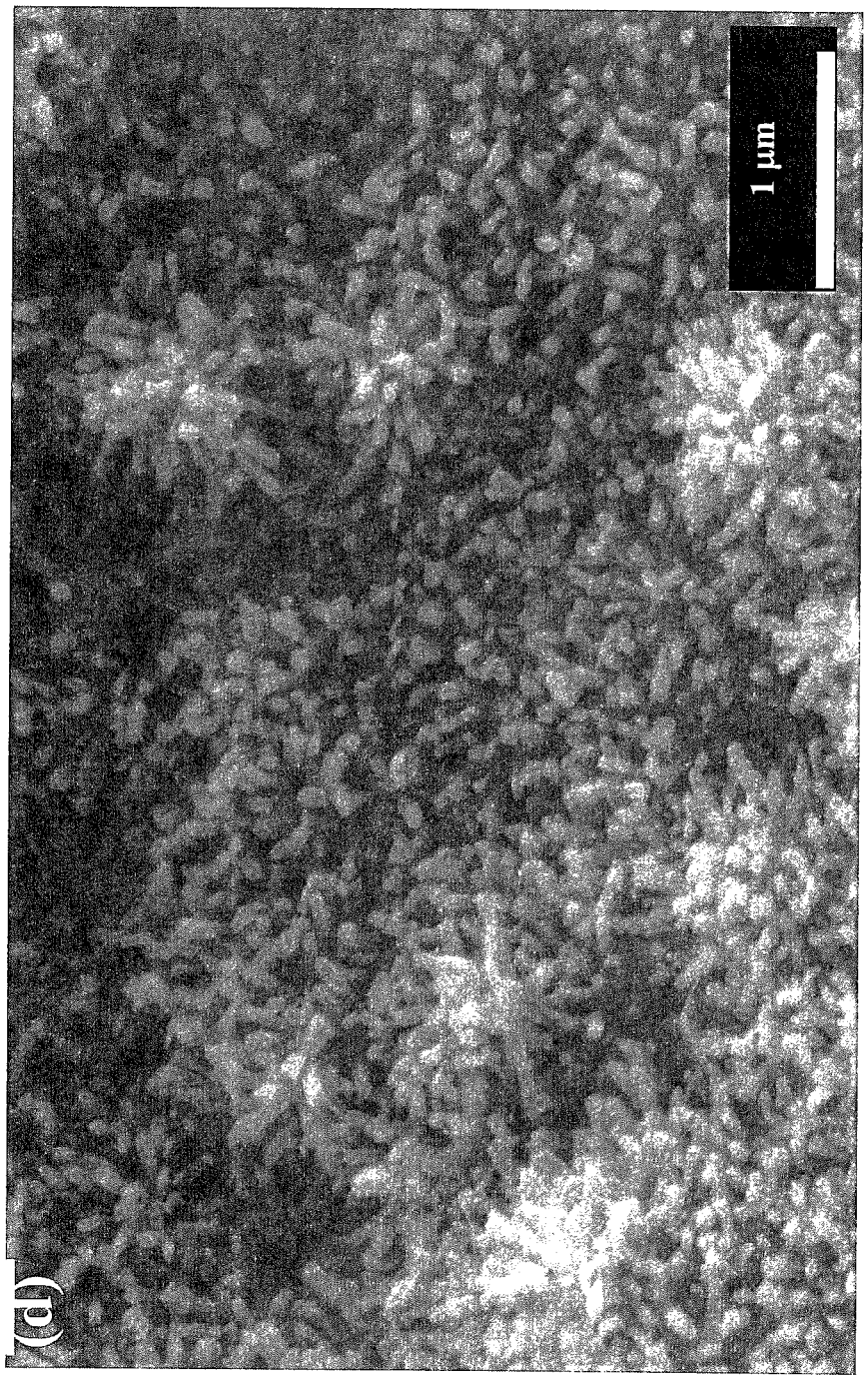
Figure 1E:
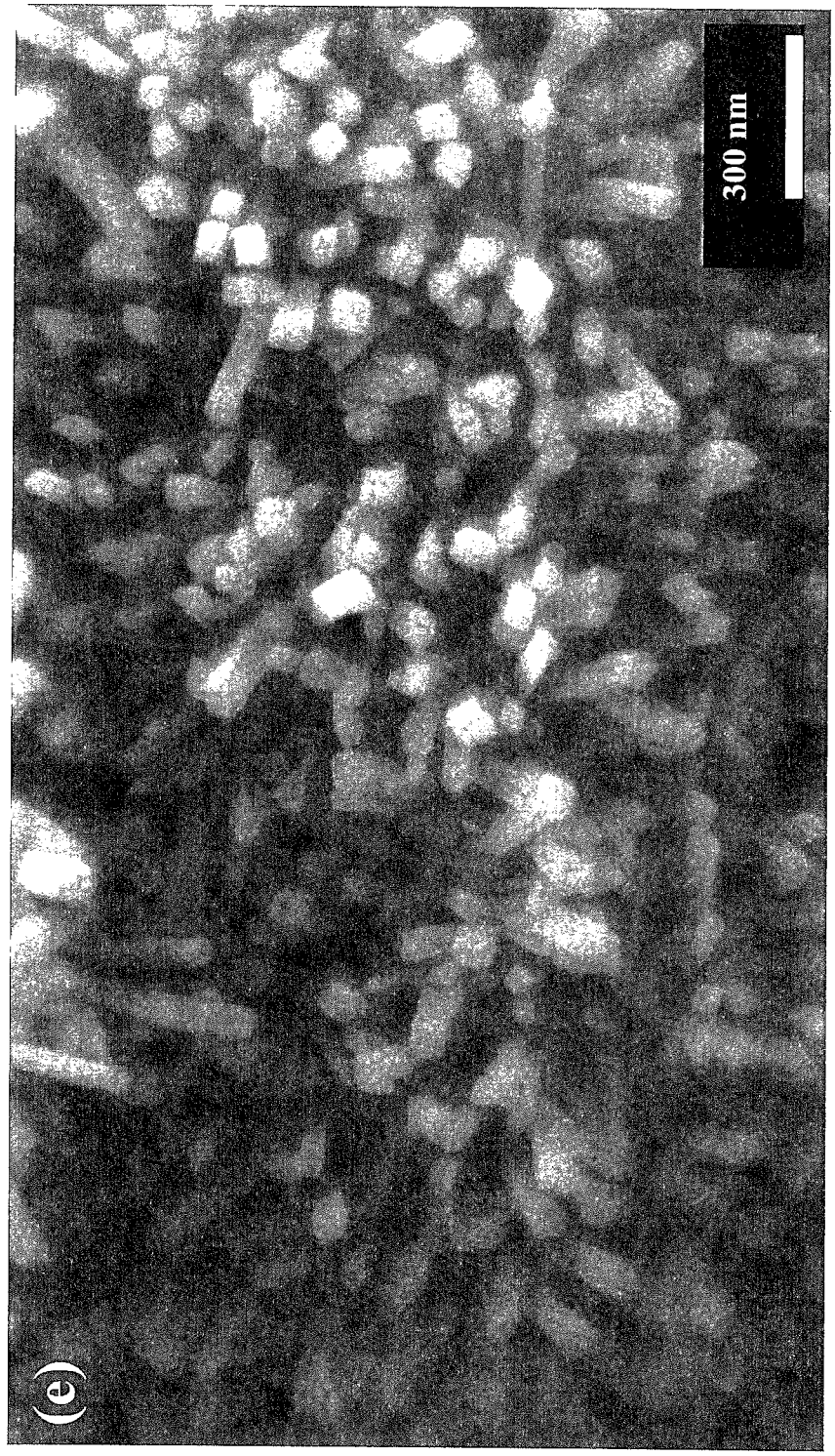

A description of example embodiments of the invention follows.

A cost-effective solution synthesis of commercial scale single crystalline titanium dioxide ($TiO_2$) nanorod arrays has been successfully achieved on the inner walls of cordierite monolithic substrates having a surface area and multiple channels, which may provide a new class of nanostructured hybrid supports or catalysts for catalysis and energy applications. The morphological evolution has been observed from dandelion $TiO_2$ nanorod clusters to vertically aligned nanorod arrays while increasing the solution treatment time. A heterogeneous nucleation-dissolution-crystallization mechanism is proposed for the growth of the brookite structured $TiO_2$ nanorod arrays on the inner walls of honeycomb monoliths. The brookite structured $TiO_2$ nanorod arrays have a very high surface area close to about 700 $m^2/g$, with an overall specific surface area in the hybrid nanostructured monolith increased by 1.8 and 2.5 times after coating the $TiO_2$ nanorods for 4 hours and 24 hours, respectively. The thermal stability tests using Differential Scanning calorimetry (DSC) and Thermo gravimetric analysis (TGA) suggest that the $TiO_2$ nanorods coated hybrid monoliths are very stable.

Ceramic monoliths are widely applied as catalyst supports as a result of their high inertness to undesired reactions, and mechanical and thermal stability. See Satterfield, C. W., Heterogeneous Catalysis in Industrial Practice, 2nd Edition, McGraw-Hill, Inc., New York, 1991 (hereinafter "Satterfield"). Monoliths are structures that contain various types of interconnected or separated channels in a single block of material, thereby maximizing the surface area-to-volume ratio. Monoliths, however, have relatively low-surface-area and, therefore, usually require a high surface area porous alumina particulate washcoat to help increase their surface area before or while loading the catalytically active materials such as noble metal nanoparticles. The intrinsically non-adherent, particle-based washcoat may be easily subjected to high velocity flow erosion.

As an important catalyst support, titania ($TiO_2$) has been extensively studied. $V_2O_5$/$TiO_2$ has been suggested as one of better catalysts for NO reduction under $NH_3$ for industrial power plants. Id. The latest research results demonstrate that the addition of $TiO_2$ to the conventional alumina washcoat support increases the $NO_x$ absorber catalysts' sulfur tolerance, which is useful to enhance the catalysts' performance and life-time. See Despres, J.; Koebel, M.; Krocher, O.; Elsener, M.; Wokaun, A. Storage of $NO_2$ on BaO/$TiO_2$ and the influence of NO. Appl. Catal. B 2003, 43, 389-395; and Andonova, S. M.; Sentürk, G. S.; Ozensoy, E. Fine-Tuning the Dispersion and the Mobility of BaO Domains on $NO_x$ Storage Materials via $TiO_2$ Anchoring Sites. J. Phys. Chem. C 2010, 114, 17003-17016. $TiO_2$ has three polymorphs of different symmetries, including anatase, rutile and brookite, all of which can be described in terms of distorted $TiO_6$ octahedra with different symmetries or arrangements. See Hoffmann, M. R.; Martin, S. T.; Choi, W.; Bahnemann, D. W. Environmental Applications of Semiconductor Photocatalysis. Chem. Rev. 1995, 95, 69-96; and Gateshki, M.; Yin, S.; Ren, Y.; Petkov, V. Titania Polymorphs by Soft Chemistry: Is There a Common Structural Pattern? Chem. Mater. 2007, 19, 2512-2518. Anatase and rutile structures have been extensively studied, while brookite structure is much less studied due to its absence in natural $TiO_2$ phases. Anatase $TiO_2$ nanoparticles can be achieved with 200-300 $m^2/g$ high surface area by hydrolysis of an organic titanium compound such as tetraisopropyl titania in aqueous solution. See Satterfield. Brookite or rutile structured $TiO_2$ are normally believed to have low surface area compared to anatase $TiO_2$, despite the higher thermal stability, due to the difficulty of synthesizing fine structures.

In addition to nanoparticles, $TiO_2$ in the form of nanorods, nanowires, and nanotubes have attracted extensive attention in the past two decades as a result of their unique shape-dependent electronic and optical properties, as well as their widespread applications in batteries, solar cells, and sensors. See Alivisatos, A. P. Semiconductor Clusters, Nanocrystals, and Quantum Dots. Science 1996, 271, 933-937; Pan, Z. W.; Dai, Z. R.; Wang, Z. L. Nanobelts of Semiconducting Oxides. Science 2001, 291, 1947-1949; Yang, P. D.; Yan, H. Q.; Mao, S.; Russo, R.; Johnson, J.; Saykally, R.; Morris, N.; Pham, J.; He, R. R.; Cho, H. J. Controlled Growth of ZnO Nanowires and Their Optical Properties. Adv. Funct. Mater. 2002, 12, 323-331; Kavan, L.; Gratzel, M.; Gilbert, S. E.; Klemenz, C.; Scheel, H. J. Electrochemical and Photoelectrochemical Investigation of Single-Crystal Anatase. J. Am. Chem. Soc. 1996, 118, 6716-6723; Oregan, B.; Gratzel, M. A Low-Cost, High-Efficiency solar Cell Based on Dye-Sensitized Colloidal $TiO_2$ Films Nature 1991, 353, 737-740; Wu, N.; Wang, S.; Rusakova, I. A. Inhibition of Crystallite Growth in the Sol-Gel Synthesis of Nanocrystalline Metal Oxides. Science 1999, 285, 1375-1377. However, crystal structure and symmetry of $TiO_2$ make the growth of oriented anisotropic single-crystalline $TiO_2$ films or nanorod arrays very difficult. See Liu, B.; Aydil, E. S. Growth of Oriented Single-Crystalline Rutile $TiO_2$ Nanorods on Transparent Conducting Substrates for Dye-Sensitized Solar Cells. J. Am. Chem. Soc. 2009, 131, 3985-3990. To date, there are only a few reports that describe heterogeneous growth of oriented single-crystalline $TiO_2$ nanorods or nanowires, but most growths are restricted to fluorine-doped tin oxide (FTO) substrates. See Id.; and Feng, X.; Shankar, K.; Varghese, O. K.; Paulose, M.; Latempa, T. J.; Grimes, C. A. Vertically Aligned Single Crystal $TiO_2$ Nanowire Arrays Grown Directly on Transparent Conducting Oxide Coated Glass: Synthesis Details and Applications. Nano Lett. 2008, 8, 3781-3786. In addition, most heterogeneous growths rely on vapor phase technique utilizing heterogeneous nucleation at very high growth temperatures. See Weng, C. C.; Hsu, K. F.; Wei, K. H. Synthesis of Arrayed, $TiO_2$ Needlelike Nanostructures via a Polystyrene-block-poly(4-vinylpyridine) Diblock Copolymer Template. Chem. Mater. 2004, 16, 4080-4086; and Chen, C. A.; Chen, Y. M.; Korotcov, A.; Huang, Y. S.; Tsai, D. S.; Tiong, K. K. Growth and characterization of well-aligned densely-packed rutile $TiO_2$ nanocrystals on sapphire substrates via metal-organic chemical vapor deposition. Nanotechnology 2008, 19, 075611. Compared to vapor deposition techniques, solution-based methods are more suitable for low-cost commercial scale-up production.

A hydrothermal synthesis procedure is described below which allows the one-step, large scale anisotropic growth of aligned, crystalline brookite $TiO_2$ nanorod arrays adhered on the channel walls of 3D honeycomb monoliths. With increase of hydrothermal treatment time, the brookite nanostructure morphology was identified to evolve from dispersive dandelion $TiO_2$ nanorod clusters to vertically aligned nanorod arrays fully covered on the monolith substrate. The scale-up synthesis of $TiO_2$ nanorod arrays inside the 3D honeycomb monoliths enables a new type of 3D hybrid nanostructured catalyst support, which can be directly applied to various applications, including catalyst supports, particulate matter filters, and environmental remediation and separation devices.

In some embodiments, the metal oxide nanorod array can be vertically aligned relative to the surface of the substrate. In certain embodiments, the metal oxide can be titania ($TiO_2$), such as brookite titania. In other embodiments, the metal oxide can include one of the following: ceria ($CeO_2$), zinc oxide (ZnO), tin oxide ($SnO_2$), alumina ($Al_2O_3$), zirconia ($ZrO_2$), cobalt oxide ($Co_3O_4$), and gallium oxide ($Ga_2O_3$). The substrate can include at least one of the following: a glass substrate, a plastic substrate, a silicon substrate, a ceramic monolith, and a stainless steel monolith. In some embodiments, the ceramic can include one of the following: cordierite, alumina, tin oxide, and titania.

In certain embodiments, the nanorod array structure can further include a perovskite $ABO_3$ (A=La, Ba, Sr, and/or Pb, B=Co, Cr, Fe, Mn, or Ni) shell over each metal oxide nanorod, such as a lanthanum-based transition metal oxide, $LaMO_3$ (M=Co, Cr, Fe, Mn, and Ni), such as lanthanum strontium cobaltate and lanthanum strontium manganate. In other embodiments, the nanorod array structure can further include a metal oxide shell over each metal oxide nanorod, such as a metal oxide including one of the following: ceria ($CeO_2$), zinc oxide (ZnO), tin oxide ($SnO_2$), alumina ($Al_2O_3$), zirconia ($ZrO_2$), cobalt oxide ($Co_3O_4$), and gallium oxide ($Ga_2O_3$). In yet other embodiments, the nanorod array structure can further include an alkaline oxide shell over each metal oxide nanorod, such as a barium oxide and/or potassium oxide shell. In still other embodiments, the nanorod array structure can further include a coating of metal particles over each metal oxide nanorod, such as platinum, gold, palladium, rhodium, and ruthenium.

Another embodiment is a titania nanorod array structure made by the process of mixing an aqueous titanium trichloride solution with saturated sodium chloride to form a precursor solution, submerging a monolithic substrate having a surface and multiple channels in the precursor solution, and heating the substrate and the precursor solution at elevated, relative to ambient, pressure and temperature for a time sufficient to form brookite titania nanorod arrays coupled to the substrate surface via an interface layer, and vertically aligned relative to the substrate surface. The titanium trichloride solution can have a concentration in a range of between about 0.001 M and about 1.0 M, such as about 0.15 M. In some embodiments, heating the substrate and the precursor solution can be conducted in an autoclave, to a temperature in a range of between about 90° C. and about 240° C., such as about 180° C. The time for heating the substrate and the precursor solution can be in a range of between about 4 hours and about 24 hours. Unless otherwise indicated, all ranges defined herein include the endpoints, and all numerical values of the endpoints can be plus or minus 20%. Some embodiments can further include radio frequency (RF) magnetron sputtering lanthanum strontium manganate (LSMO) nanofilm on the brookite titania nanorod arrays, thereby forming LSMO shells over the titania nanorod arrays. Other embodiments can further include submerging the substrate, including the brookite titania nanorod arrays, in a metal colloid solution, followed by drying the substrate, thereby forming metal-loaded brookite titania nanorod arrays on the substrate. The metal can include at least one of the following: platinum, gold, palladium, rhodium, and ruthenium. Yet other embodiments can further include submerging the monolithic substrate, including the brookite titania nanorod arrays, in a metal hydroxide solution, followed by drying the substrate, thereby forming metal-loaded brookite titania nanorod arrays on the substrate. Still other embodiments can further include submerging the monolithic substrate, including the brookite titania nanorod arrays, into a reactor containing $H_2MCl_6$ solution (M=Pt, Au, Pd, Rh, or Ru), and injecting a reductant solution or hydrogen gas into the reactor, followed by drying the substrate, thereby forming metal-loaded brookite titania nanorod arrays on the substrate. The reductant solution can include sodium borohydride.

Yet another embodiment is a nanorod array structure made by the process of submerging a monolithic substrate having a surface and multiple channels in a precursor solution, and heating the substrate and the precursor solution at elevated, relative to ambient, pressure and temperature for a time sufficient to form nanorod arrays coupled to the substrate surface via an interface layer. The precursor solution can be an aqueous metal salt solution, the metal including one of the following: aluminum, cerium, tin, zirconium, cobalt, and gallium. The interface layer can be made of the same materials as the nanorod arrays, or dissimilar materials, which can be grown prior to or during the nanorod growth process.

In still another embodiment, a method of making titania nanorod arrays includes mixing an aqueous titanium trichloride solution with saturated sodium chloride to form a precursor solution, submerging a monolithic substrate having a surface and multiple channels in the precursor solution, and heating the substrate and the precursor solution at elevated, relative to ambient, pressure and temperature for a time sufficient to form brookite titania nanorod arrays coupled to the substrate surface via an interface layer and vertically aligned relative to the substrate surface.

In yet another embodiment, a method of making zinc oxide nanorod arrays includes dip coating a zinc oxide nanoparticle seed film on a monolithic substrate having a surface and multiple channels, annealing the coated substrate, and submerging the coated substrate in a stirred aqueous solution of a zinc salt and a weak base for a time sufficient to form zinc oxide nanorod arrays coupled to the substrate surface via an interface layer. The coated substrate can be annealed at a temperature in a range of between about 200° C. and about 500° C. The time for submerging the coated substrate can be in a range of between about 0.1 hours and about 100 hours. Some embodiments can further include radio frequency (RF) magnetron sputtering cerium oxide nanofilms on the zinc oxide nanorod arrays, thereby forming zinc oxide/cerium oxide composite nanorod arrays. Other embodiments can further include submerging the substrate, including the zinc oxide nanorod arrays, in a metal colloid solution, followed by drying the substrate, thereby forming metal-loaded zinc oxide nanorod arrays on the substrate. Yet other embodiments can further include submerging the monolithic substrate, including the zinc oxide nanorod arrays, in a metal hydroxide solution, followed by drying the substrate, thereby forming metal-loaded zinc oxide nanorod arrays on the substrate. Still other embodiments can further include submerging the substrate, including the zinc oxide nanorod arrays, into a reactor containing $H_2MCl_6$ solution (M=Pt, Au, Pd, Rh, or Ru), and injecting a reductant solution or hydrogen gas into the reactor, followed by drying the substrate, thereby forming metal-loaded zinc oxide nanorod arrays on the substrate.

FIG. 1 shows a set of optical and scanning electron microscopy (SEM) images of 3D cordierite monolith and the $TiO_2$ nanorod arrays synthesized inside the monolith channels by hydrothermal treatment of aqueous titanium trichloride ($TiCl_3$) solutions with saturated sodium chloride (NaCl) at 180° C. for 4 h. FIGS. 1(a) and 1(b) display the top view cross section of monolith. The monolith has a cell density of 400 cells per square inch with a web thickness of about 0.1 mm. FIG. 1(c) shows the side view SEM images of the monolith. It can be clearly seen that the wall surface of the monolith is not a flat surface, but includes a certain porosity. The EDS analysis reveals the monolith to be made of Si, Mg, Al, and Nb. The grown $TiO_2$ nanorods are highly aligned and densely packed on the monolith substrate with a diameter of about 50 nm and a length of about 250 nm (FIGS. 1(c) and 1(d)).

Figures 2A, 2B, 2C, 2D, 2E, 2F:
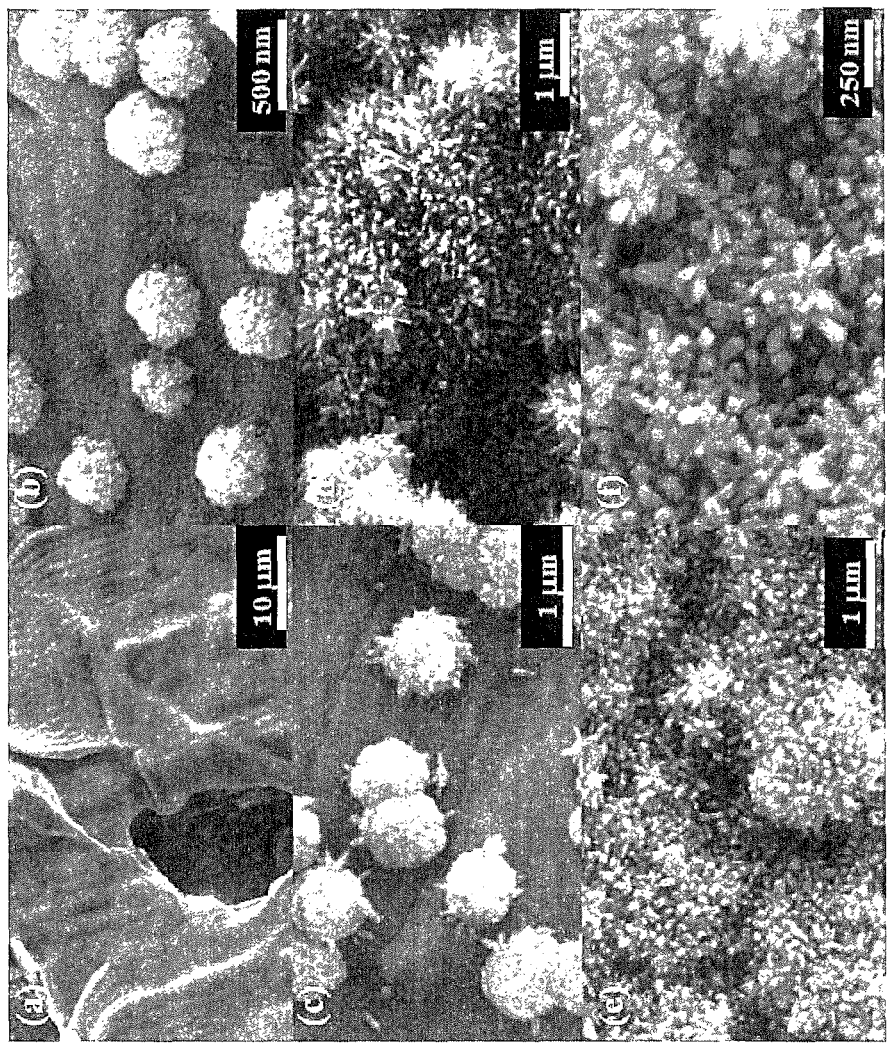
FIGS. 2(a)-2(f) are photographs of SEM images of $TiO_2$ nanostructures grown on 3D honeycomb monolithic substrates using 2 mL of $TiCl_3$, and 18 mL of NaCl-saturated DI water at 180° C. for different times.

To investigate the growth behavior of $TiO_2$ nanorods inside the 3D cordierite monolith, hydrothermal treatment times of 1, 1.5, 2, 4 and 24 hours (h) were applied and the evolution of $TiO_2$ nanostructures was examined by an array of SEM imaging analysis (FIG. 2). With 1 h growth time, no obvious $TiO_2$ nanostructures grew on the wall surface of monolith, as indicated in the SEM image in FIG. 2(a). Prolonging the reaction time to 1.5 h, the $TiO_2$ nanorod clusters were grown on the wall surface with a dandelion-like morphology with diameters in the range of 250-350 nm (FIG. 2(b)). The $TiO_2$ nanorod clusters included many close-packed $TiO_2$ nanorods grown in a radially outward direction. Further prolonging the reaction time to 2 h, the $TiO_2$ nanorod clusters grew even bigger with diameters in the range of 400-500 nm (FIG. 2(c)). At high magnification (FIG. 2(c)), some nanorods in the $TiO_2$ nanorod clusters grew longer than others and clearly out of the dandelion-like sphere surface. More interestingly, some individual $TiO_2$ nanorods directly grew out of the substrate surface as indicated by the boxes in FIG. 2(c). When the reaction time increased to 4 h, highly aligned $TiO_2$ nanorod arrays grew on the cordierite substrate surface. FIG. 2(d) shows the SEM image taken on an extremely rough surface of the substrate. It certainly confirmed the $TiO_2$ nanorods grew everywhere on the monolith surface, even on the porous surface in the substrate. When the reaction time was further increased to 24 h, no obvious morphology change was observed on the $TiO_2$ nanorod arrays.

As shown by the low magnification SEM images in FIGS. 3(a) and 3(b), the $TiO_2$ nanostructures dispersively grew on the monolith after hydrothermal treatment for 1.5 and 2 h (FIGS. 3(a) and 3(b)), which confirmed that the dandelion $TiO_2$ nanorod clusters were grown all over the substrate with a very uniform distribution. The $TiO_2$ nanorods assembly and morphology were further characterized by transmission electron microscopy (TEM). FIG. 3(c) shows the low-resolution TEM image of a typical $TiO_2$ nanorod cluster grown for 2 h. The dandelion-like sphere morphology and an out-grown $TiO_2$ nanorod (identified in the rectangular box in FIG. 3(c)) were clearly identified. The diameter of the single $TiO_2$ nanorod is about 8-10 nm. The high-resolution TEM images in FIGS. 3(d) and 3(e) revealed the body and top portions of the $TiO_2$ nanorods, respectively. A clear set of lattice fringes was revealed with 0.34 nm spacing, suggesting the single crystalline nature of the grown $TiO_2$ nanorods. The electron diffraction (ED) pattern (FIG. 3(f)) in a distinct ring form confirms the brookite structure of grown $TiO_2$ nanorods after 2-hour hydrothermal treatment. The lattice fringes spacing of 0.34 nm can be assigned to the interplanar distance of single crystalline brookite $TiO_2$ (111).

FIG. 4(a) shows the low-resolution TEM image of $TiO_2$ nanorods grown inside the 3D honeycomb monolith for 4 h. Compared with the TEM image of FIG. 3(c), no $TiO_2$ nanorod clusters were found when the hydrothermal treatment time is applied for 4 h, indicating the conversion of dandelion-like $TiO_2$ nanorod clusters into aligned $TiO_2$ nanorod arrays. FIGS. 4(b) and 4(c) show the high-resolution TEM images of the body and top portions of a typical $TiO_2$ nanorod. The atomic planes corresponding to (111) are clearly visible with the same interplanar distance of 0.34 nm, suggesting the single crystalline nature of the brookite $TiO_2$ nanorods grown after hydrothermal treatment for 4 h. The distinct ring-form ED pattern (inset of FIG. 4(a)) further confirmed the good crystallinity and brookite structure of $TiO_2$ nanorods.

Figure 5:
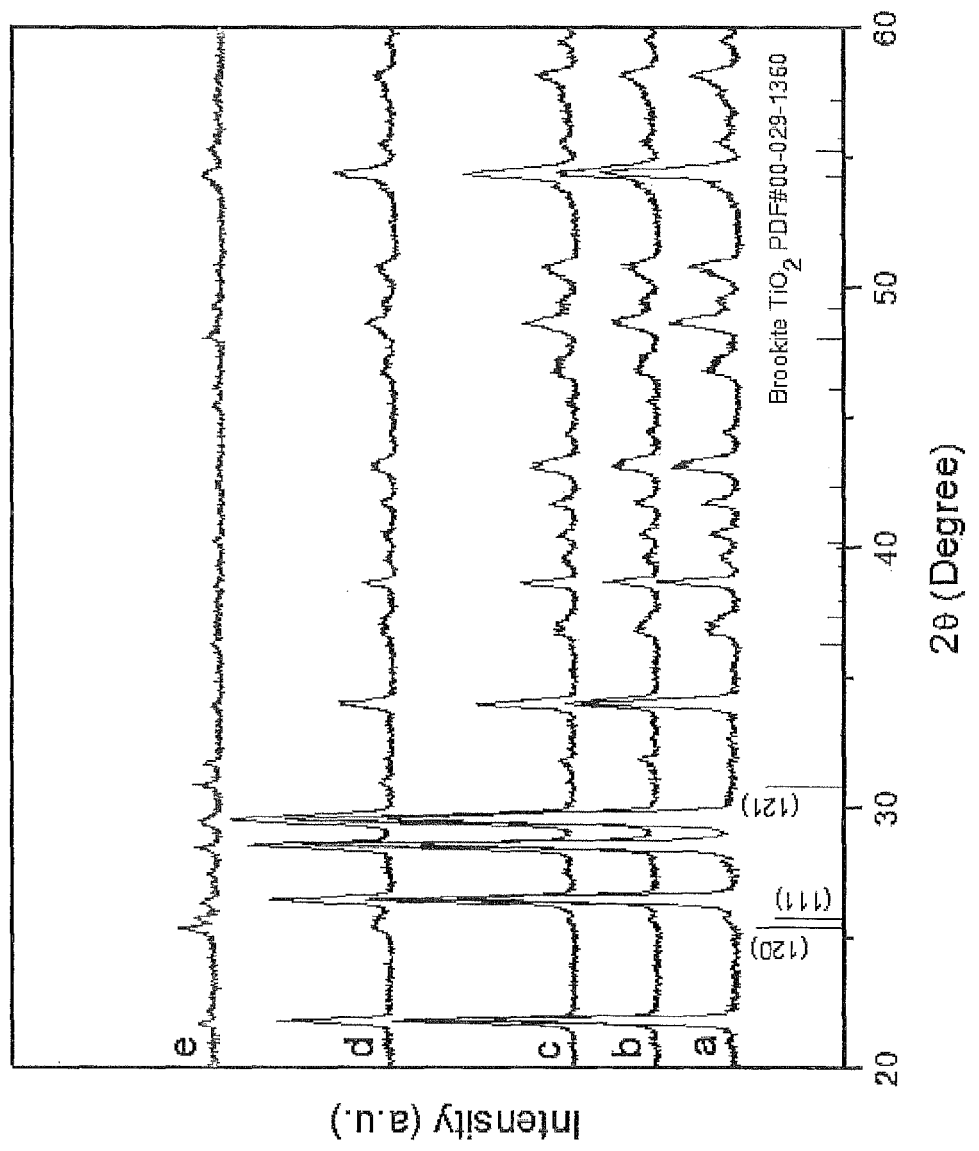
FIG. 5 shows superimposed graphs (a)-(e) of XRD patterns of (a) the honeycomb monolithic substrate, and the samples of $TiO_2$ nanorods grown inside the 3D honeycomb monolithic substrate prepared at 180° C. for (b) 1.5 h, (c) 2 h, (d) 4 h, and (e) 24 h, respectively.

The brookite crystal structure of the grown $TiO_2$ nanorods at different hydrothermal treatment times was further confirmed by X-ray diffraction (XRD) analysis. FIG. 5 shows the XRD patterns of the bare honeycomb monolith and the synthesized $TiO_2$ nanostructures inside the honeycomb monolith. Since the honeycomb monolith is a mixed oxide cordierite of $SiO_2$, $MgO$, $Al_2O_3$ and $Nb_2O_5$, some characteristic peaks of the honeycomb monolith overlap with the diffraction peaks of brookite $TiO_2$. As shown in FIG. 5, when the hydrothermal time is less than 4 h (spectra (b) and (c)), no significant $TiO_2$ diffraction peaks appeared in the corresponding XRD pattern, although the $TiO_2$ nanorod clusters were obtained on the substrate surface according to the SEM imaging (FIGS. 3a and 3b). This might be due to their dispersive distribution (FIGS. 2b and 2c)), and the extremely strong intensity from the exposed monolith substrate. However, with increasing hydrothermal time, the weakening intensities from the substrate is accompanied by the enhanced intensities from the brookite $TiO_2$. As the hydrothermal treatment time increased to 4 h, two weak peaks appeared in diffraction spectrum d in FIG. 5 at about 25.4° and 25.7° corresponding to brookite (012) and (111), respectively (JCPDS No. 00-029-1360), which do not overlap with any diffraction peaks of the substrate. As the hydrothermal treatment time further increased to 24 h, the peaks in brookite (012) and (111) in diffraction spectrum e shown in FIG. 5 became more significant with higher intensities than those of the substrate, suggesting a complete coverage of $TiO_2$ nanorod arrays on the monolith as well as the further improved crystallinity.

Brookite $TiO_2$ with different morphologies has been reported in the literature. For example, Cozzoli et al. synthesized anisotropically shaped brookite $TiO_2$ nanocrystals using a surfactant-assisted nonaqueous strategy. See Buonsanti, R.; Grillo, V.; Carlino, E.; Giannini, C.; Kipp, T.; Cingolani, R.; Cozzoli, P. D. Nonhydrolytic Synthesis of High-Quality Anisotropically Shaped Brookite $TiO_2$ Nanocrystals. J. Am. Chem. Soc. 2008, 130, 11223-11233. A self-regulated phase-switching seed-catalyzed mechanism was proposed to explain the heterogeneous nucleation of brookite $TiO_2$ on the initially generated c-axis-elongated anatase $TiO_2$ and the anatase-to-brookite conversion. Sun et al. prepared high-quality brookite $TiO_2$ flowers in the presence of NaOH by a solution chemistry technique. See Hu, W.; Li, L.; Li, G.; Tang, C.; Sun, L. High-Quality Brookite $TiO_2$ Flowers: Synthesis, Characterization, and Dielectric Performance. Cryst. Growth Des. 2009, 9, 3676-3682. Hu et al. proposed three steps for the synthesis of flower-like brookite $TiO_2$: (1) the transformation of layer structured titania into brookite nanoparticles, (2) the evolution of brookite particles to the spindle-like shape, and (3) the assembly of these spindle-like particles into flower-like $TiO_2$. Without wishing to be bound by any particular theory, the formation of the aligned $TiO_2$ nanorod arrays on 3D honeycomb monoliths according to example embodiments disclosed herein can be different from the immediately aforementioned mechanisms.

According to the time-dependent morphology evolution evidence shown here (FIGS. 2-4), the formation of multi-nanostructures and morphology evolution from dandelion $TiO_2$ nanorod clusters to aligned nanorod arrays can be expressed as a heterogeneous nucleation-dissolution-crystallization mechanism. Generally, titanium tetrachloride ($TiCl_4$) or titanium alkoxides ($Ti(OR)_4$) are used as a titanium source to synthesize $TiO_2$. However, the reaction rate of Ti(IV) in forming $TiO_2$ is too fast. A high degree of supersaturation is obtained due to the production of many nuclei in the solution, which accelerates the homogeneous nucleation to produce $TiO_2$ nanoparticles. In this application, a low degree of supersaturation was achieved by using $TiCl_3$ as the titanium precursor due to the slow oxidation of Ti(III) by dissolved oxygen. The low degree of supersaturation promotes the heterogeneous nucleation of $TiO_2$ on the wall surface of the honeycomb monolith. See Hosono, E.; Fujihara, S.; Kakiuchi, K.; Imai, H. Growth of Submicrometer-Scale Rectangular Parallelepiped Rutile $TiO_2$ Films in Aqueous $TiCl_3$ Solutions under Hydrothermal Conditions. J. Am. Chem. Soc. 2004, 126, 7790-7791; and Hosono, E.; Fujihara, S.; Kakiuchi, K.; Imai, H.; Honma, I.; Zhou, H. One-Step Synthesis of Nano-Micro Chestnut $TiO_2$ with Rutile Nanopins on the Microanatase Octahedron. ACS Nano 2007, 1, 273-278. Furthermore, a high concentration of chlorine ions in the solution helps the formation of brookite $TiO_2$, and also avoids the conversion of brookite into rutile after prolonging the hydrothermal treatment time. See Pottier, A.; Chanéac, C.; Tronc, E.; Mazeroles, L.; Jolivet, J. Synthesis of Brookite $TiO_2$ Nanoparticles by Thermolysis of $TiCl_4$ in Strongly Acidic Aqueous Media. J. Mater. Chem. 2001, 11, 1116-1121. The brookite structure was obtained at the very beginning of the reaction (FIG. 3) and prolonging the reaction time from 4 h to 24 h did not change the brookite structure but improved its crystallinity, as shown in FIG. 5. With the increase in hydrothermal time, the hydrothermal conditions became more acidic, which might make the not-well-crystallized $TiO_2$ nanorods dissolve and the dissolved $TiO_2$ in the solution might nucleate onto the existing nanorods, which is confirmed by the change of $TiO_2$ morphology from closely packed nanorod clusters to sparsely aligned arrays.

Figure 6A:
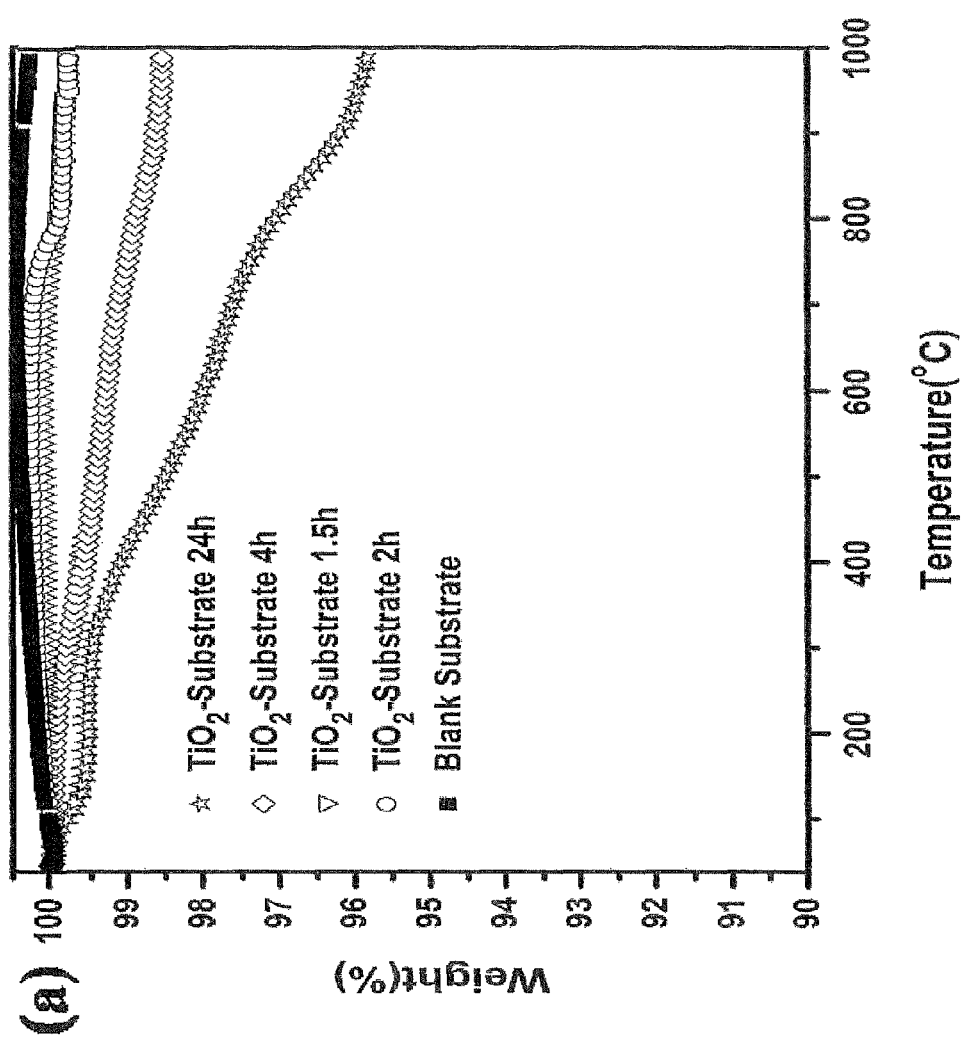
FIGS. 6(a)-6(b) are graphs of TGA in FIG. 6(a) and DSC in FIG. 6(b) spectra of $TiO_2$ nanorods grown inside the 3D honeycomb monolithic substrates prepared at 180° C. for 1.5 h, 2 h, 4 h, and 24 h.
Figure 6B:
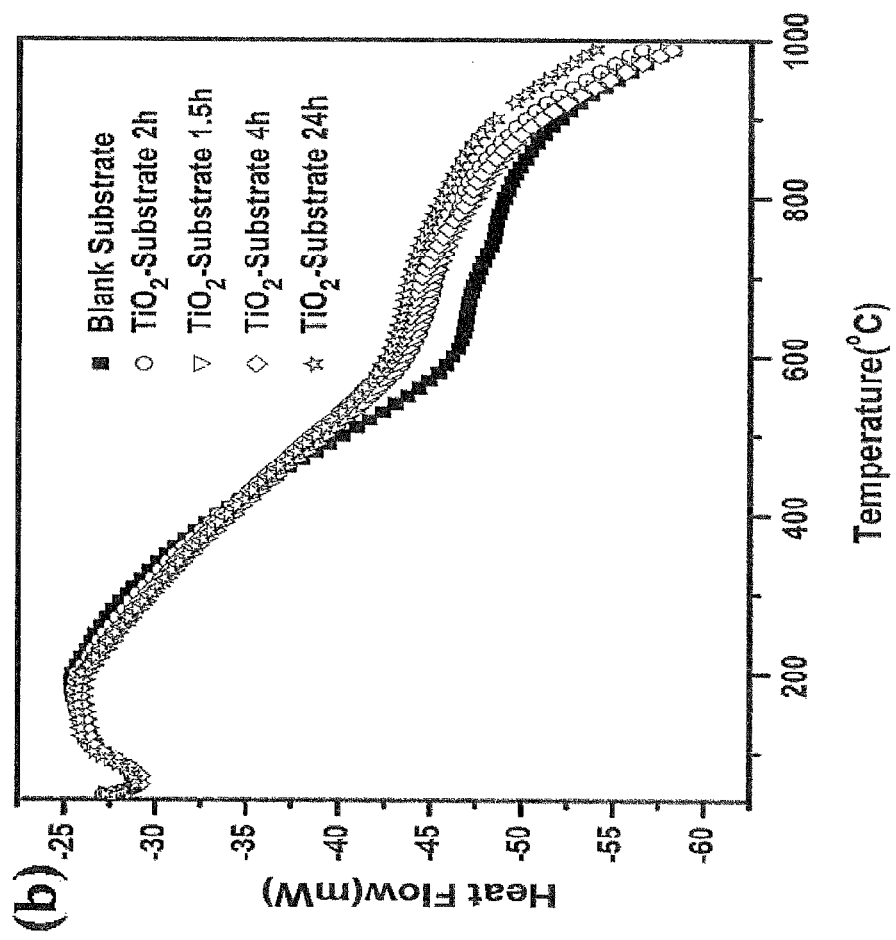

To look into the thermal stability of $TiO_2$ nanorod arrays coated onto hybrid monolith substrates, thermo-gravimetric analysis (TGA) and differential scanning calorimetry (DSC) were carried out in ambient condition. The TGA and DSC curves are plotted in FIG. 6. Blank honeycomb monolith substrate is very stable over the whole temperature range that was investigated. During the thermal analysis, different samples exhibit different degrees of weight loss. $TiO_2$ samples grown for 1.5 and 2 h showed a similar weight loss with less than 1% in total. That is possibly due to their similar cluster morphology and relatively low density distribution. $TiO_2$ nanorod arrays grown for 4 h had less than 2% weight loss, while the $TiO_2$ nanorod arrays grown for 24 h had the highest weight loss of 3.5%. However, the highest weight loss was just about 3%, which suggests that $TiO_2$ nanorods arrays on the honeycomb monolith substrates are very stable in the temperature range of 20-800° C. The weight loss in the temperature range of 40-250° C., about 2% for the sample grown for 24 h, is attributed to the evaporation of $H_2O$ absorbed in the $TiO_2$ nanorods arrays. The peak at 700-800° C. might be contributed by the phase transition of $TiO_2$ nanorod from brookite to rutile structure. Clearly, the main weight loss is contributed by the loss of $H_2O$ absorbed on $TiO_2$. All DSC data exhibited almost the same plot, further proving that the main mass loss was caused by loss of $H_2O$.

The specific BET surface area of $TiO_2$ nanorod arrays on honeycomb monolith grown for different times was also investigated, and the results are listed in Table 1.

TABLE 1

Multi-point nitrogen adsorption BET specific surface area of TiO₂ nanorods grown on honeycomb monolith substrate

| Sample | Blank-substrate | TiO$_2$-substrate (1.5 h) | TiO$_2$-substrate (2 h) | TiO$_2$-substrate (4 h) | TiO$_2$-substrate (24 h) |
|---|---|---|---|---|---|
| Surface Area (m$^2$/g, with substrate) | 24.123 | 23.264 | 32.733 | 68.251 | 82.934 |
| Surface Area (m$^2$/g, without substrate)* | 0 | 66.584 | 358.750 | 527.810 | 641.360 |

*BET Surface Area (estimate without substrate) were calculated according to the following rule: a) Assuming TiCl₃ was completely converted into TiO₂ grown on the substrate. b) For growth time shorter then 4 h, TiO₂ nanorods array not completely covered the substrate from SEM, so S = (S$_{TiO2-substrate}$ − S$_{Blank-substrate}$) * M$_{TiO2-substrate}$/m$_{TiO2}$. c) For growth time longer than 4 h, TiO₂ nanorods arrays completely covered the substrate from SEM, so S = S$_{TiO2-substrate}$ * m$_{TiO2-substrate}$/m$_{TiO2}$ As shown in Table 1, TiO$_2$ nanostructures grown for 1.5 h have a relatively low BET surface area. That may be caused by the lower coverage of TiO$_2$ nanorod clusters on the monolith substrate. BET surface area of TiO$_2$ nanostructures grown for 2 h is larger (see Table 1) than that of the sample synthesized for 1.5 h. This could be attributed to the higher aspect ratio of single nanorods grown out of the nanoclusters and higher TiO$_2$ coverage on the monolith. Although having similar nanorod array structure, the BET surface area of TiO$_2$ nanostructures grown for 24 h is larger than the surface area of the sample grown for 4 h, which is due to the larger aspect ratio of TiO$_2$ nanorods with increasing growth time. As shown in Table 1, the specific surface area of honeycomb monolith substrate increases after the deposition of TiO$_2$ nanorods. With the increasing growth time, the surface area increases drastically to 3-4 times that of bare substrate. It is worth noting from the data shown in Table 1 that the grown TiO$_2$ nanorod arrays have a specific surface area as high as about 700 m$^2$/g, about 3 times higher than the normal hydrolysis derived anatase TiO$_2$ nanoparticles.

Figure 7:
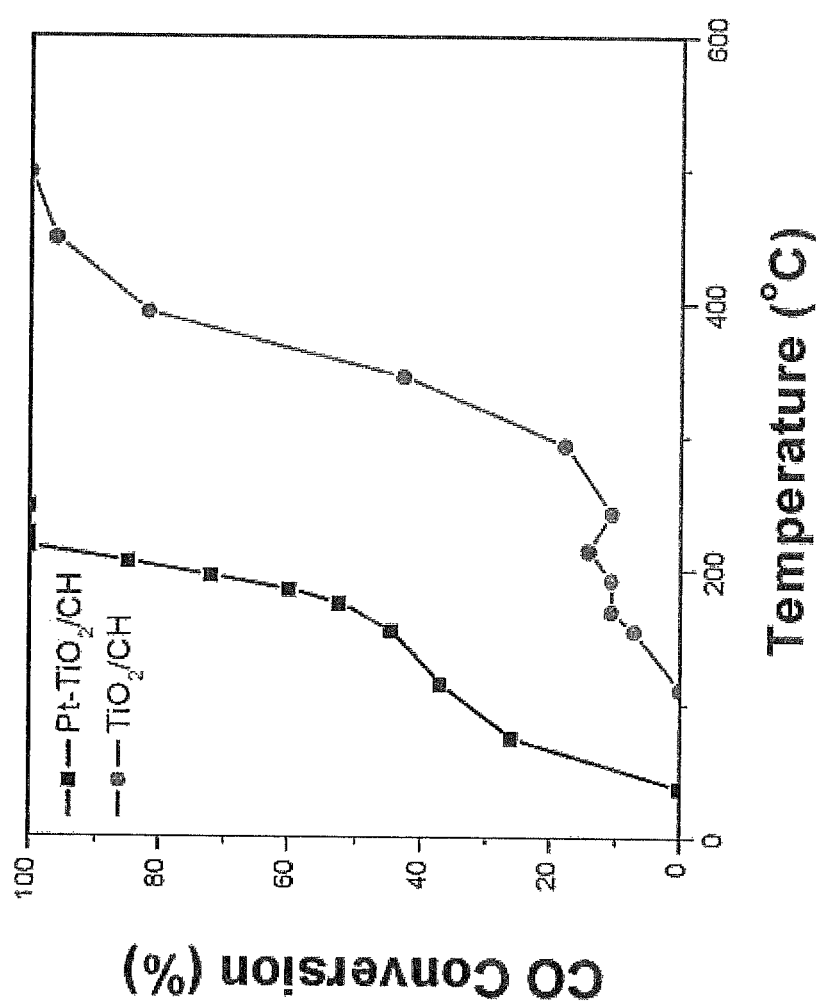
FIG. 7 is a graph of CO conversion (%) as a function of temperature for a $TiO_2$ nanorod-based 3D nanocatalyst, showing that the onset temperature for CO oxidation for the Pt—$TiO_2$/CH nanocatalyst is 50° C. less than that for the $TiO_2$/CH nanocatalyst, and the $T_{50}$ (temperature of 50% CO conversion) for Pt—$TiO_2$/CH nanocatalyst is 170° C., while the $T_{50}$ for the $TiO_2$/CH nanocatalyst is 350° C., as a result of Pt loading.
Figure 9B:
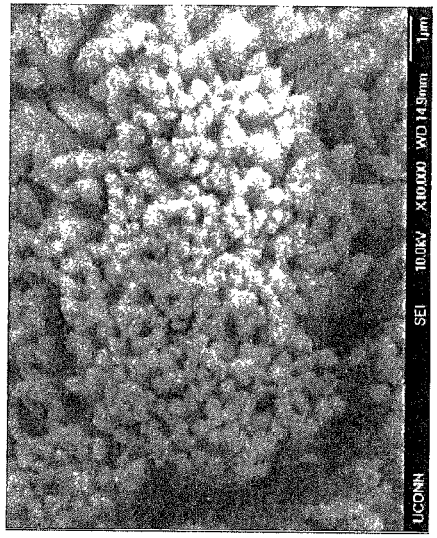
FIGS. 9(a)-9(d) are photographs of SEM images of $CeO_2$ nanorods on a stainless steel substrate.
Figure 9D:
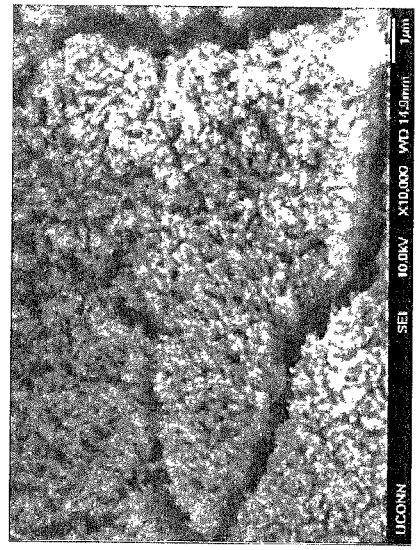
Figure 9A:
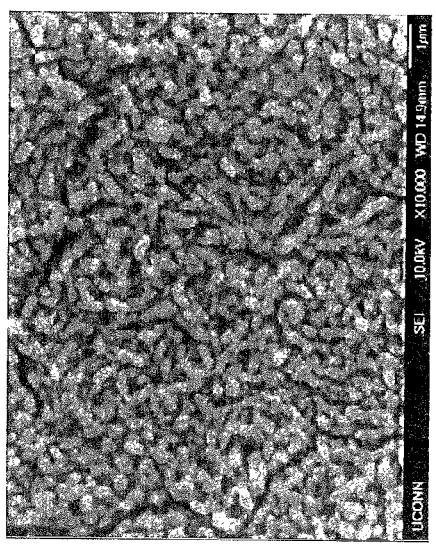
Figure 9C:
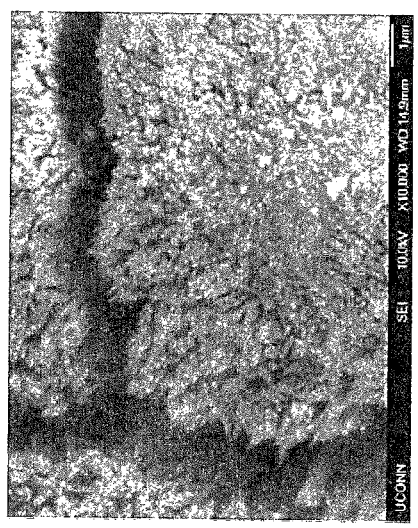

Single crystalline brookite TiO$_2$ nanorod arrays were grown uniformly on the inner walls of 3D honeycomb monolith by a hydrothermal approach. The evolution of TiO$_2$ nanorod clusters to TiO$_2$ nanorod arrays were observed while changing the hydrothermal treatment time. Slow oxidation of Ti(III) to Ti(IV) results in the maintenance of a low degree of supersaturation, which promotes the heterogeneous nucleation of brookite TiO$_2$ on the wall surface of honeycomb monolith. In addition, the presence of excess Cl$^-$ helps the formation of brookite TiO$_2$ and maintains the brookite crystal structure. The synthesized TiO$_2$ nanorods-based hybrid nanocatalyst support have high surface area and good thermal stability, which can be applied in various energy and environmental applications such as emission control, industrial filtering, purification, and separation. An example of CO oxidation results with a TiO$_2$ nanorod-based 3D nanocatalyst is shown in FIG. 7. Other applications of nanorod structures are listed in Table 2.

FIGS. 8A-F show examples of cordierite and stainless steel substrates (FIG. 8A), and higher magnification SEM images of cordierite substrate channels (FIG. 8B) and stainless steel substrate channels (FIG. 8C), as well as top view images of TiO$_2$, ZnO, and Al$_2$O$_3$ nanorod arrays (FIGS. 8D, 8E, and 8F, respectively) grown on cordierite or stainless steel substrates.

TABLE 2

Nanorod Array Materials Applications

| Materials | Applications | Remarks |
|---|---|---|
| ZnO | Catalysts | ZnO/Cu industry methanol synthesis and water-gas shift catalysts; Photocatalysts. |
| | Desulfur and De-As filter | Typical industry syngas desulfur absorber (H$_2$S); As-ion removal in water treatment; ZnO—NiO petroleum industry oil desulfur catalysts; Cigarette filters. |
| | Electrodes | Transparent electron transport layer in solar cell and electronic devices. |
| | Personal care | Antibacterial lotion; an ingredient in sunscreen; |
| | Sensors | Gas sensors; biological sensors. |
| | Actuators/MEMS | Piezoelectric devices |
| TiO$_2$ | Catalysts | Catalytic supports in automobile exhaust emission system; Photocatalysts for H$_2$ generation, organic pollute degradation. |
| | Sensors | Gas sensors and humidity sensors |
| | Personal care | an ingredient in sunscreen; |
| | Electrode | Main components in dye-sensitized solar cell. |
| CeO$_2$ | Catalysts | Automobile emission control: CeO$_2$—ZrO$_2$ for NO$_x$ storage/Reduction |
| | Electrode materials for sensors | Environmental monitoring: O$_2$, NO$_2$, SO$_2$, etc. |
| | Oxygen conductors | Solid oxide fuel cells: CeO$_2$—Y$_2$O$_3$ |
| | Personal care | Ultraviolet blocking component in cosmetics |
| | Abrasives | Chemical-mechanical planarization: single-crystal ceria nanospheres |
| | High temperature superconductive materials | CeO$_2$ as an insulating layer |
| Al$_2$O$_3$ | Catalysts | Supports for catalytically active metals |
| | Gate oxides | Dielectric materials for electronics |
| Co$_3$O$_4$ | Electrode Catalysts | Li-ion Battery electrodes, industrial catalysts and supports |
| LSMO, LSCO | catalysts | Gas phase catalysis |
| | Electrical and electrochemical | surface conductivity or ionic conductivity change (through solid electrolyte) upon exposure to various |

TABLE 2-continued

Nanorod Array Materials Applications

| Materials | Applications | Remarks |
|---|---|---|
| | Sensors | gases |
| | Fuel cell electrodes | High/medium temperature solid oxide fuel cell |
| | Magnetic sensing and information storage | Colossal magetoresistance effect |
| Pt, Au, Pd | Catalysts | Main catalytic active site in all kinds of catalysts. |
| | Sensors | Electrodes and sensitivity/selectivity enhancement |
| BaO, $K_2O$, $Li_2O$ | catalysts | NOx storage materials. |

In still another embodiment, a method of making metal oxide nanowire arrays includes electrodepositing metal oxide onto a substrate having a surface and multiple channels from an electrolytic solution of metal-chloride or -nitrate and potassium chloride, the metal oxide nanowire arrays being coupled to the substrate surface via an interface layer. The concentration of metal-chloride or -nitrate and potassium chloride can each independently be in a range of between about 0.001 M and about 1.0 M. The electrodeposition can be conducted at a temperature in a range of between about 25° C. and about 90° C., such as about 70° C. The metal oxide can be selected from the group consisting of: cerium oxide, zinc oxide, titania, zirconia, and tin oxide. Electrodeposition parameters for making exemplary metal oxide nanowire arrays are listed in Table 3.

microscopy (FESEM; JEOL 6335F Field Emission SEM) equipped with a Thermo Noran EDS detector, and by high-resolution transmission electron microscopy (HRTEM; JEOL 2010 FasTEM). The crystal structures were examined by X-ray diffraction (XRD) analysis with a Rigaku MiniFlex II Desktop X-ray Diffractometer.

BET Surface Area and Thermal Stability Measurements.

The BET surface area was characterized using Quantachrome Corporation NoVA 1000 Gas Sorption Analyzer. The thermal stability of samples was investigated using TA instruments SDT Q600.

3-Step Process Example: ZnO/LSCO/BaO Composite Nanowire Arrays on Cordierite or Other Substrates.

Dip-Coating of $ZnAc_2+350°$ C. Annealing, 5-10 Cycles; Sonication Helps Uniformity.

TABLE 3

Electrodeposition parameters of metal oxide nanorod/wire arrays.

| Metal Oxide | Precursor | Precursor Concentration (M) | Additive | Additive Concentration (M) | Electrodeposition method | Electrodeposition Temperature (° C.) | Electrodeposition Time (h) |
|---|---|---|---|---|---|---|---|
| $CeO_2$ | $Ce(NO_3)_3$ or $CeCl_3$ | 0.001-1 | KCl or $NH_4Cl$ or $NH_4Ac$ | 0.01-1 | Galvanostatic or Potentiostatic | 25-90 | 0.25-5 |
| ZnO | $Zn(NO_3)_2$ or $ZnCl_2$ | | | | | | |
| $TiO_2$ | $TiCl_3$ | | | | | | |
| $SnO_2$ | $SnCl_2$ or $Sn(NO_3)_3$ | | | | | | |
| $ZrO_2$ | $ZrCl_3$ or $Zr(NO_3)_3$ | | | | | | |

EXEMPLIFICATION

Materials and Methods
Preparation of Single Crystalline Brookite $TiO_2$ Nanorod Arrays on Ceramic Monoliths.

Nanostructured brookite $TiO_2$ was synthesized by hydrothermal treatment of aqueous titanium trichloride ($TiCl_3$) solutions with saturated sodium chloride (NaCl). The dilute solution of $TiCl_3$ (0.15 M) was supplied by Spectrum Chemical MFG. Corp. Typically, 20 ml of the precursor solution, including 2 ml of $TiCl_3$ solution and 18 ml of deionized (DI) water saturated with NaCl, was placed in a Teflon-lined autoclave. Honeycomb cordierite monoliths were used as substrates and were put in the solutions. The solutions were then heated at 180° C. for 1-24 h. Then, the autoclave was cooled to room temperature. The honeycomb monoliths were taken out, rinsed thoroughly with deionized water and allowed to dry on a hot plate at 80° C.

Scanning Electron Microscopy, Transmission Electron Microscopy and X-Ray Diffraction.

The morphologies of the synthesized $TiO_2$ nanostructures were characterized by field-emission scanning electron The monolith substrate was first rinsed by deionized water and ethanol in ultrasonic bath and then coated (via dip-and-dry) with 1-100 mM, such as about 10 mM, zinc acetate ($ZnAc_2$) in ethanol solution. After the sample was dipped into the zinc acetate ethanol solution, the solution with the sample was then put into an ultrasonic bath for 0.5-10 minutes, such as about 5 minutes. The substrate was then heated and dried on hotplate at 120-200° C. for 1-10 minutes. The previous steps were repeated for 3-10 times to ensure enough seed nanoparticles stick onto the substrate surface. The dip-coated substrate was then annealed at 300-400° C., such as about 350° C., for 1-10 hours, such as about 2 hours.

Then, after the film position, the ZnO seed layer coated substrate was put into a covered glass bottle containing an aqueous solution of a precursor made of equal molar amounts of $Zn(NO_3)_2$ and hexamethylenetetramine (HMT) of a concentration in a range of between about 5 mM and about 100 mM, such as about 10 mM, dissolved in 100-1000 mL of deionized water. The pre-annealed dip-coated substrate was then grown in the prepared precursor at different temperature, in a range of between about 60° C. and about 95° C., such as about 80° C. After about 1-10 hours, such as about 5 hours, the substrate grown with ZnO nanorods was taken out and cleaned in an ultrasonic bath with water or ethanol for 1-20 minutes, such as about 5 minutes. Finally, the sample was dried at 70-95° C., such as about 80° C., in air for further processing. The length of ZnO nanorods was mainly controlled by its growth time. Other precursor solutions, temperatures, and growth duration times for hydrothermal synthesis of the respective nanorod arrays are listed in Table 4.

TABLE 4

Hydrothermal synthesis of various metal oxide nanorod arrays

| Nanowires | Cation-contained precursors | Temperature (° C.) | Duration time (hours) |
|---|---|---|---|
| $SnO_2$ | $SnCl_2$ or $Sn(NO_3)_2$ | 160-240 | 6-72 |
| $ZrO_2$ | $ZrCl_3$ or $Zr(NO_3)_3$ | 180-240 | 6-72 |
| $Al_2O_3$ | $AlCl_3$ or $Al(NO_3)_3$ | 160-240 | 12-48 |
| $CeO_2$ | $CeCl_3$ or $Ce(NO_3)_3$ | 120-200 | 12-36 |
| $Ga_2O_3$ | $Ga(NO_3)_3$ | 120-240 | 6-48 |
| $Co_3O_4$ | $Co(NO_3)_2$ | 50-180 | 1-24 |

Dip-Coating of LSCO+BaO Precursor Solution Followed by 700-800° C. Annealing, 5-10 Cycles; Stirring Helps Uniformity.

For the deposition of LSCO and BaO thin films onto the ZnO nanorod arrays, a LSCO+BaO precursor solution was prepared by dissolving lanthanum nitrate hexahydrate (La(NO$_3$)$_3$.6H$_2$O, 1-20 mM, such as about 5 mM), strontium nitrate (Sr(NO$_3$)$_2$, 0.1-10 mM, such as 0.5 mM), cobalt nitrate (Co(NO$_3$)$_3$, 1-20 mM, such as about 5 mM), and barium nitrate (Ba(NO$_3$)$_2$, 1-20 mM, such as about 5 mM) in ethoxyethanol (100 mL) under vigorous stirring and sonication at about 50-70° C., such as about 60° C. Suitable amounts of polyvinylpyrrolidone (Mw 55000, 0.1-2 gram, such as about 0.5 mM) and diethanolamine (0.5-10 mL) were added to make the suspension solution transparent, which was followed by an aging process of 2-4 days. Then, the nanorod coated substrate was dipped into the precursor solution, the solution with the substrate was sonicated for 0.5-5 minutes, such as about 1 minute, and then the substrate was dried at 120-200° C. for 1-10 minutes, such as about 5 minutes, followed by annealing at 250-400° C. for 0.2-1.0 hours, such as about 0.5 hours, and 600-800° C., such as about 700° C., for 0.5-2 hours to ensure good crystallinity and adhesion of the coating. Depending on the thickness requirement, 1-10 cycles of dipping and drying were needed before the annealing. BaO can be loaded after LSCO deposition as well, which become the fourth step.

For the loading of K$_2$O, the precursor used is KNO$_3$, with concentration of 1-20 mM depending on the loading amount. The experimental procedure is similar to the LSCO and BaO loading procedure described above.

Synthesis of CeO$_2$ Nanowires on Stainless Steel Substrates. Electrochemical Deposition Electrochemical preparation was carried out in a conventional three-electrode cell via galvanostatic electrodeposition. The working electrodes were stainless steel substrates. A platinum wire was used as the auxiliary electrode. An Ag/AgCl electrode was used as the reference electrode. The electrolytic solution contained CeCl$_3$ (0.001-0.1 M). All reagents used were analytical grade and were used directly without any purification. The reaction temperature was kept at 70° C. SEM images of CeO$_2$ nanorods on a stainless steel substrate are shown in FIGS. 9(a)-(d).

Loading of Precious Metal (Pt, Au, Pd, Ru, Etc)—Pt Deposition Used as Example

Method 1: Colloidal Deposition Method

The preparation of the Pt/MO$_x$ nanorods catalyst was performed by the colloidal deposition method. Firstly, unprotected Pt nanoparticle colloid was synthesized by an ethylene glycol (EG) method known in the art. Typically, all operations were carried out under inert atmosphere (Ar or N$_2$). In a typical preparation, a glycol solution of NaOH was added into a glycol solution of H$_2$PtCl$_6$.6H$_2$O with stirring to obtain a transparent yellow platinum hydroxide or oxide colloidal solution, which was then heated at 160° C. for 3 h, with an Ar flow passing through the reaction system to take away water and organic byproducts. A transparent dark-brown homogeneous colloidal solution of the Pt metal nanocluster was obtained without any precipitate. For deposition, as prepared Pt colloid was diluted by adding 19 times EG solvent. Secondly, cordierite monolith substrate with TiO$_2$ nanorods grown on it was placed in the Pt colloid solution for 20 minutes with magnetic stirring. Then the sample was taken out and dried at 100° C. in air. After repeating the procedure 3 times, Pt/TiO$_2$ nanorods catalysts grown directly on cordierite monolith substrate were obtained.

Method 2: Impregnation Method.

A monolith substrate with MO$_x$ nanorods was place in Pt(OH)$_x$ solution for 20 mins with magnetic stirring. Then the sample was taken out and dried at 500° C. in air. After repeating the procedure for 3 times, Pt/MO$_x$ nanorods catalysts grown directly on cordierite monolith substrate were obtained.

Method 3: In-Situ Reduction Method.

The monolith substrate with MO$_x$ nanorods and PVP solution as a stabilizer were added into H$_2$PtCl$_6$ solution. A reductant solution (NaBH$_4$) was injected into the H$_2$PtCl$_6$ solution. Meanwhile, hydrogen gas was also injected into the rector to vigorously stir the solution and to make the reaction homogeneous. The synthesis process was stopped after complete consumption of the NaBH$_4$ solution. Then, the product was filtered and washed until Cl$^-$ was completely removed according to a test with AgNO$_3$, and the final products were dried in an oven to obtain the desired Pt/MO$_x$ nanorods catalysts.

Heterogeneous Nanowire Array Growth Procedures.

Depending on the number of compounds or layers involved in the multi-component heterogeneous nanowires, the growth procedure of heterogeneous nanowires will involve the corresponding number of growth processes. Taking ZnO/LaCoO$_3$/Pt nanowire as example, three steps will be involved in the fabrication process:

Step 1: hydrothermal synthesis of ZnO nanowires;
Step 2: physical vapor deposition (pulsed laser deposition (PLD) or sputtering) or sol-gel deposition of LaCoO$_3$ nanoparticles onto ZnO nanowires;
Step 3: impregnation or colloidal deposition method is used to growth Pt nanoparticles onto the formed ZnO nanowires.

Similarly, TiO$_2$/LaCoO$_3$/Pt nanowire arrays on monolith substrates can be fabricated using hydrothermal, sol-gel (or PLD, sputtering) and impregnation methods.

Further, TiO$_2$/LaCoO$_3$/BaO(K$_2$O)/Pt nanowire arrays on monolith can be fabricated simply using a combination of hydrothermal, sol-gel (PLD) and impregnation.

Another Example of TiO$_2$ Nanorods Arrays on 3-D Cordierite Substrate.

Recent studies on sulfur durability of NO$_x$ storage/reduction (NSR) catalysts have reported that TiO$_2$ in support materials provides high tolerance against sulfur poisoning due to the high acidity/low basicity of $TiO_2$. Since $TiO_2$ has high thermal stability and high surface area, it is an ideal matrix for 3-D nanostructured NSR catalysts. $TiO_2$ nanorod arrays were grown on 3-D cordierite substrate by a hydrothermal method. As-synthesized $TiO_2$ nanorods arrays show a highly uniform, aligned and densely packed array of nanorods on the inside wall of ceramic honeycomb substrate (FIG. 10A). The morphology of $TiO_2$ nanorods was quite uniform with diameter in a range from 50 nm-130 nm and length in a range from 500 nm-1 μm. The EDS analysis (inset of FIG. 10A) confirmed the synthesis of $TiO_2$. From the cross-sectional view of the same sample (FIG. 10B), it can seen that $TiO_2$ nanorods grow almost perpendicularly out of the cordierite channel wall with a length more than 500 nm. FIG. 10B also shows the substrate 10, the interface layer 20 bonded to the surface of the substrate 10, and the vertically aligned $TiO_2$ nanorod array 30 coupled to the substrate 10 via the interface layer 20. Transparent electron microscope (TEM) gives more detailed structural information about the $TiO_2$ nanorods. FIG. 10C shows the TEM image of a typical single $TiO_2$ nanorod, which is very straight and uniform in the whole body. The inset of FIG. 10C is a selective area diffraction pattern from as-shown single nanorod, showing that the $TiO_2$ nanorod grows from a direction. High Resolution TEM image (FIG. 10D) demonstrates that the nanorod is completely crystallized with clear lattice fringes parallel to the wall. An interplanar spacing of 0.34 nm is clearly imaged corresponding to the (11-1) plane perpendicular to the nanorod axis. The TEM images imply that the nanorod grows along the (11-1) crystal plane with a preferred [301] direction. The selected area electron diffraction (SAED) pattern (inset of FIG. 10C) confirms the single-crystal structure of brookite-$TiO_2$ nanorods with [11-1] being the zone axis. X-ray diffraction (XRD) patterns (FIG. 10E) also confirmed the brookite structure of as-synthesized $TiO_2$ nanorod arrays. It can be found that brookite-$TiO_2$ and rutile-$TiO_2$ are present together, with brookite-$TiO_2$ being the main phase. A high concentration of chloride ions in the hydrothermal medium contributes to the formation of brookite-$TiO_2$ and also avoids the crystal transformation from brookite to rutile.

Examples of Metal Oxide ($CeO_2$, ZnO, $SnO_2$, $Al_2O_3$, $ZrO_2$, and $TiO_2$) Core-Shell Composite Nanorod Arrays on 3D and 2D Substrates.

Using ZnO—$CeO_2$ as a Representative Example.

Cerium dioxide ($CeO_2$) is one of the most important rare-earth materials, which has diverse applications as support components for three-way catalysts, and catalysts for selective hydrogenation. One-dimensional (1D) $CeO_2$ nanostructures such as nanorods, nanowires and nanotubes have attracted extensive attention due to improved redox properties and transport properties as compared to $CeO_2$ nanoparticles. The assembly of 1D $CeO_2$ nanostructures into ordered three-dimensional (3D) nanostructures is very necessary for the development of high performance nanodevices. By use of sputtering methods and wet chemical methods, large scale ZnO/$CeO_2$ nanorod arrays have been successfully fabricated with well controlled dimensionality, crystal structures, and device structures. Firstly, ZnO nanorod films have been fabricated on the sintered 2-D Si(100) substrates and 3-D cordierite or stainless steel substrate by a hydrothermal method. Then, $CeO_2$ composite films have been deposited on ZnO nanorod arrays by magnetic sputtering process. The morphologies and crystal structures of the ZnO/$CeO_2$ composite nanorod arrays were characterized with field-emission scanning electron microscopy (FESEM), transmission electron microscopy (TEM). FIGS. 11A and 11B show the top-view and cross-sectional view SEM images of large area ZnO/$CeO_2$ nanorod arrays, respectively. From the two images, one can find that the ZnO/$CeO_2$ nanorods have diameters in a range from 30 nm to 70 nm and length of 1 μm. Compared with ZnO nanorods, the rough surface of ZnO/$CeO_2$ is an indication of $CeO_2$ nanofilm grown on the surface of the ZnO nanorod. More structural information about ZnO/$CeO_2$ nanorods was obtained by using TEM. FIG. 11C shows the bright-field TEM image of a typical ZnO/$CeO_2$ core-shell nanorod, while FIG. 11D depicts the corresponding dark-field image of the same ZnO/$CeO_2$ nanorod. From the two images, one can clearly see that there is a uniform polycrystalline $CeO_2$ nanofilm of 10-50 nm thickness that was coated on the about 100 nm wide ZnO nanorod. FIG. 11E shows the corresponding selected area electron diffraction pattern. From EDS results (FIG. 11F), one can see element information of Zn, O and Ce, which suggest the successful fabrication of ZnO/$CeO_2$ nanorods. These unique nanostructured arrays could be useful as catalysts on organic dye elimination and hazard gases control.

Examples of Metal Oxide ($CeO_2$, ZnO, $SnO_2$, $Al_2O_3$, $ZrO_2$ and $TiO_2$) Heterogeneous Nanorod Arrays.

FIGS. 12A-12D show SEM images of $Al_2O_3$—$TiO_2$ heterogeneous nanorod arrays.

Examples of Metal Oxide (Containing $CeO_2$, ZnO, $SnO_2$ and $TiO_2$, $Al_2O_3$, $ZrO_2$)/$ABO_3$ Perovskite (Such as La-Based Transition Metal Oxides, $LaMO_3$, M=Co, Cr, Fe, Mn, and Ni) Mesoporous Nanocomposite Structure Arrays on 3D and 2D Substrates Using $TiO_2$/(La, Sr)$MnO_3$ (LSMO) as a Representative Example.

$TiO_2$ nanorod arrays were grown on 2-D glass and silicon, 3-D cordierite and stainless steel substrates. By using an RF magnetron sputtering method, $TiO_2$/LSMO core-shell nanorod arrays were fabricated on either 2-D or 3-D substrates. First, $TiO_2$ nanorod arrays were prepared on the substrate by the hydrothermal method described above. After that, $TiO_2$/LSMO nanorod arrays were prepared from $TiO_2$ nanorod arrays through RF magnetron sputtering LSMO nanofilm on the surface of $TiO_2$ nanorod arrays. FIG. 13A shows the top-view of $TiO_2$/LSMO nanorod arrays on higher magnification. FIG. 13B is the cross-view image of $TiO_2$/LSMO nanorod arrays. The $TiO_2$/LSMO nanorods have diameters in a range from 30 nm to 70 nm and length of 1 μm. By using TEM, more structure information about $TiO_2$/LSMO nanorods was obtained. FIG. 13C and FIG. 13D depict the TEM image of $TiO_2$/LSMO nanorods, from which the core of the $TiO_2$ nanorod and the shell covered on it can be seen. EDS results (FIG. 13E) suggest the successful fabrication of $TiO_2$/LSMO nanorods. This kind of structure will have improved performance on oxidizing of NO or CO into $NO_2$ and $CO_2$ in exhaust emission catalytic processes.

Examples of Metal Oxide (Containing $CeO_2$, ZnO, $SnO_2$ and $TiO_2$, $Al_2O_3$, $ZrO_2$)/Precious Metal Nanoparticles (Pt, Pd, Au, Ru, and Rh) Mesoporous Nanocomposite Structure Arrays.

Figure 14A:
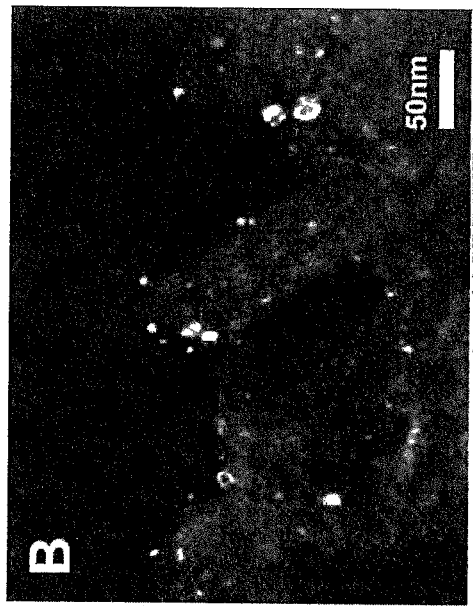
FIGS. 14A-14D are TEM images of TiO$_2$/Pt composite nanorods.
Figure 14B:
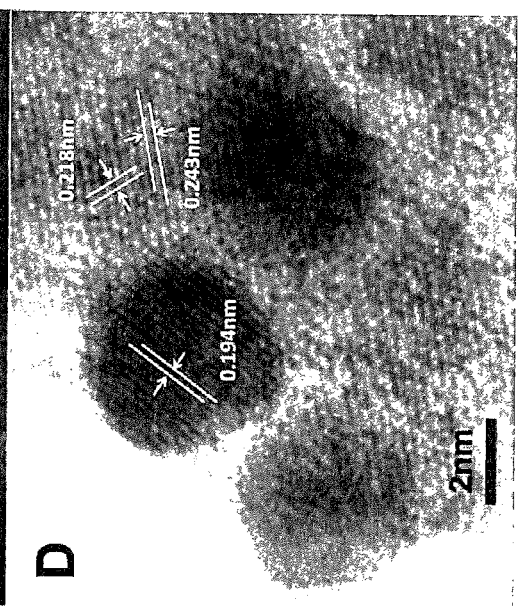
Figure 14C:
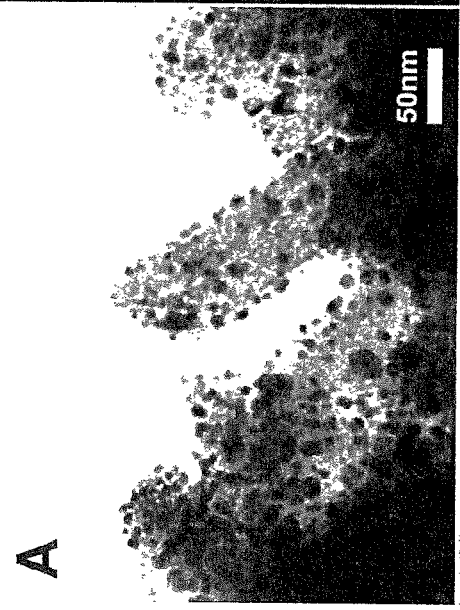
Figure 14D:
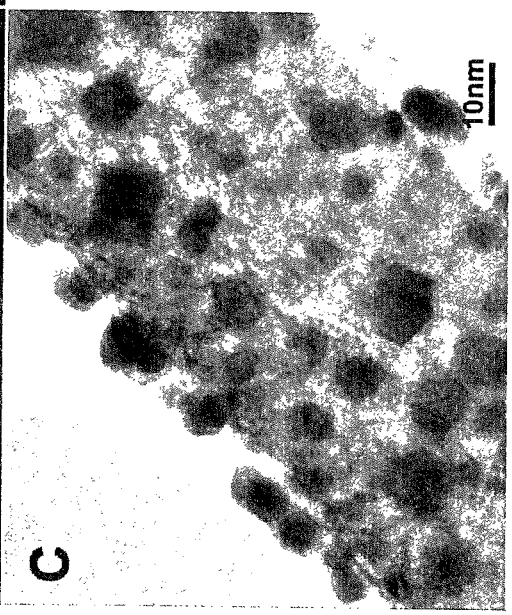

After growth of $TiO_2$ nanorods on cordierite honeycomb substrate, Pt nanoparticles were loaded on the $TiO_2$ nanorods arrays by a simple impregnation method. FIGS. 14A-14D show the transmission electron microscopy (TEM) images of the synthesized $TiO_2$/Pt nanocomposite. FIG. 14A is the bright field TEM image of a few $TiO_2$/Pt nanocomposite nanorods, while FIG. 14B exhibits the corresponding dark field TEM image of the nanorods. Pt nanoparticles loaded on the $TiO_2$ nanorods could be clearly observed with high dispersion from either of the two pictures. Pt nanoparticles in a single nanorod were also investigated in a higher magnification (FIG. 14C). The precipitated Pt nanoparticles were quite uniform, the sizes of which were in a range from 2 nm to 10 nm with average diameter of 3 nm. The high-resolution TEM (FIG. 14D) revealed the highly crystalline features of the support $TiO_2$ nanorod as well as the Pt particle. The fringes with a lattice spacing of 0.194 nm in the particle can be indexed as (200) plane of face-centered cubic (fcc) Pt. The fringes with lattice spacing of 0.243 nm and 0.218 nm are corresponding to the (101) plane and (111) plane of rutile-$TiO_2$, respectively.

Examples of Metal Oxide (Containing $CeO_2$, ZnO, $SnO_2$ and $TiO_2$, $Al_2O_3$, $ZrO_2$)/$ABO_3$ Perovskite (Such as La-Based Transition Metal Oxides, $LaMO_3$, M=Co, Cr, Fe, Mn, and Ni)/Bao, $K_2$O/Precious Metal Nanoparticles (Pt, Pd, Au, Ru, and Rh) Mesoporous Composite Nanoarray Catalysts.

Those 3-D composite nanomaterial systems effectively improve the performance of commercially used three-way catalysts, diesel oxidation catalysts (DOC), and $NO_x$ removal catalysts, such as lean NOx trap (LNT) and selective catalytic reduction (SCR) in automobile and remove harmful gases from stationary energy plants. They can also be used in other areas, such as new energy generation and storage devices and selective separations in chemical and biological industries.

Robust 3-D Configured Metal Oxide Nano-Array Based Monolithic Catalysts with Ultrahigh Materials Usage Efficiency and Catalytic Performance Tunability.

By integrating 3-D monolithic substrates with metal oxide nanostructure arrays (nano-arrays) and Pt nanoparticles using low cost solution-phase methods, a new class of nano-array structured catalysts has been successfully fabricated. These 3-D configured nano-array catalysts have greatly enhanced the device surface area, the surface Pt-nanoparticle dispersion and active site population, and demonstrated strong nanostructure-substrate adhesion and tunable nanostructure shape and size. In the meantime, efficient gas diffusion and catalytic reaction have been enabled by the ordered arrangement of the nano-array assembled nanochannels. As a result, 10-40 times less mass loading was achieved in both Pt and support metal oxides in nano-array catalysts as compared to classical washcoated powder-form counterparts. Meanwhile, these nano-array catalysts consistently demonstrated excellent, robust, and tunable catalytic performance on CO oxidation. The 3-D configured nano-array based monoliths represent a new general strategy to fabricate highly efficient and robust nanostructure based catalytic devices for various sustainable industrial applications.

For decades, three-dimensional (3-D) nano-array structured materials have been broadly introduced to enable improved or unique performance in electronics, optical devices, lithium-ion batteries, solar cells, light-emitting diodes, microfluidics, biomedical devices, self-cleaning surfaces and super adhesives. Meanwhile, nanostructure (such as nanoparticles, nanowires) based catalysts in powder-form have been intensively investigated and are regarded as the potential next generation catalysts. However, the study of array structured 3D nano-architectures with ordered arrangement of macropores and mesopores and with the nano-size effect has been largely neglected as unique structured nanocatalysts for industrial catalytic processes. The main challenges or obstacles are due to the lack of a well-defined 3D platform as well as an effective integration strategy.

In industrial catalytic processes, monolithic catalytic devices, such as catalysts, filters, and reactors, are generally more efficient and cost-effective as compared with powder or pellet ones, as a result of a few outstanding merits including low pressure drop, high geometric surface area, efficient mass-transfer, and relatively low catalyst usage. Consequently, they have been important devices as either dedicated or alternative solutions in catalytic combustion, chemical production, separation and purification, and environmental pollutant treatment such as water purification, vehicle and industrial exhaust emissions treatment. However, three main issues remain challenging for the research and development of powder washcoated monolithic catalytic devices: (i) the inevitable use of precious metals (Pt, Rh, and Pd) in some applications such as exhaust treatment makes them expensive and in limited supply; (ii) empirical washcoated powder-form catalysts lack well-defined structural and geometrical configurations, severely compromising the catalytic performance and materials utilization efficiency of these catalysts; (iii) current understanding of the relationship between practical industrial catalysts' performance and the origin of catalytic activity, i.e., atomic and nanoscopic surfaces and interfaces in the comprised individual micro- and nanostructures, is quite limited.

Figure 15A:
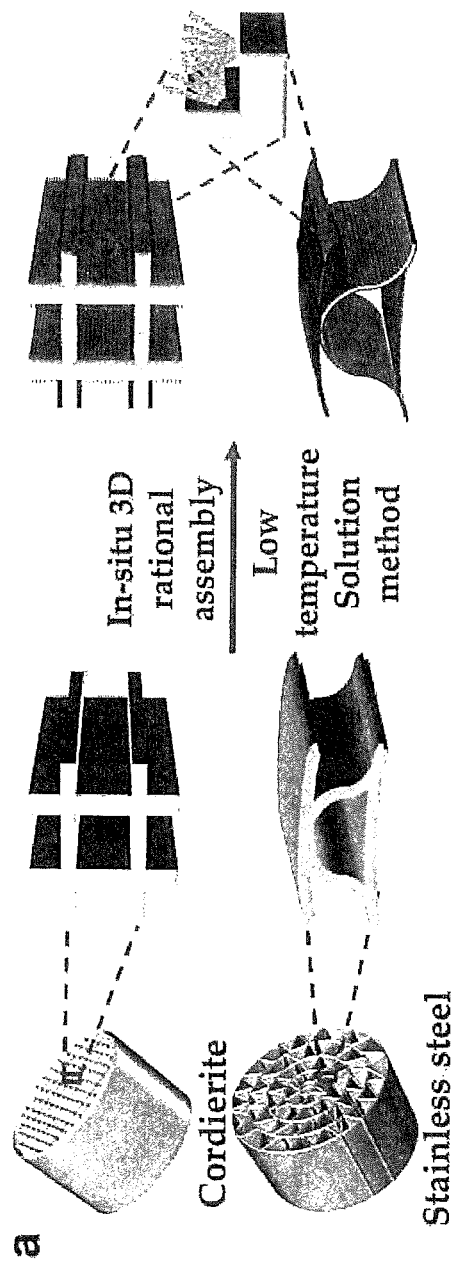
FIG. 15a. Schematic nano-array assembly process on typical ceramic and stainless steel monolith substrates.

Herein, through a general, low-cost, green and robust hydrothermal process, the inventors directly grew crystalline nano-arrays of support metal oxides such as ZnO, $TiO_2$, $CeO_2$, and $Co_3O_4$ onto commercial cordierite and stainless steel monolithic substrates (FIG. 15a), which not only could serve as an idealized 3-D platform for investigation and application of array structured nanocatalysts but also show the potential to effectively upgrade the state-of-art powder washcoated monolithic catalysts by significantly mitigating the above mentioned problems. It may, for the first time, provide a widely applicable and easily extendable catalytic device platform based on scalable and tunable 3-D nanostructure assembly. The nano-array structured catalysts have greatly enhanced the devices' surface area, the array-surface Pt-nanoparticle dispersion and active site population, and demonstrated strong nanostructure-substrate adhesion and tunable nanostructure shape and size. In the meantime, efficient gas diffusion and catalytic reaction have been enabled due to the ordered arrangement of the macroporous channels in the array structures. As a result, with 10-40 times less mass loading in both Pt and support metal oxides as compared to classical washcoated powder-form ones, these nano-array monolithic catalysts demonstrated consistently excellent, robust, and tunable catalytic performance on CO oxidation, which was conducted as a probe reaction based on its great importance in both practical application (e.g., exhaust pollutant treatment, fuel cell) and fundamental research. See Qiao, B.; Wang, A.; Yang, X.; Allard, L.; Jiang, Z.; Cui, Y.; Liu, J.; Li, J.; Zhang, T. Nat. Chem. 2011, 3, 634-641; Liu, L.; Zhou, F.; Wang, L.; Qi, X.; Shi, F.; Deng, Y. J. Catal. 2010, 274, 1-10.

To prepare the nano-array assembled monolithic catalysts, a two-step procedure was employed. In the first step, a low temperature hydrothermal method was used for the growth of various metal oxide (ZnO, $TiO_2$, $Co_3O_4$) nanorod arrays directly onto monolithic substrates by using the respective precursors containing Zn, Ti, and Co cations. $CeO_2$ nanotube arrays were grown on monoliths using ZnO nanorod arrays as template with additional hydrothermal deposition of $CeO_2$ nanoshells in one pot, followed by template removal by wet chemical etching. The Pt nanoparticles were loaded using dip coating of colloid Pt nanoparticles made from thermal decomposition of Pt-contained hydrochloride salts. Typically, the required amount of as-prepared Pt colloid (Pt/cordierite=0.1 wt %) was diluted by adding acetone as solvent to the volume which can totally cover cordierite monolith substrates with nanostructure array. The immersed substrates were placed into the diluted Pt colloid solution with magnetic stirring until the solution is dry. Finally, the sample was dried at 80° C. in air, and Pt/MO nano-array monolithic catalysts were ready to use. The overall weight percentage of Pt on the nano-array was confirmed by statistical TEM EDXS analysis and inductively coupled plasma-atomic emission spectroscopy (ICP-AES), which was in a good agreement with Pt amount in the initial supply, suggesting that most of Pt nanoparticles had been loaded on the metal oxide nano-arrays. (see below for details).

Figure 15B:
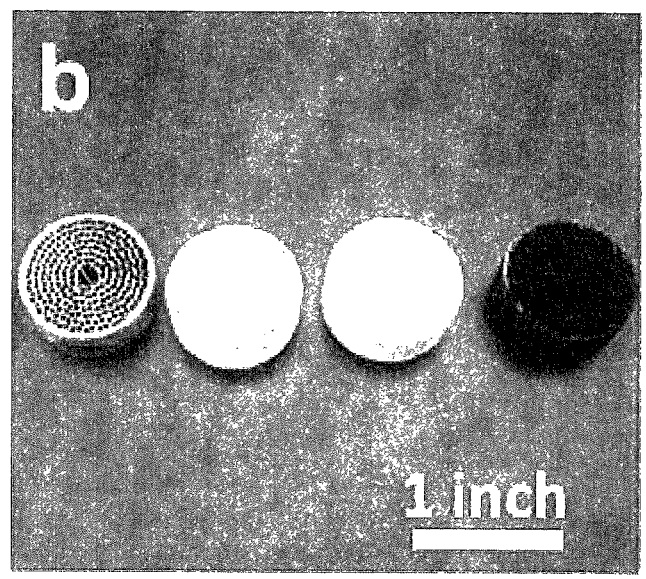
FIG. 15b, Selected nano-array based monolithic catalysts (left to right: ZnO/stainless steel, TiO$_2$/cordierite, CeO$_2$/cordierite, and Co$_3$O$_4$/cordierite). SEM images of metal oxide nano-arrays on monolith substrates.
Figure 15C:
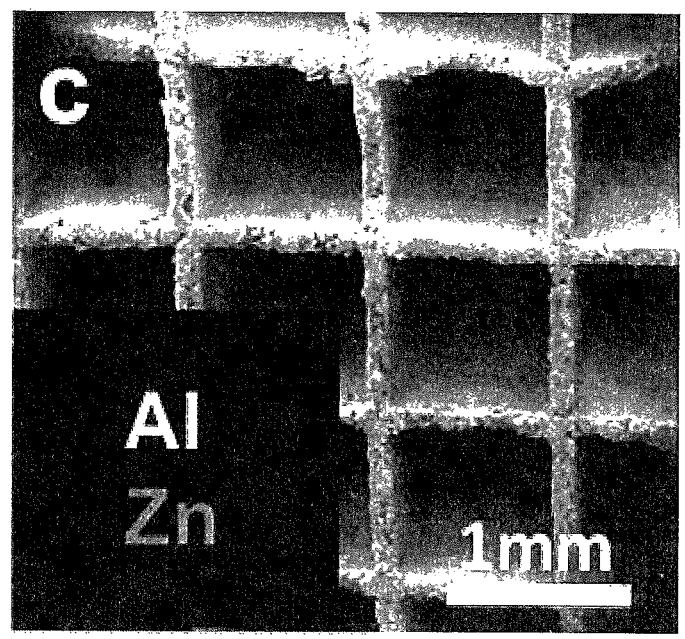
FIG. 15c, Low magnification view of cordierite monolithic channels grown with ZnO nanowire arrays; inset: Zn and Al element map of a single monolith channel from EDXS.
Figure 15D:
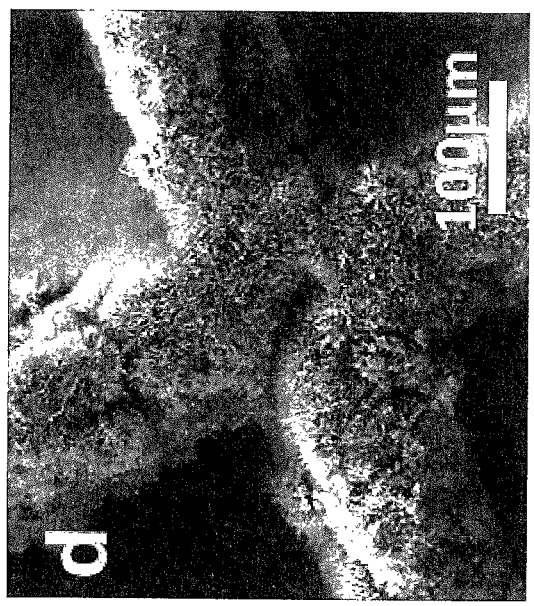
FIGS. 15d, and 15e, top and cross-sectional views of Co$_3$O$_4$ porous nanowire arrays on cordierite monolith.
Figure 15E:
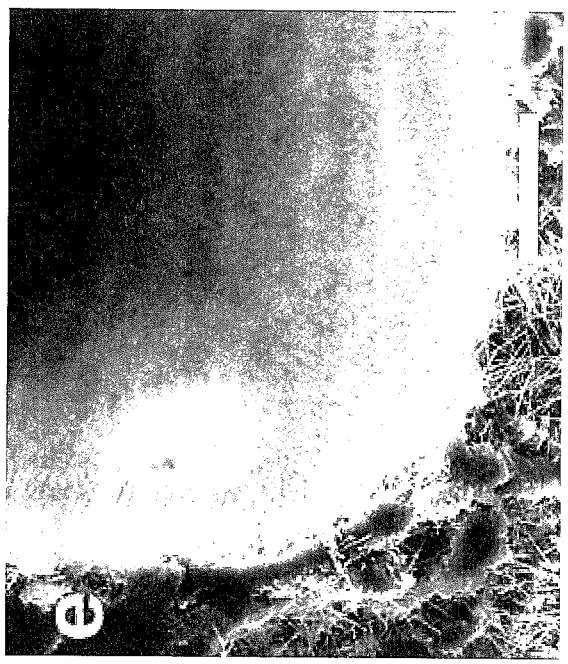
Figure 15F:
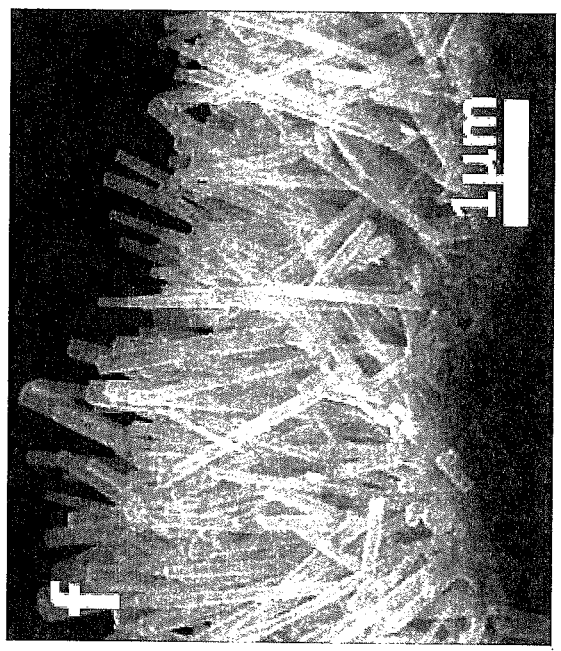
Figure 15G:
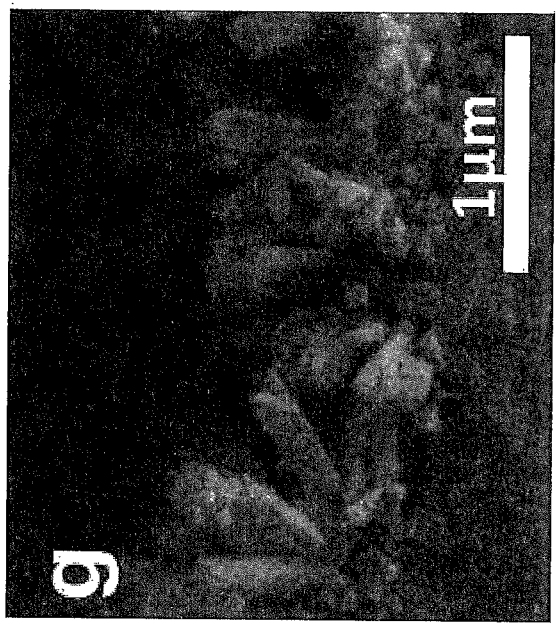
Figure 15H:
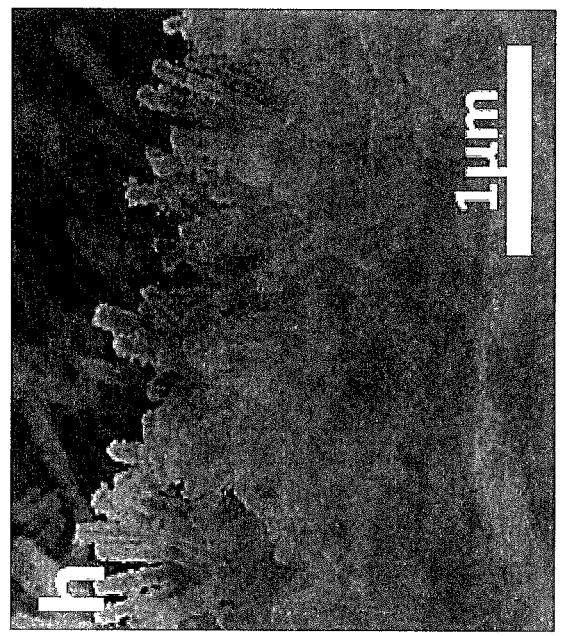
Figure 15I:
Figure 15J:
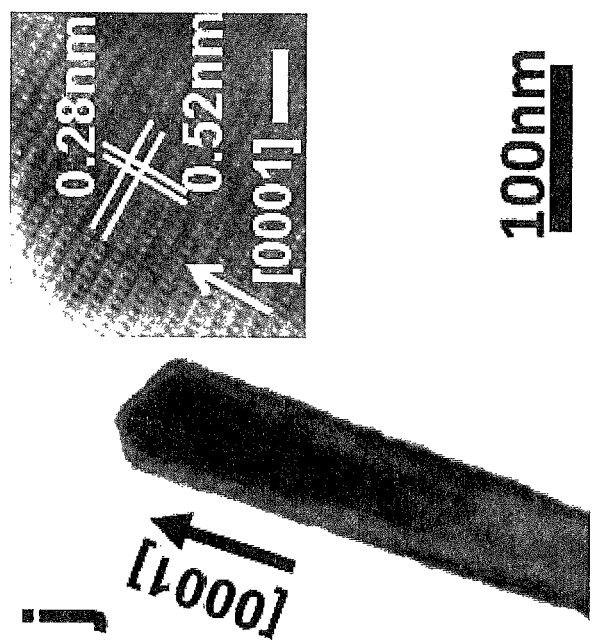
Figure 15K:
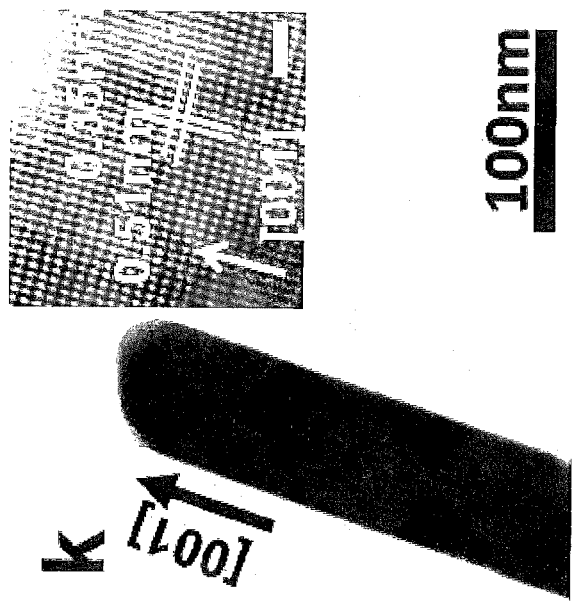
Figure 15I:
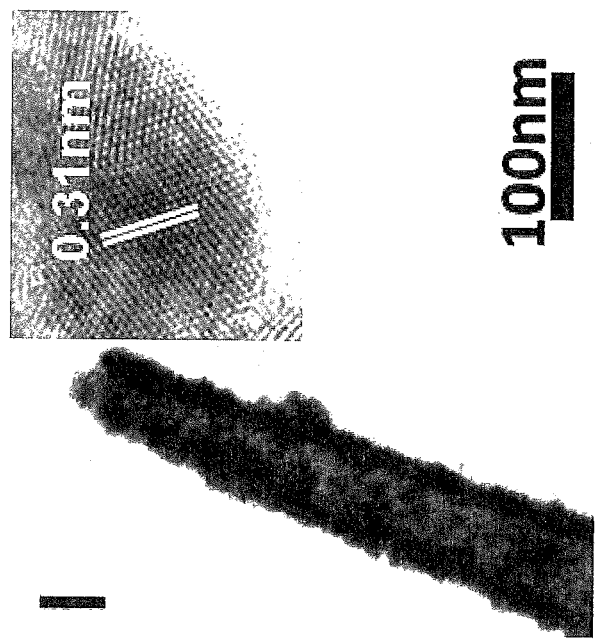
Figure 15M:
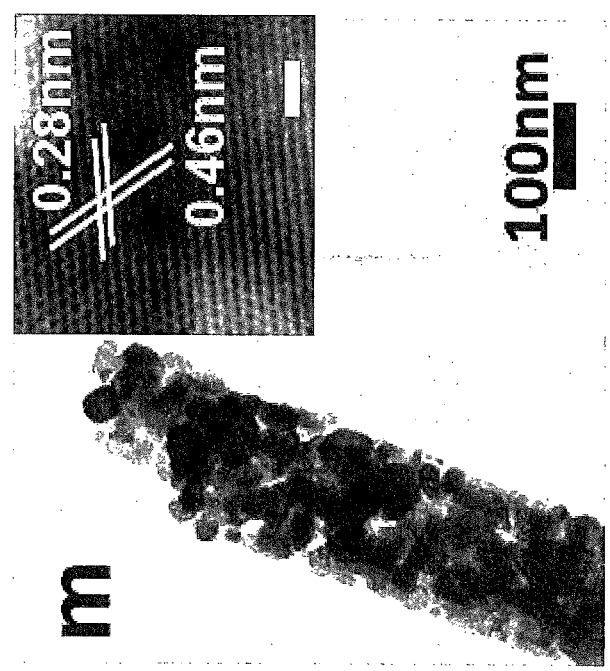
Figure 16A:
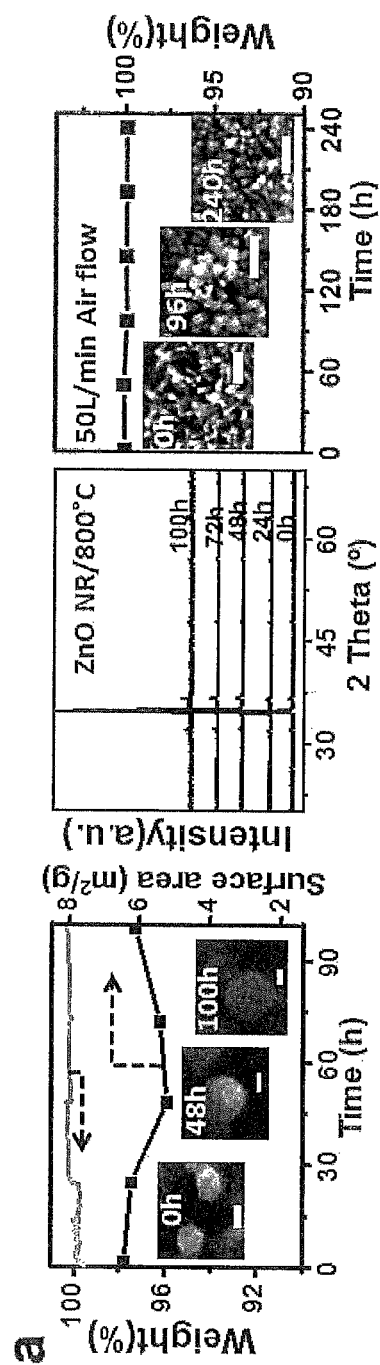
FIG. 16a. 1 µm ZnO nanorod array grown on stainless steel monolith.
Figure 16B:
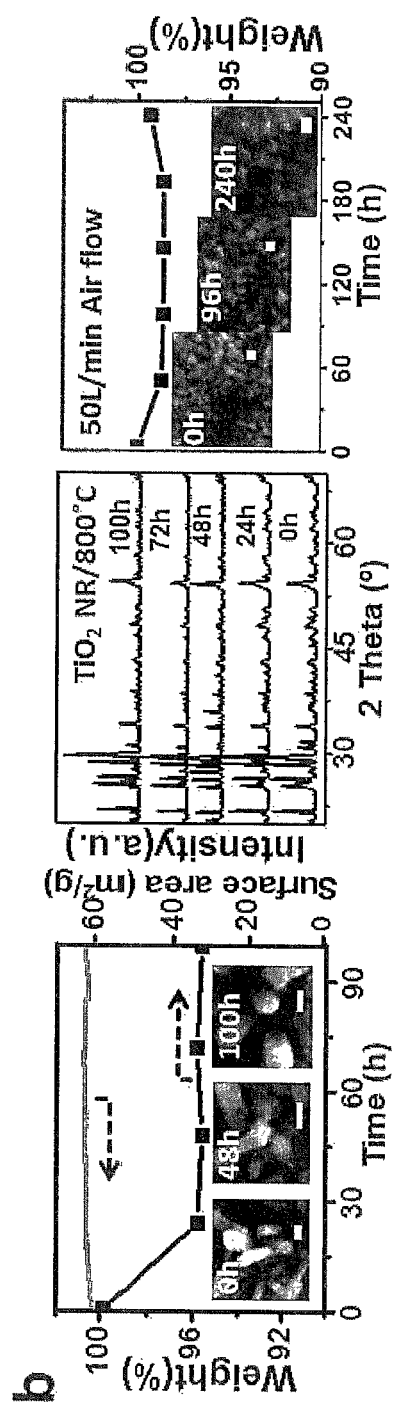
FIG. 16b. 1 µm TiO$_2$ nanorod array grown on cordierite monolith.
Figure 16C:
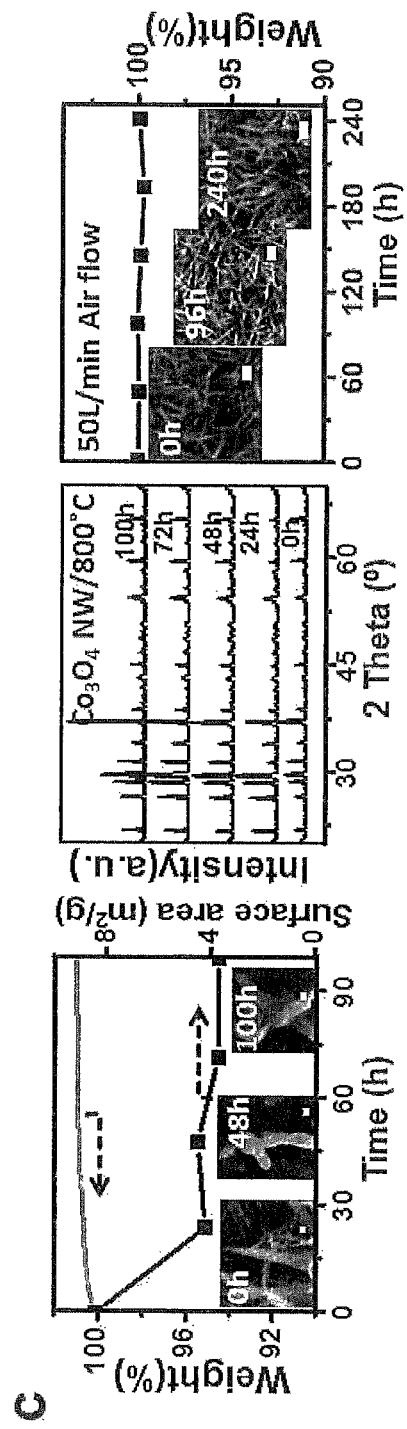
FIG. 16c. 8 µm Co$_3$O$_4$ porous nanowire array grown on cordierite monolith. Scale bar: 100 nm for SEM insets in all thermal and mechanical tests in FIG. 16b; 1 µm for SEM insets in the mechanical tests in FIGS. 16a and 16c.
Figure 29:
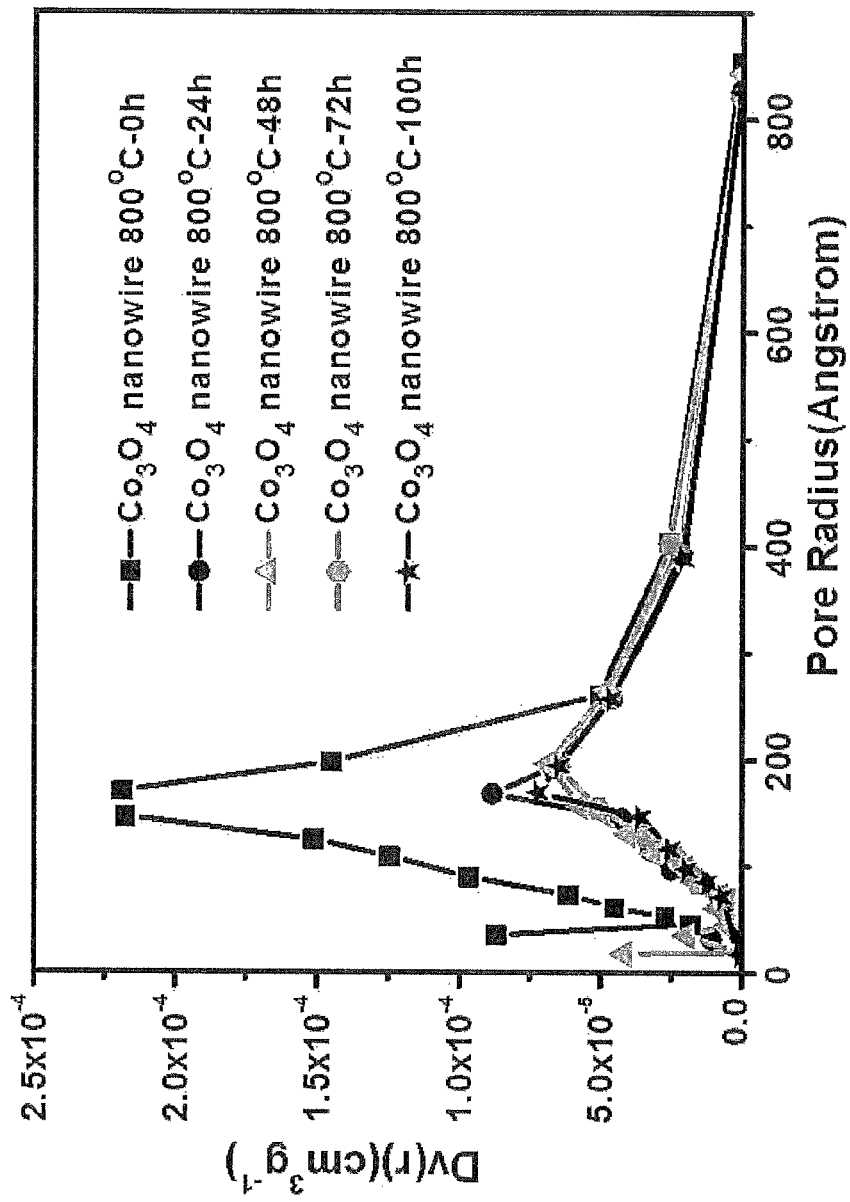
FIG. 29 shows the pore size distribution of $Co_3O_4$ porous nanowire arrays on cordierite monolith after 0 h, 24 h, 48 h, 72 h, and 100 h of annealing time at 800° C.

FIG. 15b shows the photographic image of four types of nano-array based monolithic catalysts including ZnO, $TiO_2$, $CeO_2$, and $Co_3O_4$. Scanning electron microscope (SEM) top-view images of ZnO nanowire array rooted cordierite monolith channels are shown in FIG. 15c at low magnification. The as-synthesized $Co_3O_4$ nanowires (about 10 μm long) in FIGS. 15d-15e exhibited a high uniformity as well as well-aligned and densely packed array characteristics. The closer view electron micrographs in FIGS. 15f-15m revealed the well-defined structural and morphological characteristics of the grown metal oxide nano-arrays on monolith substrates. For instance, FIGS. 15f (SEM) and 15j (TEM) identified the ZnO nanowire arrays with good uniformity and coverage, single crystallinity, a diameter of about 60 nm, and [0001] growth direction. Table 5 summarizes the physical, chemical, and structural characteristics of the as-grown metal oxide nano-arrays (described below).

the nanorods. In $Co_3O_4$, the as-prepared porous nanowires with relatively smooth surfaces turned into zigzag periodic and rough nanowires after 24 hours of annealing at 800° C. (FIG. 16c). However, the morphology of $Co_3O_4$ nanowires was retained after 24 hours. The pore size distribution changed only slightly with an average 20 nm pore size maintained throughout the 800° C. isothermal process (FIG. 29), but the pore volume dropped by about 46% after the first 24 hours, indicating a decrease of pore population. The measured BET surface area of a $TiO_2$ nanorod array monolith decreased by about 43%, from 57 $m^2/g$ to 33 $m^2/g$ after 24-hr annealing at 800° C. After that, surface area stayed constant throughout the remaining 76-hr isothermal process. Similar to $TiO_2$ nanorods, the surface area of a $Co_3O_4$ nanowire array monolith decreased from 8 $m^2/g$ to 4 $m^2/g$ after 24-hr annealing at 800° C. However, the surface area of a ZnO nanorod array monolith remained constant in the 100-hr annealing at 800° C. Compared with the significant surface area decrease in conventional powder-form catalysts (50% decrease in ZnO; >80% decrease in $TiO_2$ and $Co_3O_4$) under high temperature, ZnO, $TiO_2$ and $Co_3O_4$ nano-array monoliths demonstrated much higher thermal stability in both short-term and long-term scales (5%, 43%, and 56% surface area decrease for ZnO, $TiO_2$, and $Co_3O_4$, respectively). As-prepared nano-array structures also exhibited good thermal stability in reductive atmosphere (see below and FIG. 30). The well-separated but densely-packed nano-arrays effectively defined and utilized spaces between indi-

TABLE 5

Physical, chemical, and structure characteristics of grown nano-arrays on bare monolith substrates.

| Materials | Array morphology | Diameter (nm)/ Length (μm) | Wall thickness or pore size (nm) | Structure/ Crystallinity | Growth direction | d-spacing (nm)/ crystal plane | Images (FIG. 15) |
|---|---|---|---|---|---|---|---|
| ZnO | nanorod/ nanowire | 50-150/1-5 | — | Wurtzite/ Single crystal | [0001] | 0.52/{0001} 0.28/{01-10} | c, f, j |
| $TiO_2$ | nanorod | 50-130/0.5-1 | — | Brookite/ Single crystal | [001] | 0.35/{120} 0.51/{001} | g, k |
| $CeO_2$ | nanotube | 70-200/1-5 | 10-20 | Fluorite/ Polycrystal | — | 0.31/{111} | h, l |
| $Co_3O_4$ | porous nanowire | 100-200/1-12 | 20 (10-50) | Spinel/ Polycrystal | — | 0.46/{111} 0.28/{220} | d, e, i, m |

Thermal and mechanical stability of monolithic catalysts is important for various catalytic processes at elevated temperature, such as catalytic combustion, steam reforming, and automobile exhaust after treatment. In vehicular applications, the monoliths are also subjected to excessive mechanical vibrations. Therefore, the inventors conducted a series of time dependent studies on thermo-gravimetry, surface area changes, structure and morphology evolution, and mechano-gravimetry. It is noted that the thermal and mechanical stability of two-step template-induced $CeO_2$ nanotube array (see below) was not as good as those of the directly grown nanowire array (ZnO, $TiO_2$, and $Co_3O_4$) based monolithic catalysts (as illustrated in FIG. 16), which is due to the polycrystalline nature of the nanotubes and their non-uniform tube wall thickness along the nanotube length. For the nano-array monoliths based on ZnO, $TiO_2$, and $Co_3O_4$, less than 1% mass change was observed after a 100-hour 800° C. isothermal annealing process. The corresponding XRD spectra revealed no phase segregation for ZnO, $TiO_2$, and $Co_3O_4$ nano-array monoliths. From inset SEM images, the ZnO and $TiO_2$ nano-array structures remained intact despite the gradually smoothened edges of vidual nanostructures with high surface area, therefore suppressing the sintering induced densification and grain growth.

The nano-array adhesion and structure stability was examined by applied high velocity air flow (static 50 L/min or pulsatile flow) for 10 days while monitoring morphological variation and weight loss. The results summarized in the right panel of FIG. 16 suggested that ZnO, $TiO_2$, and $Co_3O_4$ nano-array monoliths exhibited excellent mechanical robustness and the nano-array morphology was retained with only minor change throughout. The weight losses of the above three nano-array monolithic catalysts were less than 1% individually.

Figure 17A:
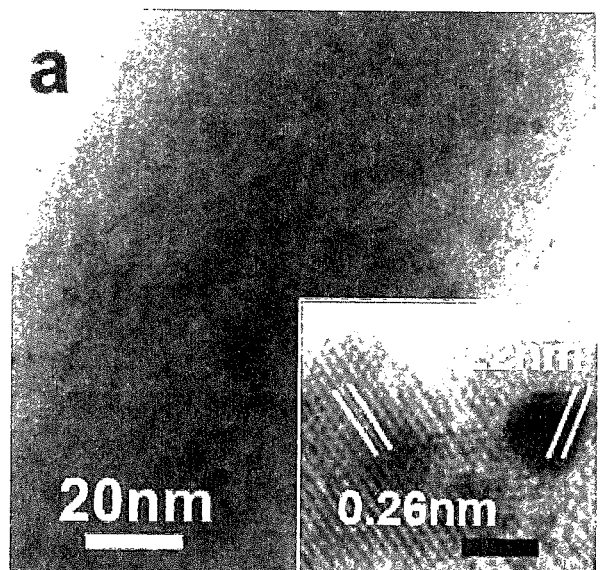
FIG. 17a) ZnO nanorod.
Figure 17B:
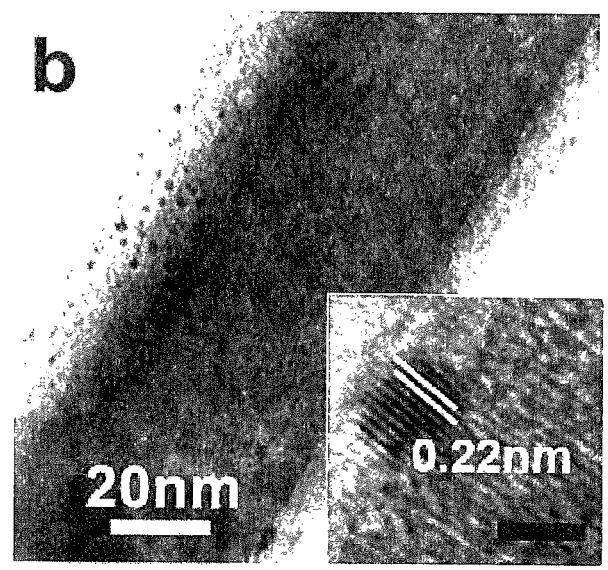
FIG. 17b) TiO$_2$ nanorod.
Figure 17C:
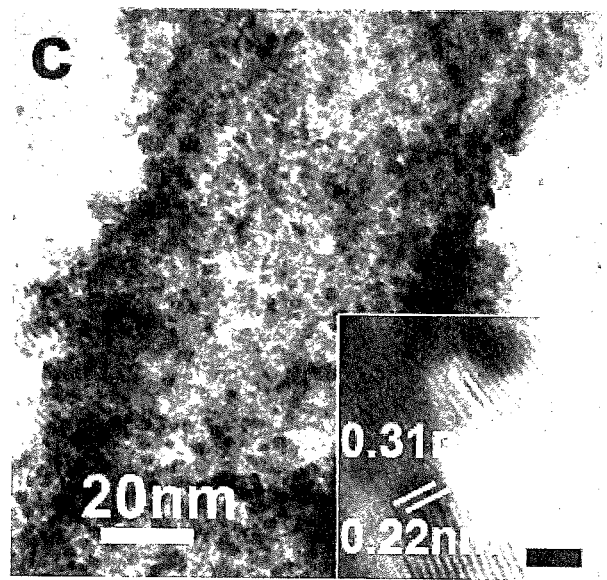
FIG. 17c) CeO$_2$ nanotube.
Figure 17D:
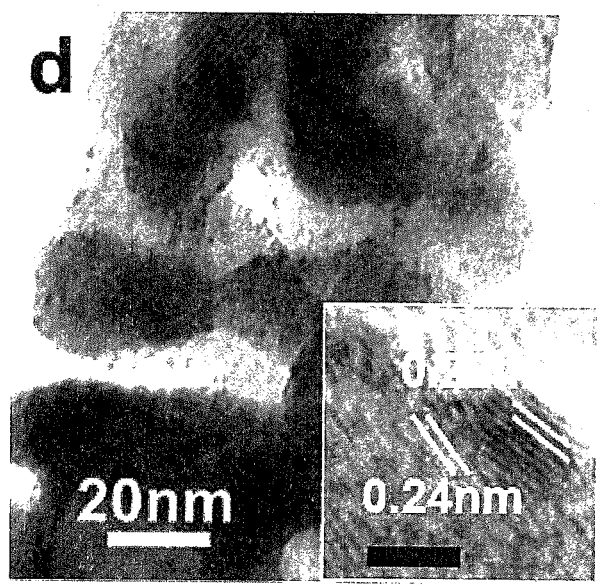
FIG. 17d) Co$_3$O$_4$ nanowire. Scale bars in all the insets are 2 nm.
Figure 17E:
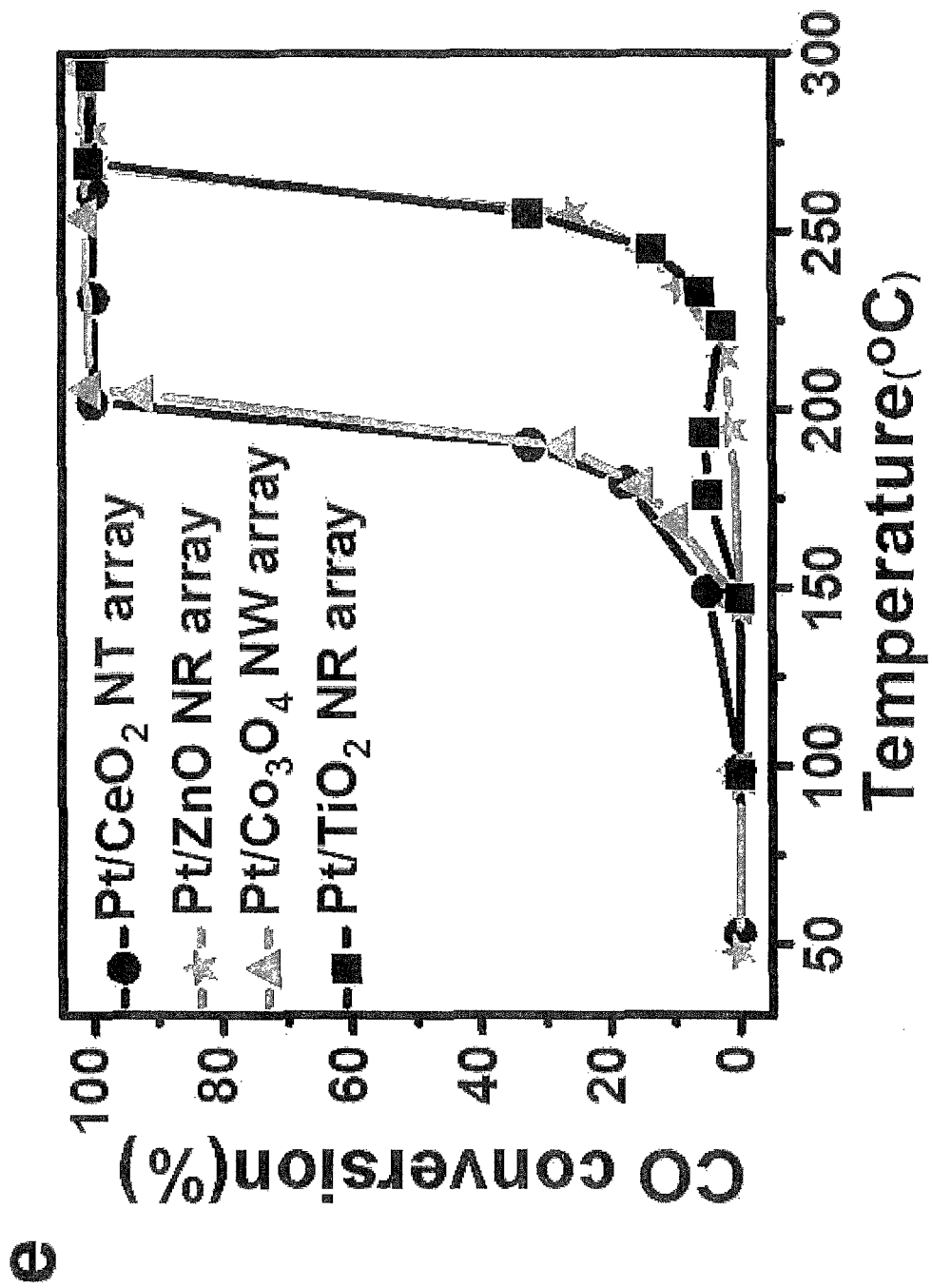
FIG. 17e) CO oxidation conversion as a function of temperature over Pt-loaded (CeO$_2$, ZnO, Co$_3$O$_4$, and TiO$_2$) nano-array monolithic catalysts.
Figure 17F:
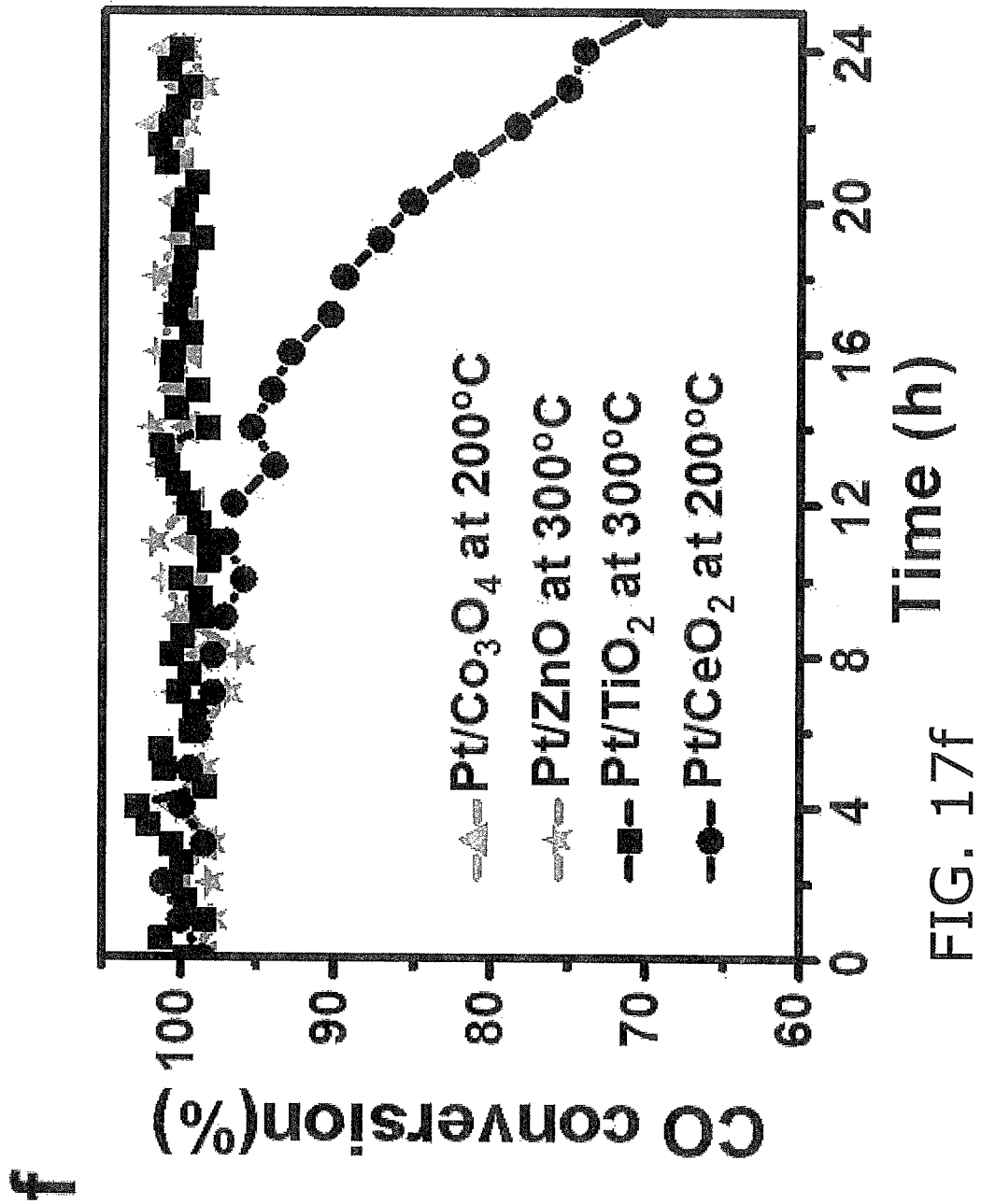
FIG. 17f) Catalytic stability of Pt-loaded (CeO$_2$, ZnO, Co$_3$O$_4$, and TiO$_2$) nano-array monolithic catalysts.
Figure 34:
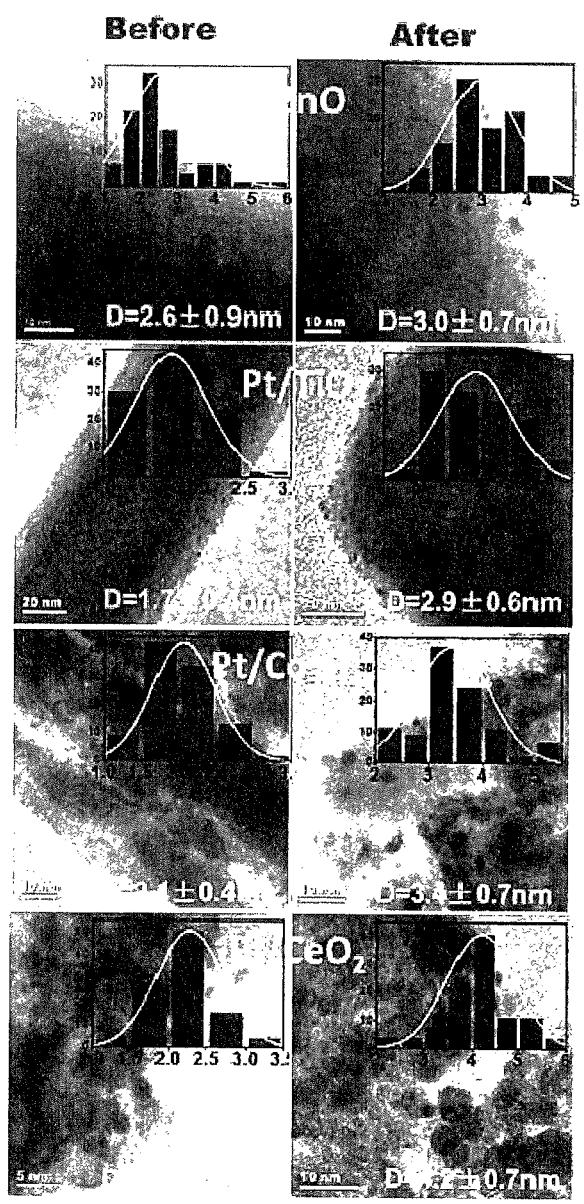
FIG. 34 shows TEM images of nanostructure array catalysts before (left) and after (right) CO oxidation light-off and catalytic stability test: Pt/ZnO nanorod array catalysts; Pt/$TiO_2$ nanorod array catalysts; Pt/$Co_3O_4$ porous nanowire array catalysts; and Pt/$CeO_2$ nanotubes array catalysts. Axis of inset spectra: Particle diameter (nm). The diameter range was determined by covering up 70% of nanoparticles.
Figure 35:
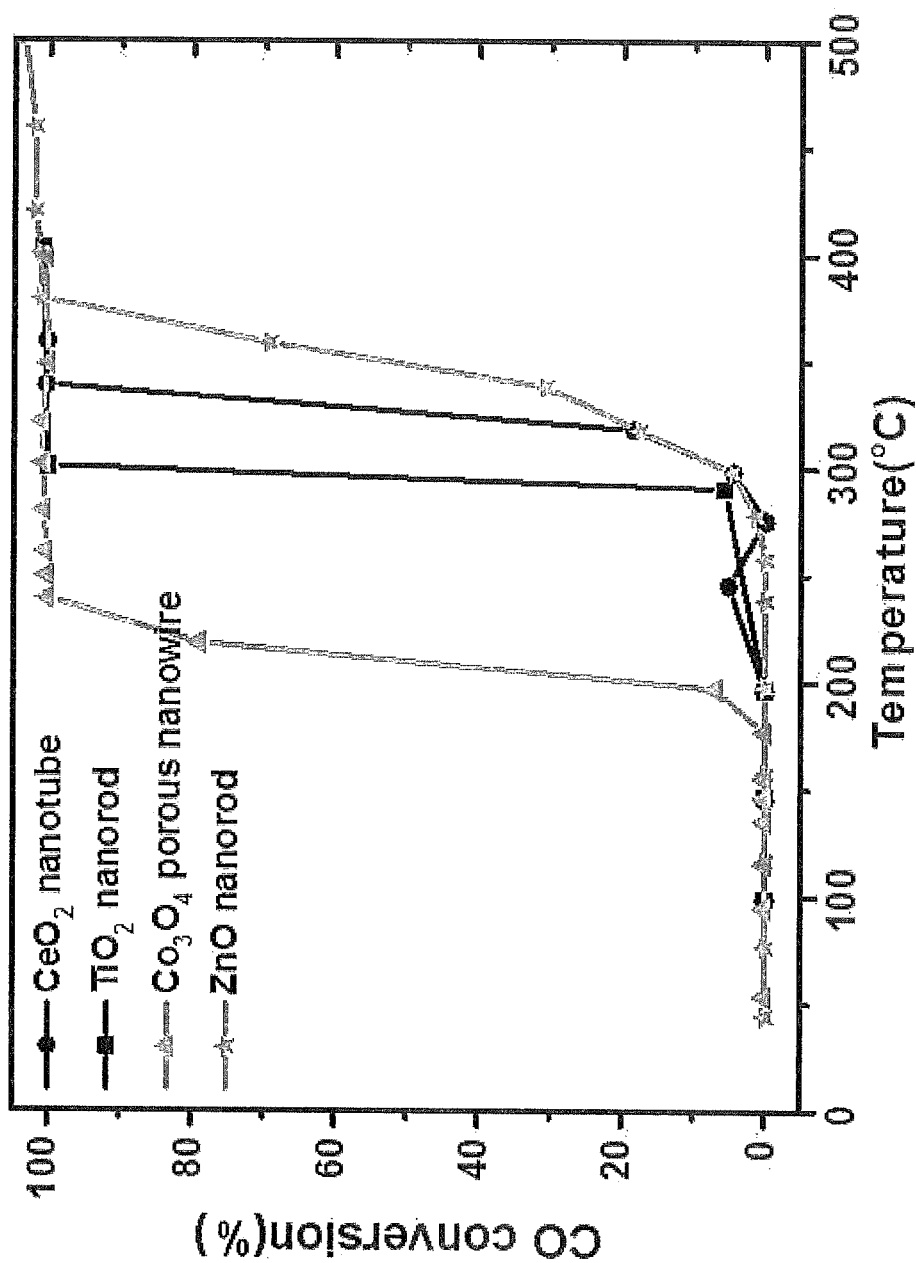
FIG. 35 is a graph of CO oxidation of metal oxide nano-arrays on cordierite monolith.
Figure 36:
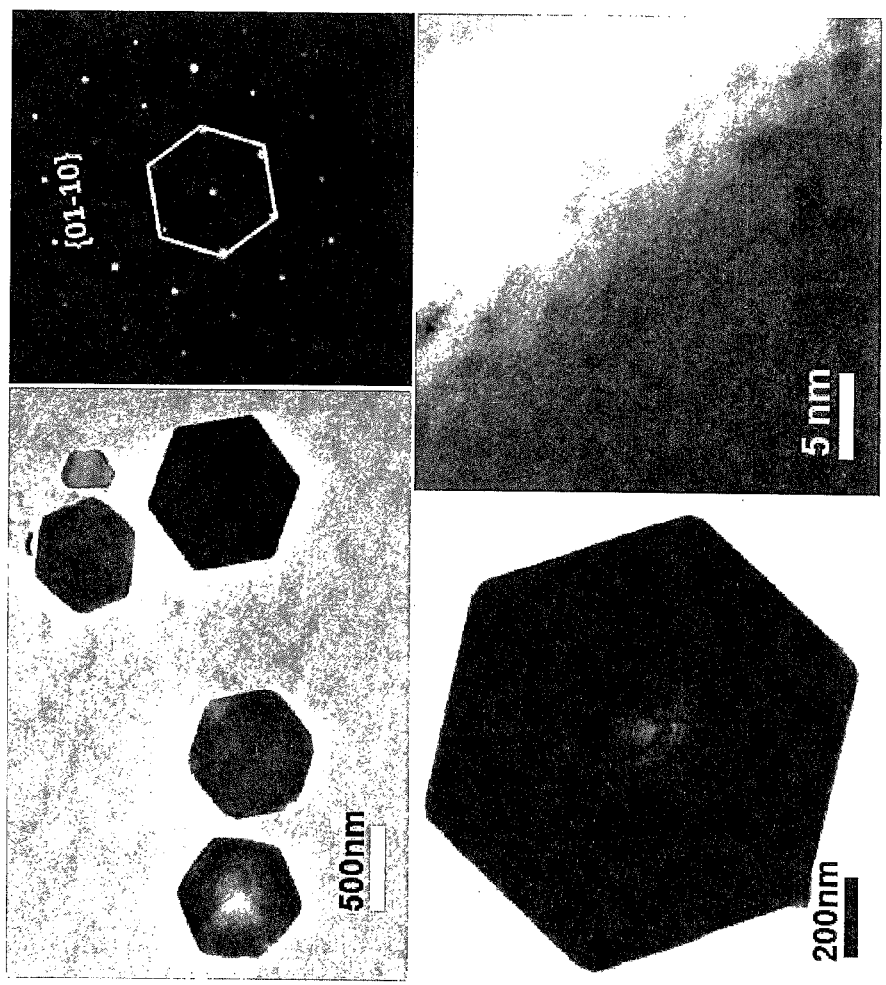
FIG. 36 shows TEM images of Pt/ZnO nanoplate loaded on cordierite monolith; top left panel: A few Pt/ZnO nanoplates; top right panel: Electron diffraction pattern of a typical ZnO nanoplate; bottom left panel: A typical TEM image of ZnO hexagonal nanoplate; bottom right panel: An HRTEM image of Pt nanoparticles loaded on ZnO nanoplate.
Figure 37:
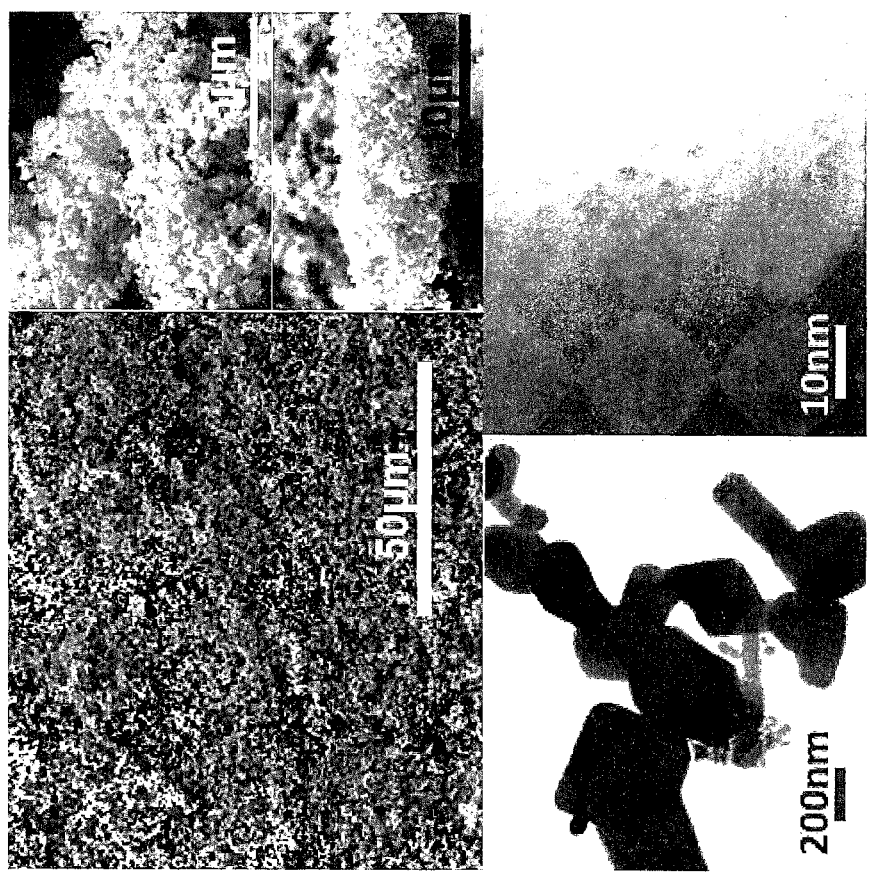
FIG. 37 shows SEM and TEM images of Pt/ZnO powder loaded on cordierite monolith (control sample): top left panel: large area Pt/ZnO powder on monolith; top right panel: top-view of Pt/ZnO powder catalysts on a higher magnification (upper portion) and cross-sectional view of Pt/ZnO powder catalysts on monolith (lower portion); bottom left panel: TEM image of Pt/ZnO powder; and bottom right panel: HRTEM image of Pt nanoparticles loaded on ZnO particle.

The rational design and assembly of metal-metal oxide interface through shape and size control is emerging as one of the most effective routes to tailor the catalysts' surface atomic and electronic structures and thus their catalytic activity and selectivity. See Xie, X.; Li, Y.; Liu, Z.-Q.; Haruta, M.; Shen, W. Nature 2009, 458, 746-749. FIGS. 17a-17d display the individual ZnO, $TiO_2$, $CeO_2$, and $Co_3O_4$ nanostructures loaded with well-dispersed 2 nm Pt nanoparticles on their well-defined crystal surfaces with the inset lattice images clearly identifying the exposed Pt(111) atomic planes. The light-off temperatures (where 50% of CO conversion is achieved) for CO oxidation of Pt-loaded $CeO_2$, ZnO, $Co_3O_4$, and $TiO_2$ nano-array monolithic catalysts are 193° C., 260° C., 195° C., and 258° C., respectively and 100% CO conversion was achieved below 300° C. (FIG. 17e). The better CO oxidation performance in $Pt/CeO_2$ nanotube and $Pt/Co_3O_4$ porous nanowire arrays is due to the promotion effect of $Co_3O_4$ and $CeO_2$ nanostructure support to Pt nanoparticle. See Törncrona, A.; Skoglundh, M.; Thormählen, P.; Fridell, E.; Jobson, E. Appl. Catal., B 1997, 14, 131-145. FIG. 17f shows that the ZnO, $Co_3O_4$, and $TiO_2$ nano-array supported Pt monolithic catalysts all displayed a very stable 100% CO conversion to $CO_2$ at $T_{100}$ throughout the 24 hours. In $Pt/CeO_2$ nano-array catalysts, 100% CO conversion was only sustained during the initial 6 hours. The catalytic activity degradation is caused by this catalyst's relatively lower thermal and mechanical stability (see below). The loaded Pt nanoparticles on the nano-array monolithic catalysts show little change in size with well-retained nano-array structure for both ZnO and $TiO_2$ after the catalytic performance and stability tests (FIG. 34), demonstrating their excellent thermal stability.

Figure 17G:
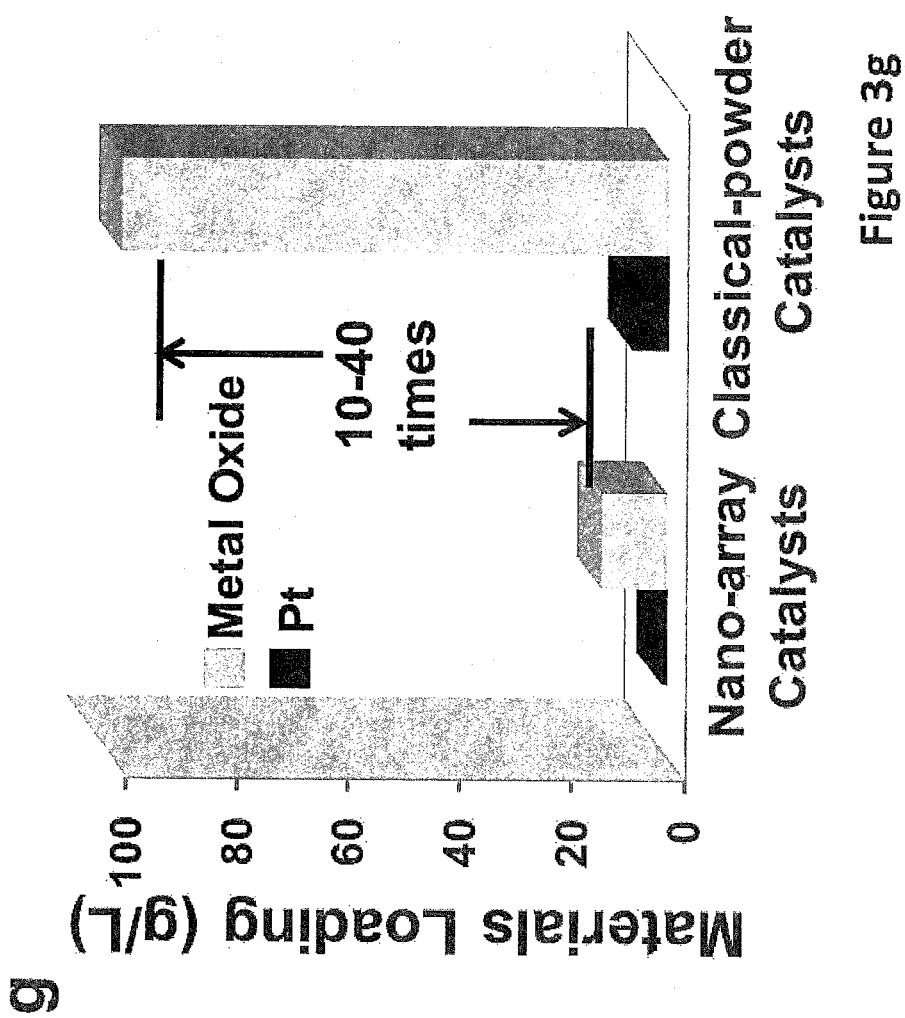
FIG. 17g) Materials utilization efficiency of nano-array catalysts and open literature reported classical-powder washcoated catalysts.

Compared with the open literature reported catalysts with comparable catalytic performance, the materials utilization efficiency of these nano-array monolithic catalysts (FIG. 17g) is about 10-40 times higher with extremely small loadings of precious metal and metal oxide nano-arrays used (see below and Tables 6, 7 and 8 below). See also Kim, C. H.; Qi, G.; Dahlberg, K.; Li, W. Science 2010, 327, 1624-1627; Boger, T.; Heibel, A. K.; Sorensen, C. M. Ind. Eng. Chem. Res. 2004, 43, 4602-4611; Ji, Y.; Easterling, V.; Graham, U; Fisk, C.; Crocker, M.; Choi, J.-S. Appl. Catal. B 2011, 103, 413-427; Carlsson, P.-A.; Skoglundh, M.; Thormählen, P.; Andersson, B. Top. Catal. 2004, 30-31, 375-381; Roberts, G. W.; Chin, P.; Sun, X.; Spivey, J. J. Appl. Catal. B 2003, 46, 601 611.

TABLE 6

Catalysts usage and 50% conversion temperature of some typical Pt monolithic catalysts reported in literature.

| Catalyst | Mass (metal oxide, mg) | Mass (Pt, mg) | Flow rate (ml/min) | Space velocity ($h^{-1}$) | CO percentage (vol. %) | $T_{50}$(° C.) | Reference |
|---|---|---|---|---|---|---|---|
| Pt/Cordierite | N/A | 0.25 | 50 | N/A | 3% CO in air | 223 | a |
| Pt/Cordierite | N/A | 6 | 50 | N/A | 3% CO in air | 195 | a |
| Pt/γ-$Al_2O_3$ | 72 | 14 | 500 | 30,000 | 1% CO in air | 180 | b |
| Pt/γ-$Al_2O_3$ | 260 | 0.52 | 2000 | 39,000 | 0.1% CO, 10% $O_2/N_2$ | 159-188 | c | a: P. Sonstrom, B. Halbach, S. Tambou Djakpou, B. Ritz, K. Ahrenstorf, G. Grathwohl, H. Weller, M. Baumer, Catal. Sci. Technol. 2011, 1, 830.
b: R. M. Ferrizz, J. N. Stuecker, J. Cesarano, J. E. Miller, Ind. Eng. Chem. Res. 2005, 44, 302.
c: K. Arnby, J. Assiks, P.-A. Carlsson, A. Palmqvist, M. Skoglundh, J. Catal. 2005, 233, 176.

40

TABLE 7

Catalysts usage and 100% conversion temperature of some typical supported Pt powder catalysts reported in literature.

| Catalyst | Mass (metal oxide, mg) | Mass (Pt, mg) | Flow rate (ml/min) | Space velocity ($h^{-1}$) | CO percentage (vol.) | $T_{100}$(° C.) | Reference |
|---|---|---|---|---|---|---|---|
| Pt/$TiO_2$ | 77 | 0.77 | 154 | 120,000 ml/g · h | 1% CO in air | 210 | d |
| Pt/ZnO—$Al_2O_3$ | ZnO: 3.76 $Al_2O_3$: 95 | 2.08 | 50 | N/A | 2% CO/He; air | 225 | e |
| Pt/ZnO | 49.5 | 0.5 | 100 | 96,000 | 0.5% CO; 10% $O_2$/Ar | 160 | f |
| Pt/$CeO_2$ | 9 | 3.5 | 50 | N/A | 1% CO; 20% $O_2$ in He | 223 (mixture) | g | d: O. S. Alexeev, S. Y. Chin, M. H. Engelhard, L. Ortiz-Soto, M. D. Amiridis, J. Phys. Chem. B 2005, 109, 23430.
e: K.-J. Kim, H.-S. Seo, H.-G. Ahn, Res. Chem. Intermed. 2011, 37, 1165.
f: S. Li, G. Liu, H. Lian, M. Jia, G. Zhao, D. Jiang, W. Zhang, Catal. Commun. 2008, 9, 1045.
g: H.-P. Zhou, H.-S. Wu, J. Shen, A.-X. Yin, L.-D. Sun, C.-H. Yan, J. Am. Chem. Soc. 2010, 132, 4998.

TABLE 8

Comparison of catalysts usage between nano-array monolithic catalysts and typical washcoating monolithic catalysts.

| Catalyst | Metal oxide (g/L) | Precious metal (g/L) | Catalysts layer thickness (μm) | reference |
|---|---|---|---|---|
| Nano-array monolithic catalysts | 6.5-88 | 0.49-0.88 | 1-10 | This work |
| Washcoat monolithic catalysts (Al$_2$O$_3$ based) | 98-260 | 1.77-11.76 | 15-100 | h | h: Kim, C. H.; Qi, G.; Dahlberg, K.; Li, W. Science 2010, 327, 1624-1627; Boger, T.; Heibel, A. K.; Sorensen, C. M. Ind. Eng. Chem. Res. 2004, 43, 4602-4611; Ji, Y.; Easterling, V.; Graham, U.; Fisk, C.; Crocker, M.; Choi, J.-S. Appl. Catal. B 2011, 103, 413-427; Carlsson, P.-A.; Skoglundh, M.; Thormahlen, P.; Andersson, B. Top. Catal. 2004, 30-31, 375-381; Roberts, G. W.; Chin, P.; Sun, X.; Spivey, J. J. Appl. Catal. B 2003, 46, 601 611

Figure 17H:
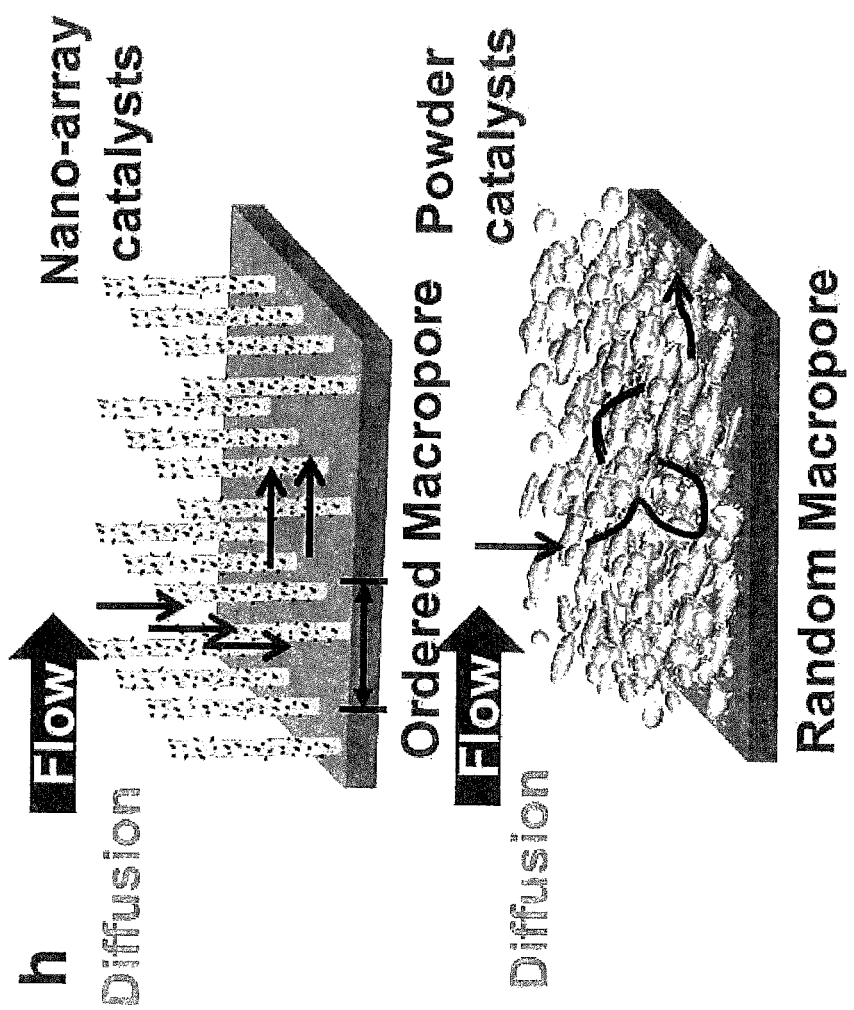
FIG. 17h) a schematic model of nano-array catalysts and traditional nano-powder catalysts.

It has been predicted that by introduction of macropores into mesoporous catalysts, 20-40% less usage of catalytic material but 80-180% higher activity than the purely mesoporous catalysts can be achieved. Moreover, the reactivity of optimally arranged pore architecture can be 8-10 times better than the reactivity of random pores. See Wang, G.; Johannessen, E.; Kleijn, C. R.; de Leeuw, S. W.; Coppens, M. O. Chem. Eng. J. 2007, 62, 5110-5116; Prachayawarakorn, S.; Mann, R. Catal. Today 2007, 128, 88-99. The 3-D configured nano-arrays have intrinsically ordered macropores between individual nanostructures, which form ordered macroporous channels. These ordered macroporous channels not only enable an optimum metal loading and dispersion during catalyst preparation, but also better expose the available active sites and promote gas-solid interaction by a much shorter diffusion length (FIG. 17h). The mesoporous nano structure/Pt nanoparticle interfaces may also enable more effective charge transport and thus enhanced reaction efficiency.

Figure 18A:
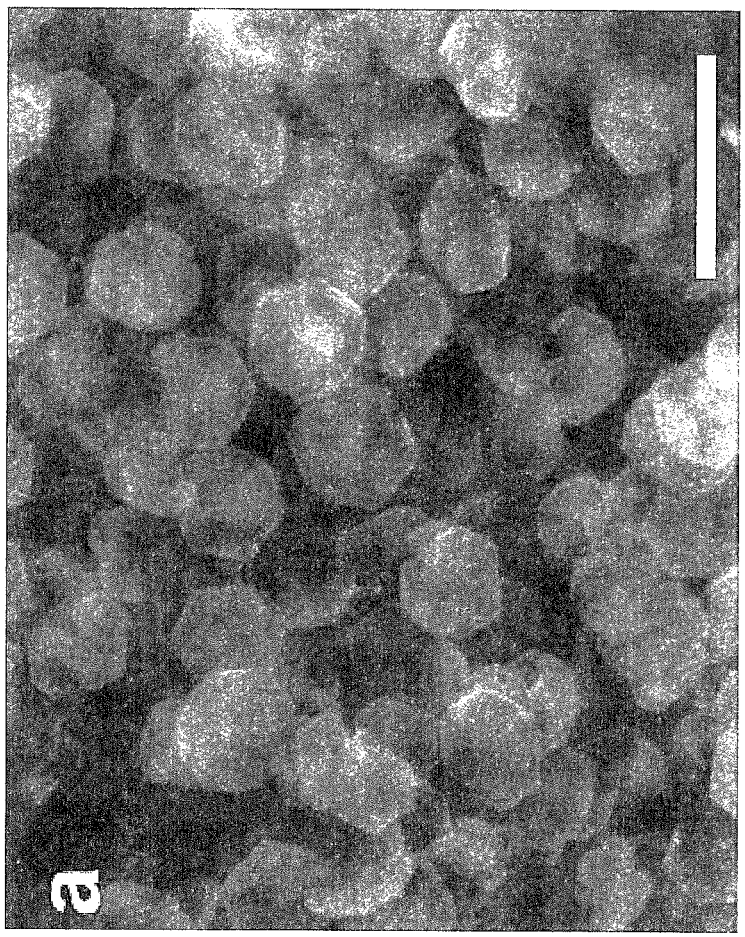
FIG. 18a) ZnO Plates.
Figure 18B:
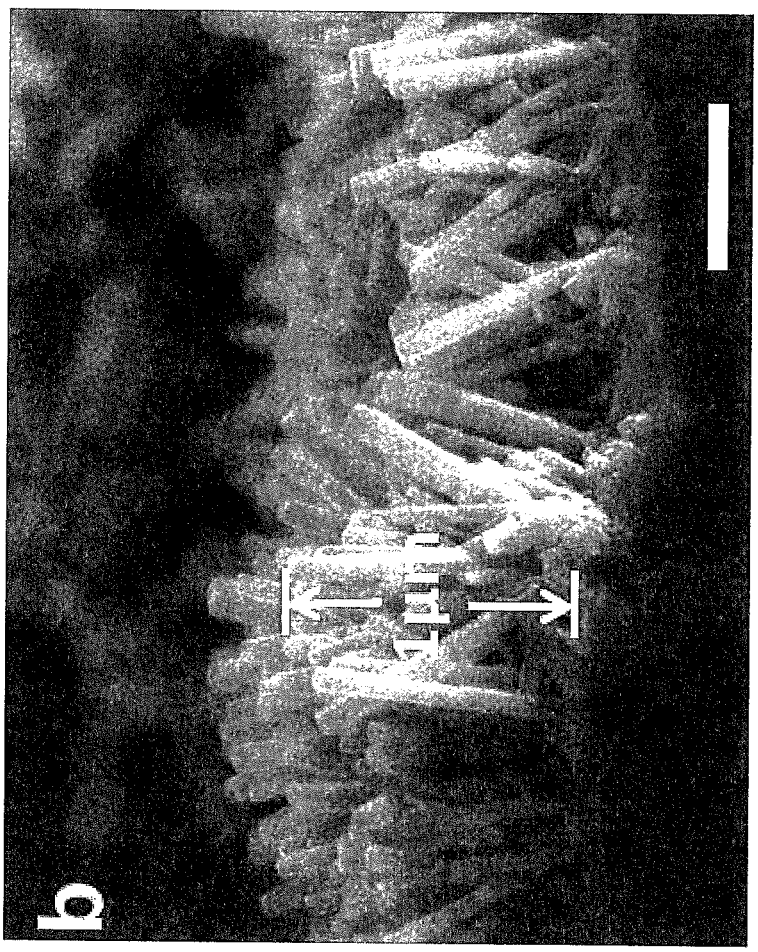
FIG. 18b) 1 µm ZnO nanorods.
Figure 18C:
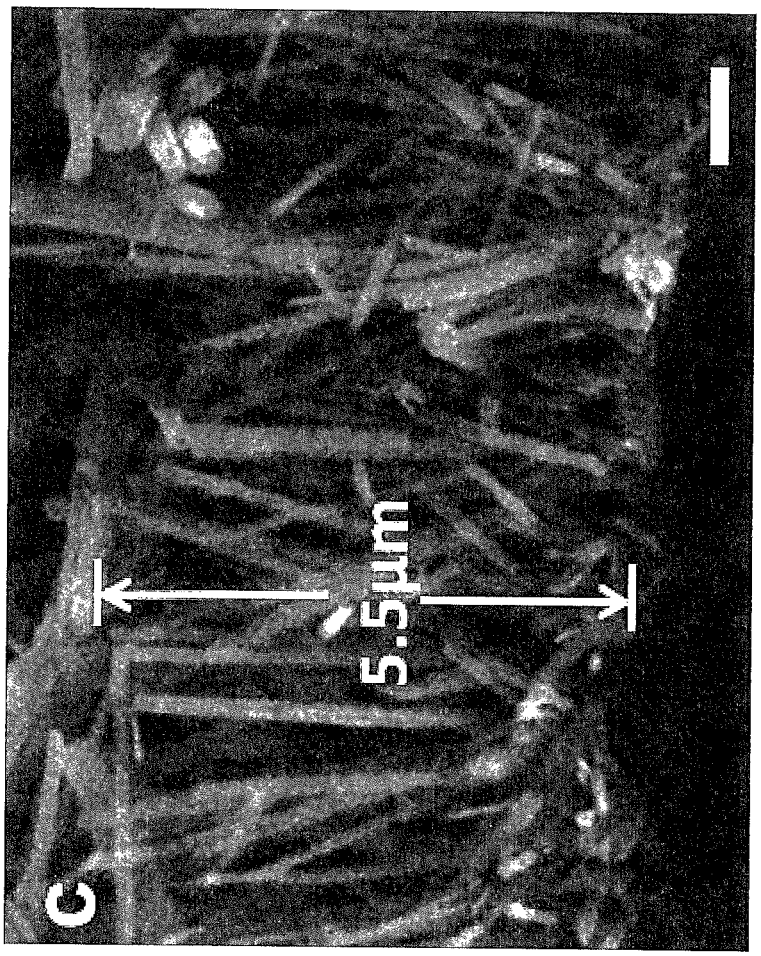
FIG. 18c) 5 µm ZnO nanorods.
Figure 18D:
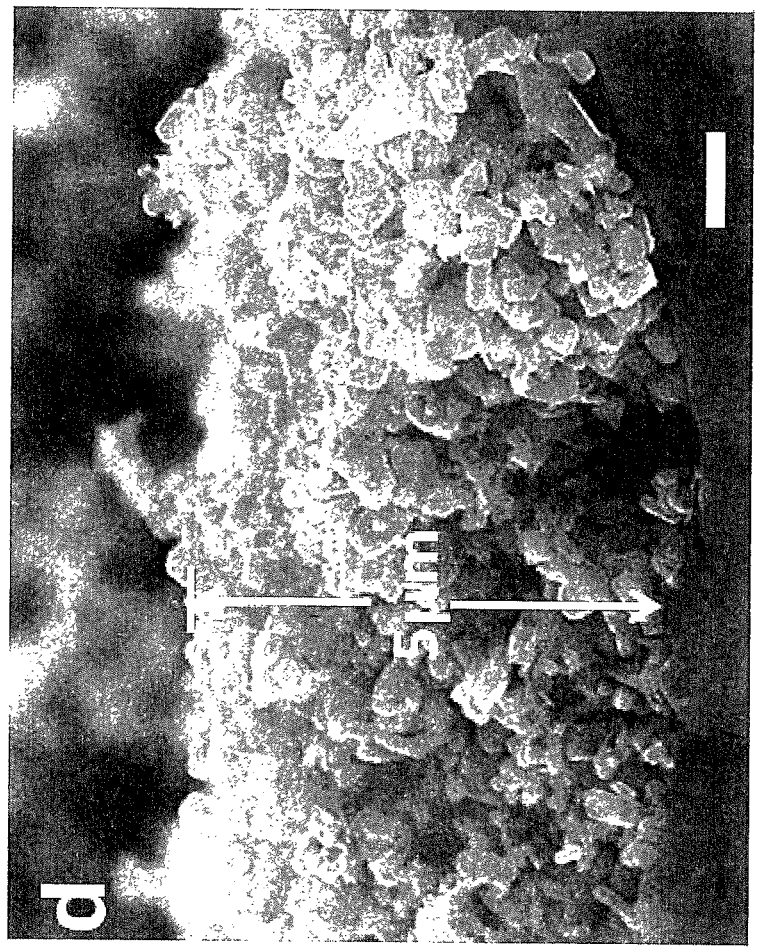
FIG. 18d) 5 µm ZnO washcoated powders.
Figure 18E:
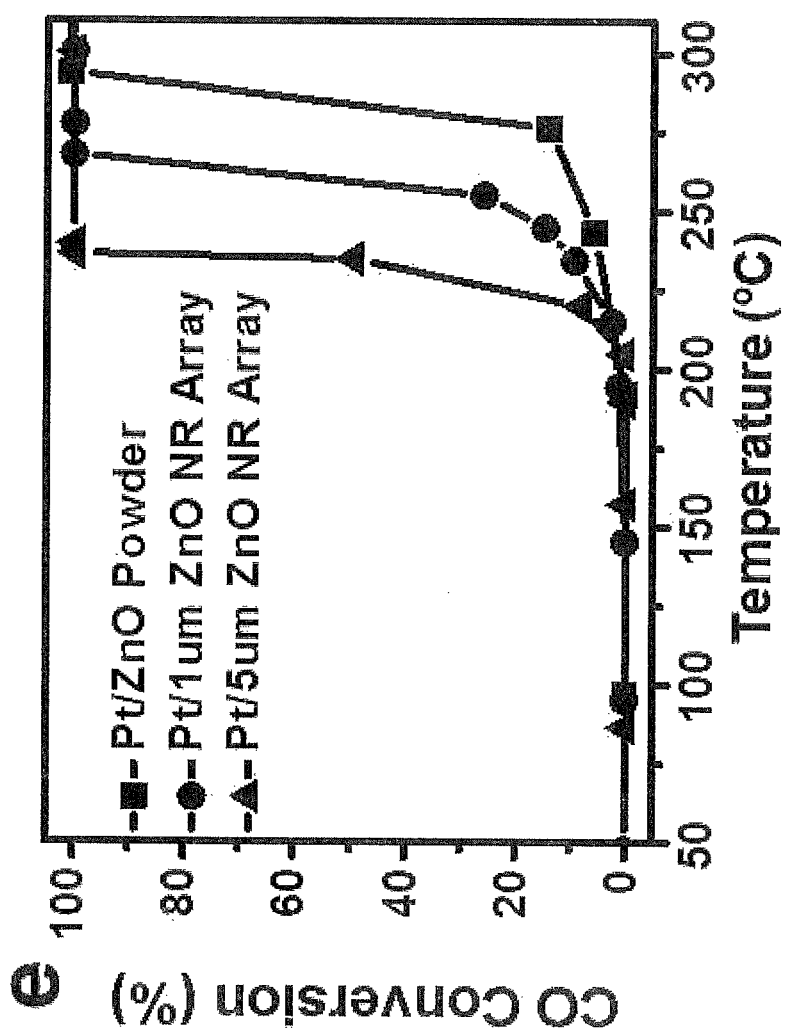
FIG. 18e) CO oxidation conversion as a function of temperature over 1 µm and 5 µM long Pt-loaded ZnO nanorod array and washcoated powder catalysts.
Figure 18F:
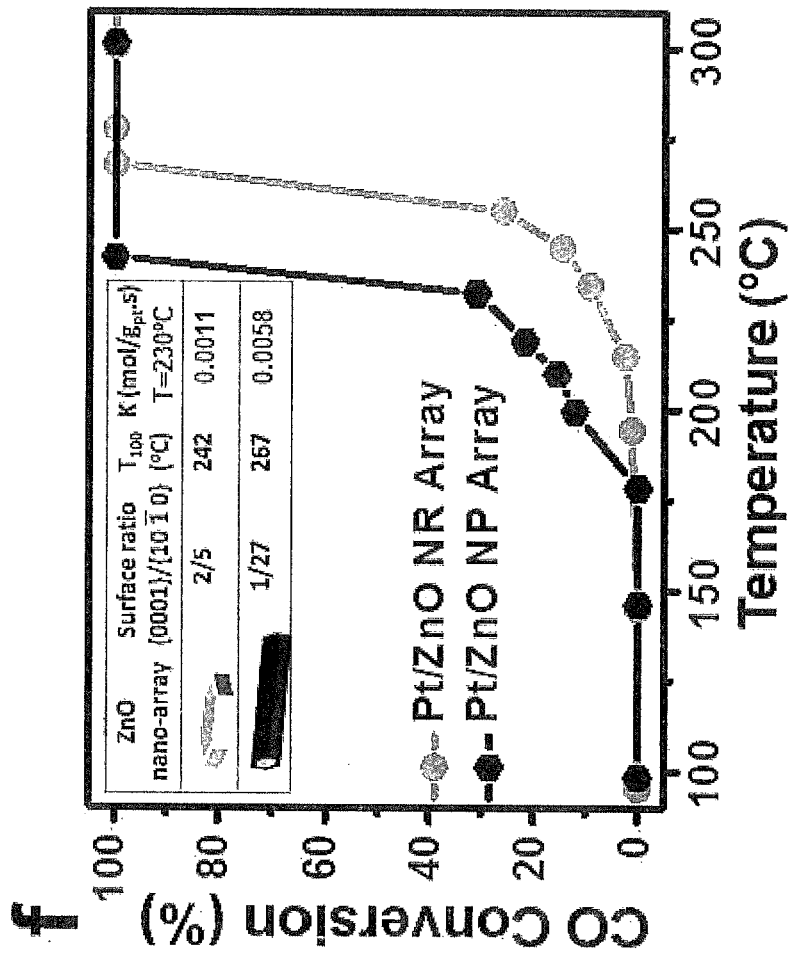
FIG. 18f) CO oxidation conversion as a function of temperature over Pt—ZnO nanorod arrays and Pt—ZnO nanoplate arrays. The 2 nm Pt nanoparticles were loaded on ZnO nano-array monoliths. Scale bar in all the insets is 1 µm.

The morphology and metal-metal oxide support interaction dependence of catalytic activity in nanostructured catalysts are important for rational design, synthesis, and application of catalysts. To gain such understanding, however, is a non-trivial task. Here, the inventors use the Pt/ZnO nano-array monolithic catalysts as a model platform to practically investigate the catalytic activity dependence on the nanostructure size, shape (crystal facets), and metal-support interaction. Different ZnO nanostructure coated monolithic samples were fabricated as shown in FIGS. 18a-18d. With similar Pt loading, 5.5 μm ZnO nanowire array monolithic catalysts exhibited better CO oxidation catalytic activity than 1 μm ZnO nanorod arrays, and both of them were better than washcoated ZnO powder monolithic catalysts with similar materials loading (FIG. 18e). The $T_{10}$ temperature of 5.5 μm Pt/ZnO nanowire array decreased by about 10° C. (220° C.), and light-off ($T_{50}$) and conversion ($T_{100}$) temperatures decreased by about 30° C. compared to those of the 1 μm one, which are also about 20° C. lower than those of the washcoated powder catalysts. With the calculated catalytic activities (per gram of Pt) at 230° C. for the 5.5 μm and 1 μm Pt/ZnO nanowire arrays being 4.1 mmol and 1.1 mmol, respectively (Table 11), while the activity of corresponding Pt/ZnO washcoated powder catalysts is 0.56 mmol, i.e., about 2-7 times lower. The activity difference between nano-array catalysts and washcoated catalysts further directly confirmed that the arranged macropore distribution could play an important role to improve the catalytic activity. The CO conversion efficiency enhancement with increasing nanowire length may be due to a higher dispersion of Pt nanoparticles on longer ZnO nanowires, associated with their increased chance for strong ZnO—Pt interaction and more exposed active sites. See Liu, B.; Han, S.; Tanaka, K.; Shioyama, H.; Xu, Q. Bull. Chem. Soc. Jpn. 2009, 82, 1052-1054; Pala, R. G. S.; Metiu, H. J. Phys. Chem. C 2007, 111, 8617-8622. On the other hand, to investigate the shape dependence of catalytic behavior, ZnO nano-arrays made of nanorods and nanoplates with the same mass loading were uniformly grown on monolithic substrates. These catalysts had predominantly {0001} or {01-10} crystal surfaces, with identical mass loading over ZnO nano-arrays, normalized amount, crystallinity and size of Pt nanoparticles. The CO light-off curves in FIG. 18f clearly suggest that the Pt/ZnO nanoplate array had an about 20° C. lower $T_{100}$ (242° C.) than the ZnO nanorod array catalysts. Given the identical experimental parameters control, the catalytic activity difference between the nanoplate and nanorod catalysts is due to the different crystal surface area ratio of {0001} to {10-10} (inset of FIG. 18f), i.e., the different Pt—ZnO facets interaction effect. The interaction of Pt and $Zn^{2+}$ may lead to localized electron transfer on Zn-terminated (0001) surface, resulting in lower CO desorption temperature responsible for the lower CO oxidation temperature in Pt/ZnO nanoplate as compared to that of Pt/ZnO nanorod. See Roberts, S.; Gorte, R. J. J. Chem. Phys. 1990, 93, 5337-5344; Petrie, W. T.; Vohs, J. M. J. Chem. Phys. 1994, 101, 8098-8107.

In summary, the 3-D metal oxide nano-array based monolithic catalysts represent a new and effective model platform for bridging catalytic nanomaterials science and engineering with practical industrial catalysis. It will help enhance predictive catalysis science through enabling exacting relations between nanomaterials tunable in size, shape, and structure, tailorable metal-support interaction, and multifunctional catalytic performances. Therefore, the 3-D configured nano-array based monoliths provide a general strategy for integration of different functional nano-structure arrays with commercially available monolithic substrates, and may bring up a broad array of nanostructure based monolithic devices with ultra-efficient, robust, and multifunctional performance for various catalytic energy, environmental, and biotechnology applications.

Materials and Methods.

Materials

The chemicals used, including zinc acetate dihydrate (Zn(CH$_3$COO)$_2$.2H$_2$O), zinc nitrate hexahydrate (Zn(NO$_3$)$_2$.6H$_2$O), cobalt chloride hexahydrate (CoCl$_2$.6H$_2$O), cerium nitrate (Ce(NO$_3$)$_3$), sodium chloride (NaCl), lanthanum nitrate hexahydrate (La(NO$_3$)$_3$.6H$_2$O), strontium nitrate (Sr(NO$_3$)$_2$), cobalt nitrate (Co(NO$_3$)$_3$), ethoxyethanol, polyvinylpyrrolidone (Mw 55000, 1.1 gram), urea and diethanolamine, were purchased from Fisher Scientific. Hexamethylenetetramine (HMT, 99%) was purchased from Acros. The dilute solution of TiCl$_3$ (0.15 M) was supplied by Spectrum Chemical MFG. Corp. All chemicals were used as received without further purification. The cordierite and stainless steel monolith substrates were provided by Honda Research Institute (Columbus, Ohio) and Corning Inc. (Corning, N.Y.). The cordierite monolith had 1 mm×1 mm square channels and 100 μm in wall thickness, with a diameter in a range of 1" to a few inches. The stainless steel monoliths were 1"wide and 1-3" high.

Characterization

Morphology and structure of the nano-array monolithic catalysts were characterized using a JEOL 6335F Field Emission Scanning Electron Microscope (FESEM) attached with an Energy-Dispersive X-ray Spectrometer (EDXS), a JEOL 2010 FasTEM High-Resolution Transmission Electron Microscope (HRTEM), and a BRUKER AXS D5005 (Cu Kα, 1.540598 Å) X-ray Diffractometer (XRD), at room temperature. The BET surface area and pore size distribution were characterized using Quantachrome NoVA 1000 Gas Sorption Analyzer and Micromeritics ASAP 2020 physisorption analyzer. The thermal stability of samples was investigated using TA instruments SDT Q600 and Q500, and Temperature Programmed Reduction (TPR) under 10 vol. % $H_2/N_2$ was performed using Micromeritics ChemiSorb 2720. The mass loading of metal oxide nano-array and Pt nanoparticles on monolithic substrates were determined using a Perkin Elmer/DRC-e Inductively Coupled Plasma Mass Spectrometer (ICP-MS) and TEM EDXS.

Growth of $TiO_2$ Nanorod Array.

Aligned, single-crystalline brookite $TiO_2$ nanorod arrays were grown on ceramic honeycomb substrate by a low-temperature hydrothermal approach that is very suitable for inexpensive mass production. See E. Hosono, S. Fujihara, K. Kakiuchi, H. Imai, J. Am. Chem. Soc. 2004, 126, 7790. Nanostructured brookite $TiO_2$ was synthesized by hydrothermal treatment of aqueous titanium trichloride ($TiCl_3$) solutions with saturated sodium chloride (NaCl). Typically, 20 ml of the precursor solution including 3 g of $TiCl_3$ and 10 g of DI-water saturated with NaCl was placed in a Teflon-lined autoclave. Either honeycomb cordierite ceramic (or stainless steel) monoliths were then used as substrates and immersed in the solutions. The autoclaves were then heated to 220° C. and maintained for 18 h. After the autoclave was cooled to room temperature, the honeycomb cordierite monoliths were rinsed thoroughly with deionized (DI) water and allowed to dry on a hot plate at 80° C.

Growth of ZnO Nanorod and Nanowire Array.

ZnO nanorod array monolith catalysts were fabricated using methods known in the art modified as described below. See X. Qian, H. Liu, Y. Guo, Song, Y. Y. Li, Nanoscale Res. Lett. 2008, 3, 303. The monolith cordierite was first cleaned by DI water and ethanol in ultrasonic bath and then surface-modified (via dip-coating) with 20 mM zinc acetate ethanol solution for several times to form a seed layer on the channel walls. The dip-coated substrate was then annealed at 350° C. for 5 hours to make the (002) face of ZnO crystal better oriented. After ZnO seed coating, ZnO nanorod growth was accomplished by a classic hydrothermal process. Equal molar zinc nitrate hexahydrate ($Zn(NO_3)_2.6H_2O$) and hexamethylenetetramine ($C_6H_{12}N_4$, HMT) (25 mM) were dissolved in 200 mL DI water as precursor. The annealed dip-coated substrate was then placed in the prepared precursor solution at 70-80° C. for 6 hours. The grown ZnO nanorods were rinsed in DI water and sonicated in ethanol for 10 minutes. Finally, the sample was dried at 80° C. in air for further characterization. The length of ZnO nanorods was tuned from 1-5 μm by repeated growth.

Growth of $CeO_2$ Nanotube Array.

$CeO_2$ nanotubes array was fabricated by ZnO templated growth. See Y. Chen, T. Tseng, Adv. Sci. Lett. 2008, 1, 123. First, ZnO nanorod array with (002) preferential orientation was prepared as described above for ZnO nanowire array growth. After 2 hr incubation growth of ZnO nanorod arrays at 75° C., cerium nitrate hexahydrate ($Ce(NO_3)_3.6H_2O$, 125 mM) was then added into the solution, in order to obtain the core/shell-type $ZnO/CeO_2$ nanorod arrays. Afterward, $ZnO/CeO_2$ nanorod arrays were immersed in a dilute hydrochloric acid solution (0.05 M) for 40 s at room temperature and then rinsed with DI water to remove residual contaminants such as compounds containing $Zn^{2+}$ or $CF$ in the $CeO_2$ nanotube arrays. Furthermore, for comparison with the as-grown nanostructure arrays, uncoated ZnO nanorod arrays were also prepared under the same conditions. The length of $CeO_2$ nanotubes is controlled by the length of ZnO template.

Growth of $Co_3O_4$ Nanowire Array.

The uniform $Co_3O_4$ nanowire arrays were obtained from calcinations of hydrothermally prepared cobalt chloride hydroxide carbonate ($(Co(CO_3)_{0.35}Cl_{0.2}(OH)_{1.1}.1.74H_2O$). See H. T. Wang, L. Zhang, X. H. Tan, C. M. B. Holt, B. Zahiri, B. C. Olsen, D. Mitlin, J. Phys. Chem. C 2011, 115, 17599. Briefly, 5 mL 0.5 M $CoCl_2.6H_2O$ and 5 mL 6 M urea solution were mixed under ultrasonic bath until the solution became transparent. The pre-cleaned cordierite substrate was then immersed into the as-prepared solution and sonicated for another 15 minutes before being placed into a water bath (90° C.) for 24 hrs. Then the substrate after growth was rinsed with DI water several times and was slowly annealed at 300° C. for 4 hrs.

Synthesis of Pt/Metal Oxide (MO) Nano-Array Catalysts.

The Pt/MO nanorod array catalysts were prepared using a colloidal deposition method. See Y. Wang, J. Ren, K. Deng, L. Gui, Y. Tang, Chem. Mater. 2000, 12, 1622. First, unprotected Pt nanoparticle colloid was synthesized by an ethylene glycol (EG) method, as described in the literature. See Y. Wang, J. Ren, K. Deng, L. Gui, Y. Tang, Chem. Mater. 2000, 12, 1622. Typically, all operations were carried out under inert atmosphere (Ar or $N_2$). In a typical preparation, a glycol solution of NaOH (50 mL, 0.5 M) was added into a glycol solution of $H_2PtCl_6.6H_2O$ (1.0 g, 1.93 mmol in 50 mL) with stirring to obtain a transparent yellow platinum hydroxide or oxide colloidal solution which was then heated at 160° C. for 3 h, with an Ar flow passing through the reaction system to take away water and organic byproducts. A transparent dark-brown homogeneous colloidal solution of the Pt metal nanocluster (Pt: 3.76 g/L glycol, 19.3 mmol/L) was obtained without any precipitates. For deposition, the as-prepared Pt colloid (Pt/cordierite=0.1 wt %) was diluted by adding ethanol or acetone as solvent to 15-20 mL in different volume. Cordierite monolith substrates with nanostructure arrays were then immersed into the dilute Pt colloid solution for 24 hours with magnetic stirring. Finally, the sample was dried at 80° C. in air, and Pt/MO nano-array monolithic catalysts were ready for use.

Synthesis of $ZnO/CeO_2$ Nano-Array Catalysts.

$ZnO/CeO_2$ decorated and core-shell nano-array catalysts were prepared by the same process of $CeO_2$ nanotube array without etching of ZnO template. $ZnO/CeO_2$ decorated or core-shell nanostructure can be controlled via $CeO_2$ deposition time and cycles.

Synthesis of $ZnO/(La,Sr)CoO_3$ (LSCO), ZnO/LSCO/Pt Nano-Array Catalysts.

The ZnO/LSCO, ZnO/LSCO/Pt nano-array catalysts were prepared by a similar procedure as $ZnO/CeO_2$ nano-array catalysts. First, a ZnO nanorod array with (002) preferential orientation was uniformly grown on cordierite monolith. Then, by dip coating the colloidal precursor, $(La,Sr)CoO_3$ or $(La,Sr)CoO3/Pt$ layers were uniformly coated on ZnO nanorod surface throughout the whole substrate. See D. Jian, P.-X. Gao, W. Cai, B. S. Allimi, P S. Alpay, Y. Ding, Z. L. Wang, C. Brooks, J. Mater. Chem. 2009, 19, 970. Finally, the substrate was annealed at 550° C. for 10 hours to ensure good crystallinity and adhesion of the coating.

Morphology and Structure of Various Nanostructure Arrays.

Figure 19:
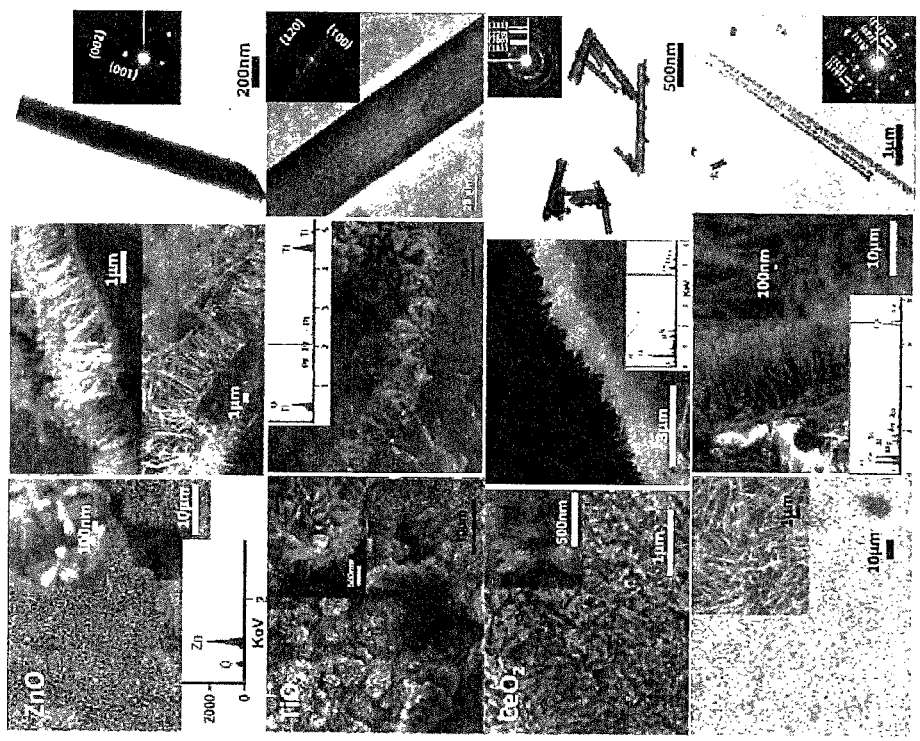
FIG. 19 shows SEM, EDXS, TEM and SAED analyses of single-component nanostructure arrays grown on cordierite monoliths: ZnO nanowire and nanorod array; TiO$_2$ nanorod array; CeO$_2$ nanotube array; and Co$_3$O$_4$ porous nanowire array.
Figure 20:
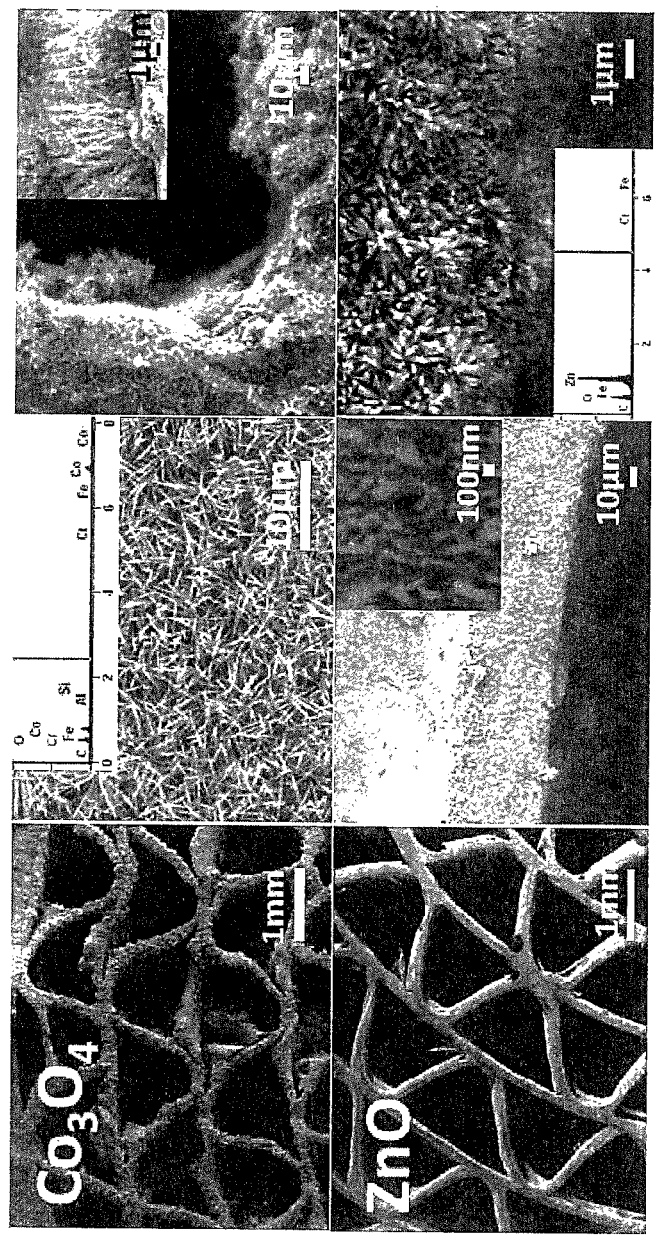
FIG. 20 shows SEM and EDXS analyses of single-component nanostructure array grown on stainless steel monoliths: Co$_3$O$_4$ porous nanowire array and ZnO nanorod array.

Examples of single component nanostructure arrays are shown in FIGS. 19 and 20.

Two-Component Nanostructure Arrays.

Figure 21:
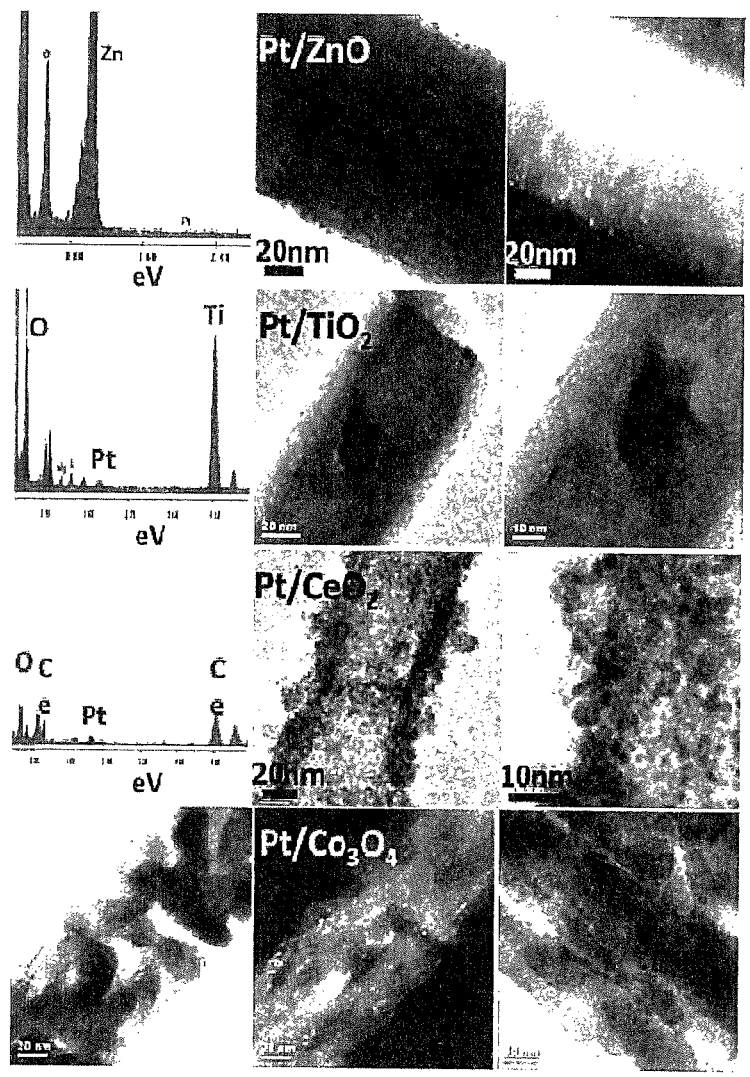
FIG. 21 shows TEM and EDXS analyses of Pt/Metal oxide nanostructures on cordierite monoliths: Pt/TiO$_2$ nanorods; Pt/ZnO nanorods; Pt/CeO$_2$ nanotubes; and Pt/Co$_3$O$_4$ porous nanowires.
Figure 22:
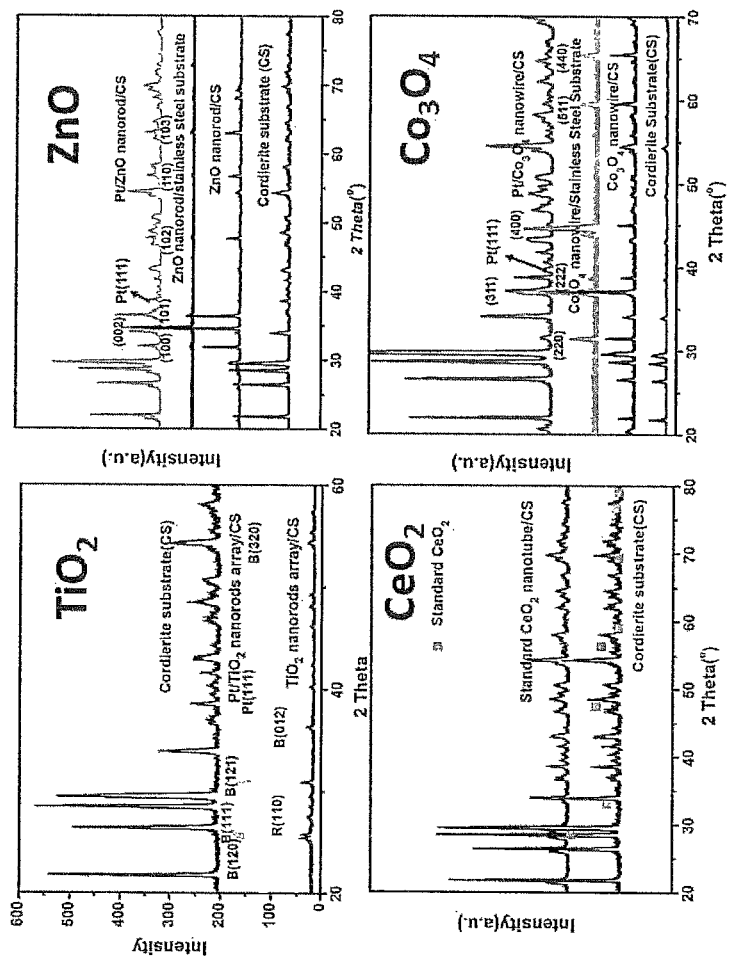
FIG. 22 shows XRD spectra of metal-oxide nanorod arrays on cordierite monolith substrates: TiO$_2$ and Pt/TiO$_2$ nanorod arrays; ZnO and Pt/ZnO nanorod/nanowire arrays; CeO$_2$ nanotube arrays; and Co$_3$O$_4$ and Pt/Co$_3$O$_4$ porous nanowire arrays.

Examples of noble metal-Metal oxide decorated nanostructure arrays are shown in FIGS. 21 and 22.

Figure 23:
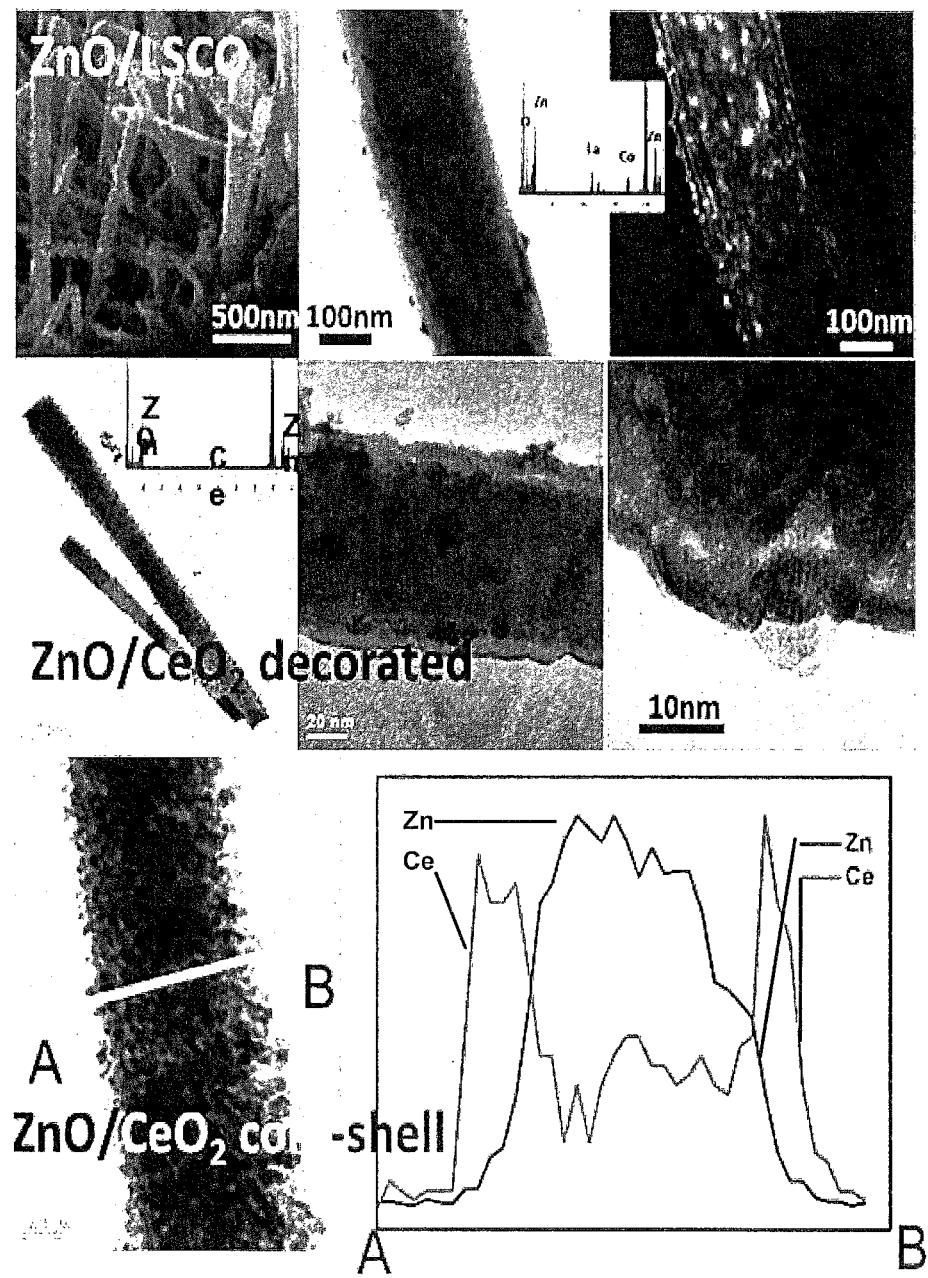
FIG. 23 shows electron microscopy images and spectra of metal oxide-metal oxide binary nanostructure array on monolith: ZnO/LSCO decorated nanorods; ZnO/CeO$_2$ decorated nanorods; and TEM image and corresponding EDS line analysis on ZnO/CeO$_2$ core-shell nanorod.

Examples of metal oxide-metal oxide decorated and core-shell nanostructure arrays are shown in FIG. 23.

Figure 24:
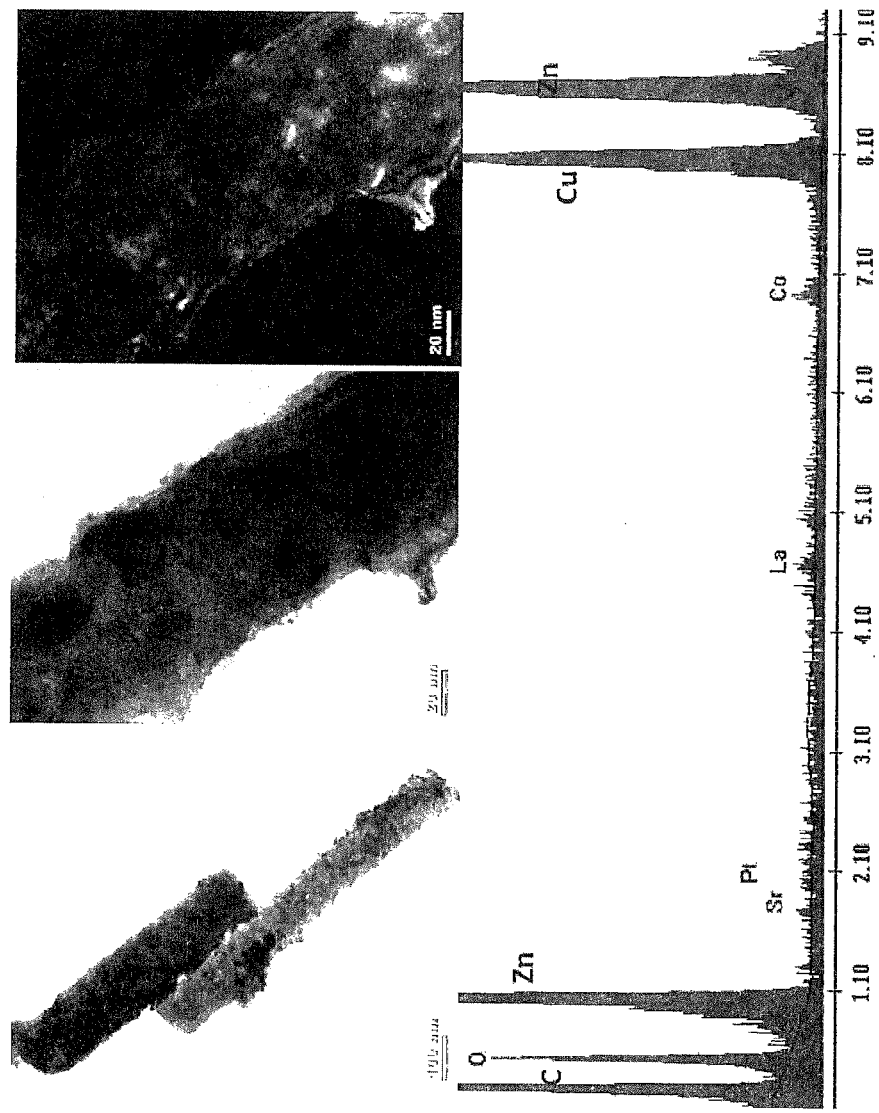
FIG. 24 shows a set of TEM images of typical ZnO/LSCO/Pt nanorods collected from the corresponding monolithic nano-array catalysts (top panel); and typical EDXS spectrum (bottom panel) of the ZnO/LSCO/Pt composite nanorod.

Examples of Multi-component nanostructure arrays (ZnO-LSCO—Pt) are shown in FIG. 24.

TABLE 6

The measured BET Specific surface area* of as-prepared nano-array based monolithic catalysts.

| Sample | Blank-Cordierite Monolith | Blank Stainless Steel Monolith | $TiO_2$-Cordierite Monolith | ZnO-Stainless Steel Monolith | $Co_3O_4$-Cordierite Monolith |
|---|---|---|---|---|---|
| BET Specific Surface Area ($m^2/g$) | 0.3 | 2.8 | 53.9 | 6.4 | 8.4 |

*All BET surface areas were calculated including the mass of monolith substrates. Cordierite monolith samples were tested on Micromeritics ASAP 2020 physi-sorption analyzer. Stainless steel sample were performed on Quantachrome NoVA 1000 gas sorption analyzer.

Figure 25:
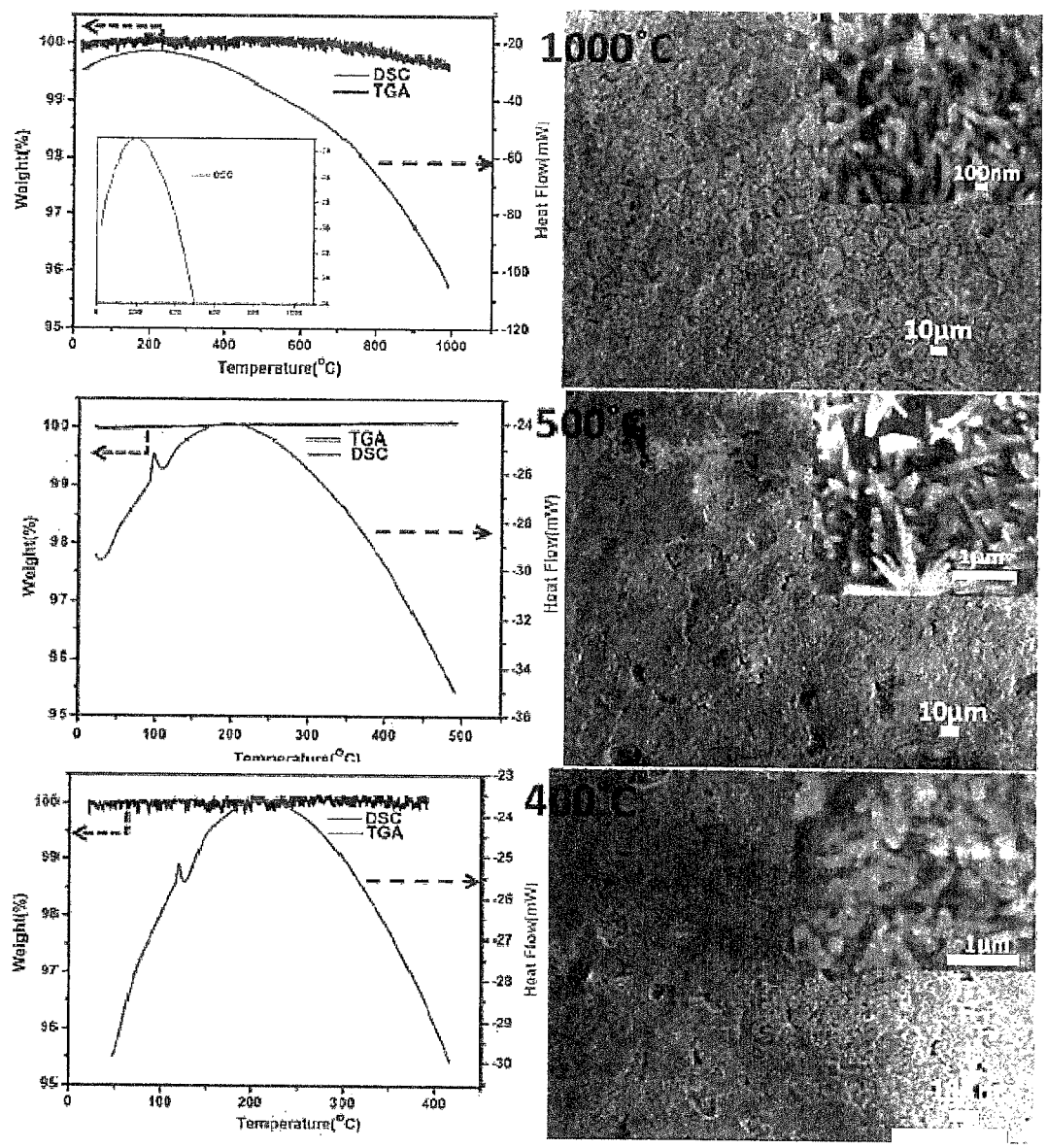
FIG. 25 shows thermal analyses (TGA, DSC) spectra and the corresponding SEM images after TGA testing of Ce nanotubes array on cordierite monolith at 400° C., 500° C., and 1000° C.
Figure 26:
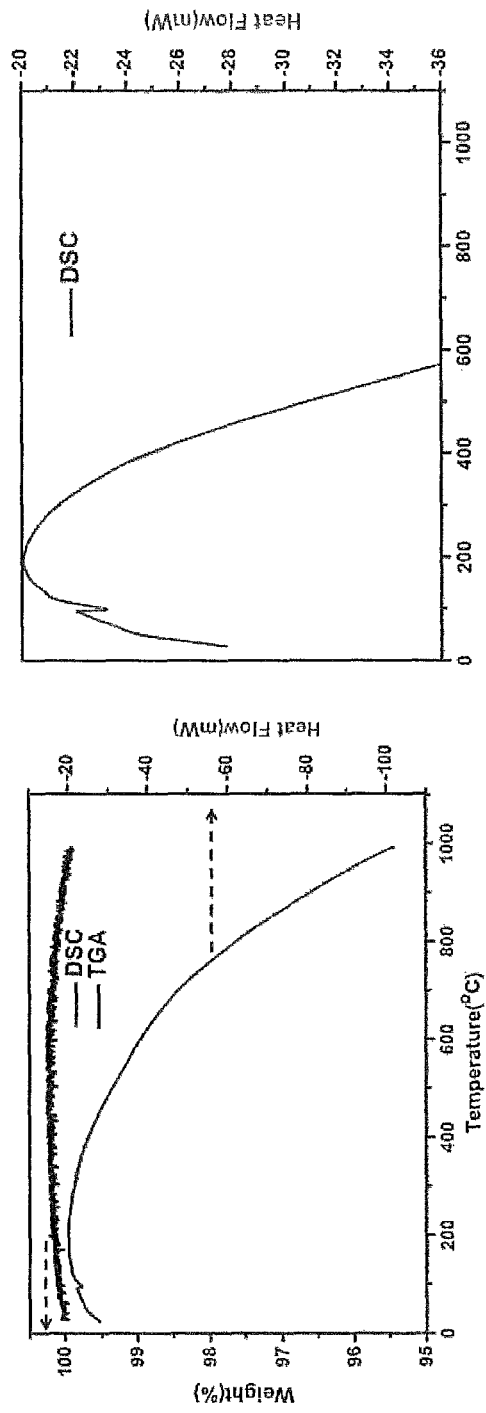
FIG. 26 shows thermal analyses (TGA and DSC) spectra of bare cordierite monolith substrate.
Figure 28:
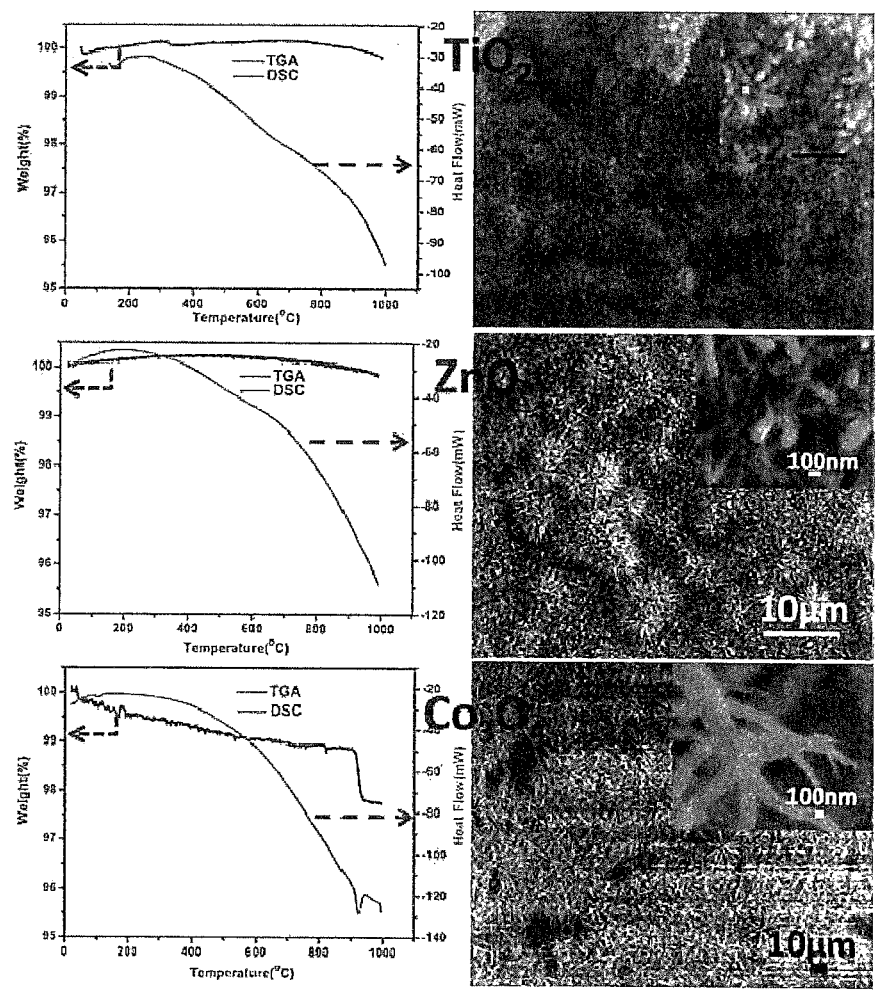
FIG. 28 shows TGA, DSC spectra and corresponding SEM image after testing of one-dimensional nanostructure grown on cordierite monolith: $TiO_2$ nanorod array; ZnO nanowires array; and $Co_3O_4$ porous nanowires array.

Thermal and Mechanical Stability $CeO_2$ Nanotube Array Monolithic Catalysts: Thermal and Mechanical Stability TGA-DSC spectra and the corresponding SEM images after thermal analysis experiments on the $CeO_2$ nanotube array based monolith sample are shown in FIG. 25. After the 1000° C. TGA test, the uniform layer of $CeO_2$ nanotube array cracked into isolated islands about 10 μm wide individually, which are composed of intact $CeO_2$ nanotube arrays. However, $CeO_2$ nanotube array morphology was retained in large scale after 400° C. TGA test. With increasing TGA temperature to 500° C., the nanotube array structure collapsed as a result of a sintering effect, with some of them easily peeled off from the monolith substrate during the sample preparation. These results indicate that the template-induced $CeO_2$ nanotube array needs to work below 500° C. in order to maintain its mechanical soundness. Compared with the thermal analysis spectra of bare cordierite monolith in FIG. 26 and metal oxide nano-array monolithic catalysts (FIGS. 25 and 28), the small peak on the DSC curve around 100° C. was also observed in all those spectra, which suggest the peak around 100° C. originated from the monolith substrate and not from the metal oxide nano-arrays.

Figure 27A:
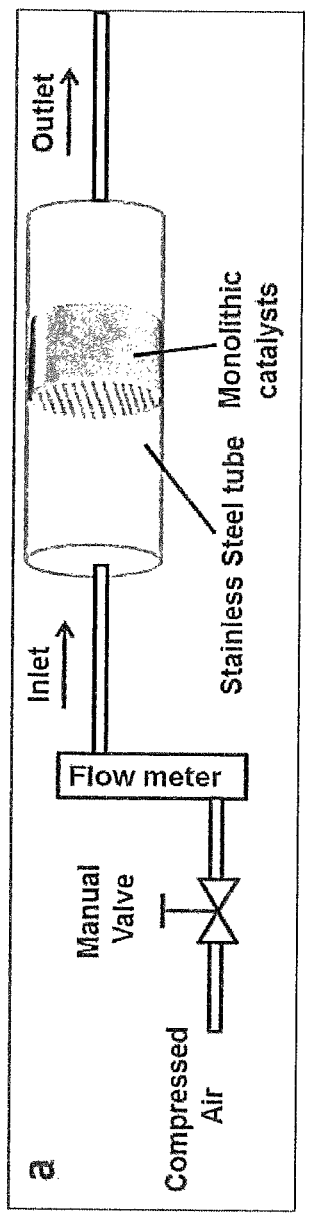
FIG. 27a) schematic setup of high velocity air flow (static 50 L/min or pulsatile flow) stability test on nano-array based monolithic catalysts.
Figure 27B:
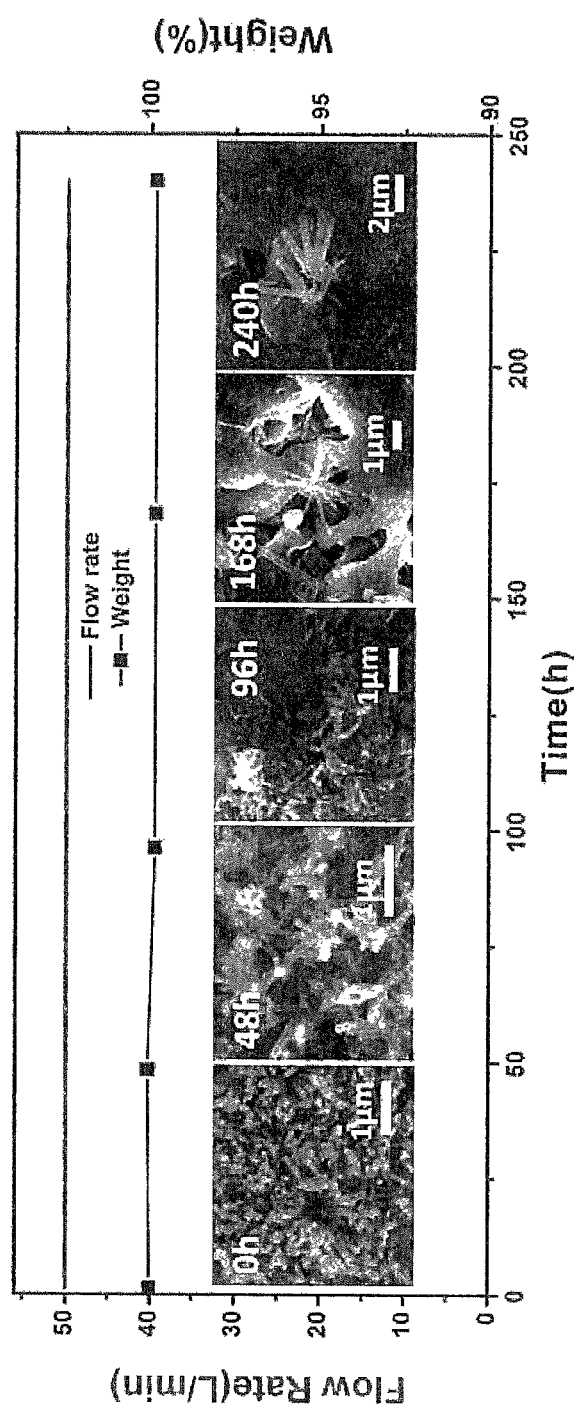
FIG. 27b) Time dependent morphology and weight loss of 1 μm $CeO_2$ nanotube array on cordierite monolith at a constant air flow of 50 L/min.

Constant flow flushing tests were performed to test the mechanical (adhesion and structure) stability of $CeO_2$ nanotube array on cordierite monolith. After flushing for 48 h, serious structural damage was observed (FIG. 27b), as some of the $CeO_2$ nanotubes were blown down by air flow and started to aggregate. After continuing flushing for another 48 hours, a large area of bare substrate appeared on the monolith substrate and nearly half of the $CeO_2$ nanotubes were blown away. After flushing for 168 hours, it was difficult to find $CeO_2$ nanotube arrays on the cordierite channels and just a few nanotubes left on the monolith surface. The weak adhesion in $CeO_2$ nanotube arrays to the substrates is due to the template process involved in their growth. Both ZnO seed layer removal and non-uniform distribution of $CeO_2$ coating on ZnO nanorod array templates have played important roles in drastically reducing the adhesion upon removal of ZnO nanorod templates. However, even though most of the $CeO_2$ nanotube array has been removed from the monolith substrate by the high flow rate of air, from the mass measurement conducted on the lab general research balance, the weight loss was still zero. This result suggests that the $CeO_2$ loading on monolith is very small, which is around the measurement limit of lab general balance (1%). This conclusion were also confirmed by the estimation of $CeO_2$ loading through EDS results of $ZnO:CeO_2$ weight ratio. The $Pt/CeO_2$ nano-array monoliths' thermal and mechanical stability could be improved through tubular structure/morphology optimization and structural reinforcement toward improving interface adhesion with monolith substrates. Along this line, direct growth of $CeO_2$ nanotube arrays or optimization of template growth on monoliths could be the alternative solutions.

Thermal and Mechanical Stability for Other Nanostructure Arrays.

The thermal stability of metal oxide nanostructure-arrays have been tested using thermo gravimetric analysis (TGA) and differential scanning calorimetry (DSC) techniques. During the thermal analysis process, there was only less than 0.5% mass loss for $TiO_2$ nanorods on cordierite monolith (top panel of FIG. 28). After TGA testing, nanorod array morphology and structure was retained both in large scale and in a single nanorod, which suggests that the $TiO_2$ nanorod array is very stable in the temperature range of 20-1000° C. The ZnO nanorod array also shows the similarly excellent thermal stability on both stainless steel and cordierite monoliths (middle panel of FIG. 28). For $Co_3O_4$ porous nanowire array (bottom panel of FIG. 28), the total weight loss is about 2.5% in the temperature range of 20-1000° C. The mass loss from 20-250 attributed to the $H_2O$ evaporation. There is a sudden weight loss around 900° C. in the TGA curve and a corresponding endothermic peak at the same temperature in the DSC curve, which suggest that an endothermic transition happened around 900° C. However, from the SEM image after the TGA test, there was no obvious morphology change for $Co_3O_4$ nanowires array. Given that the melting point and decomposition temperature of $Co_3O_4$ is around 900° C., there could be a small portion of $Co_3O_4$ nanowires decomposed or melted in the process, but it had only a minor effect on the nanowire array structure.

Figure 30A:
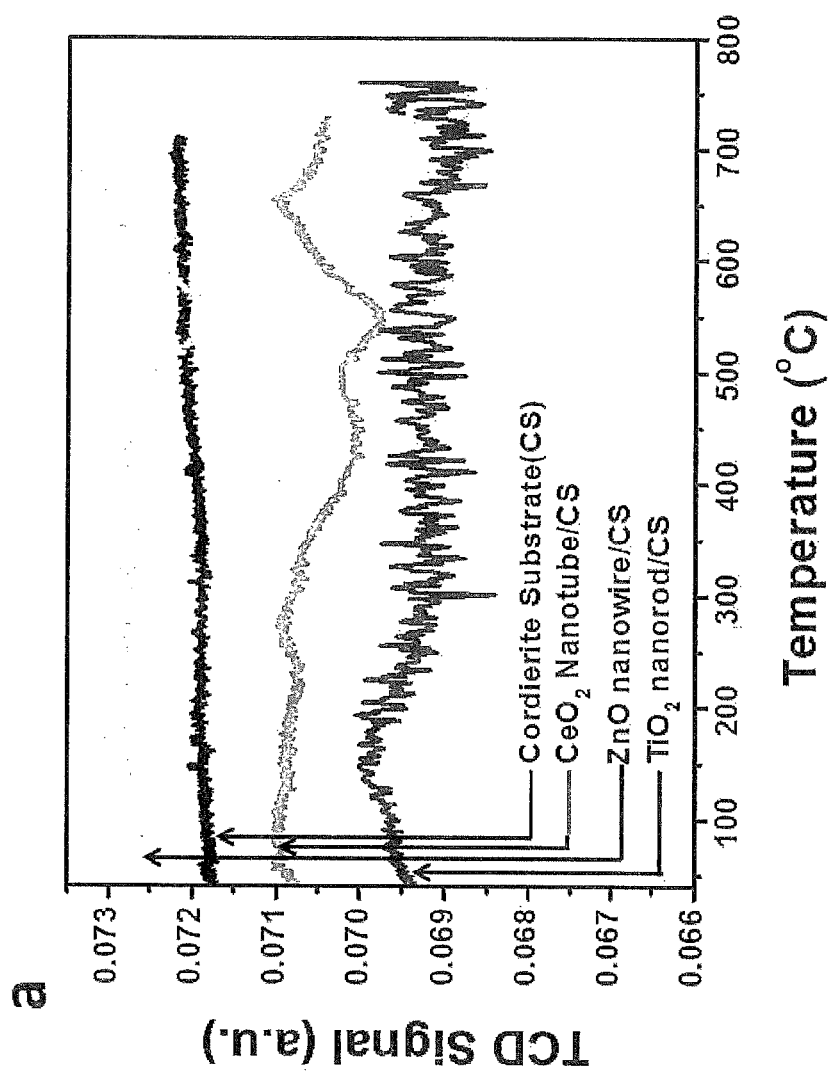
FIG. 30a, TPR-$H_2$ spectra of bare cordierite, $CeO_2$ nanotube on cordierite, ZnO nanowires on cordierite, $TiO_2$ nanorod on cordierite.
Figure 30B:
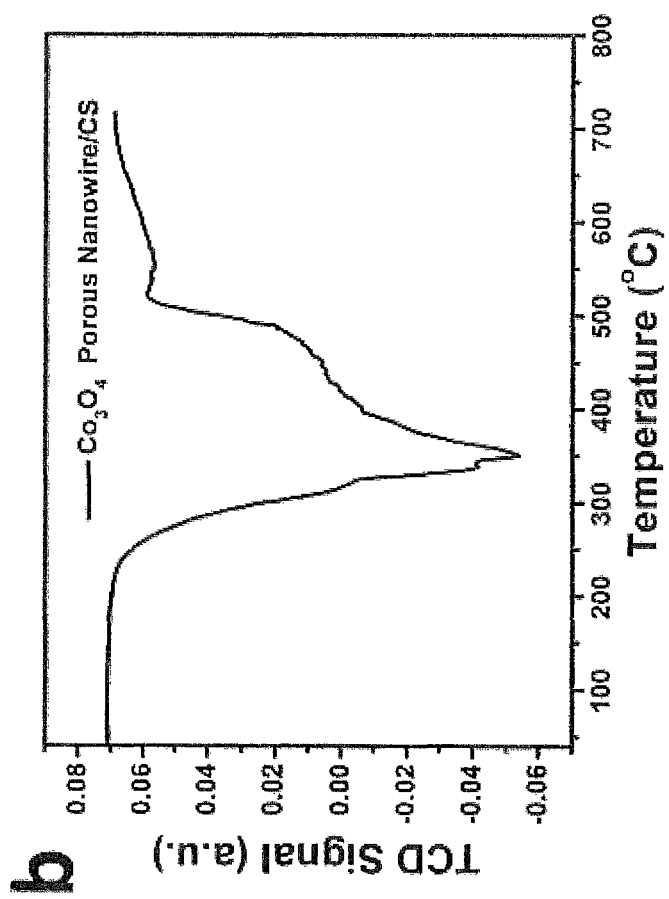
FIG. 30b, TPR-$H_2$ spectra of $Co_3O_4$ porous nanowire on cordierite.
Figure 30C:
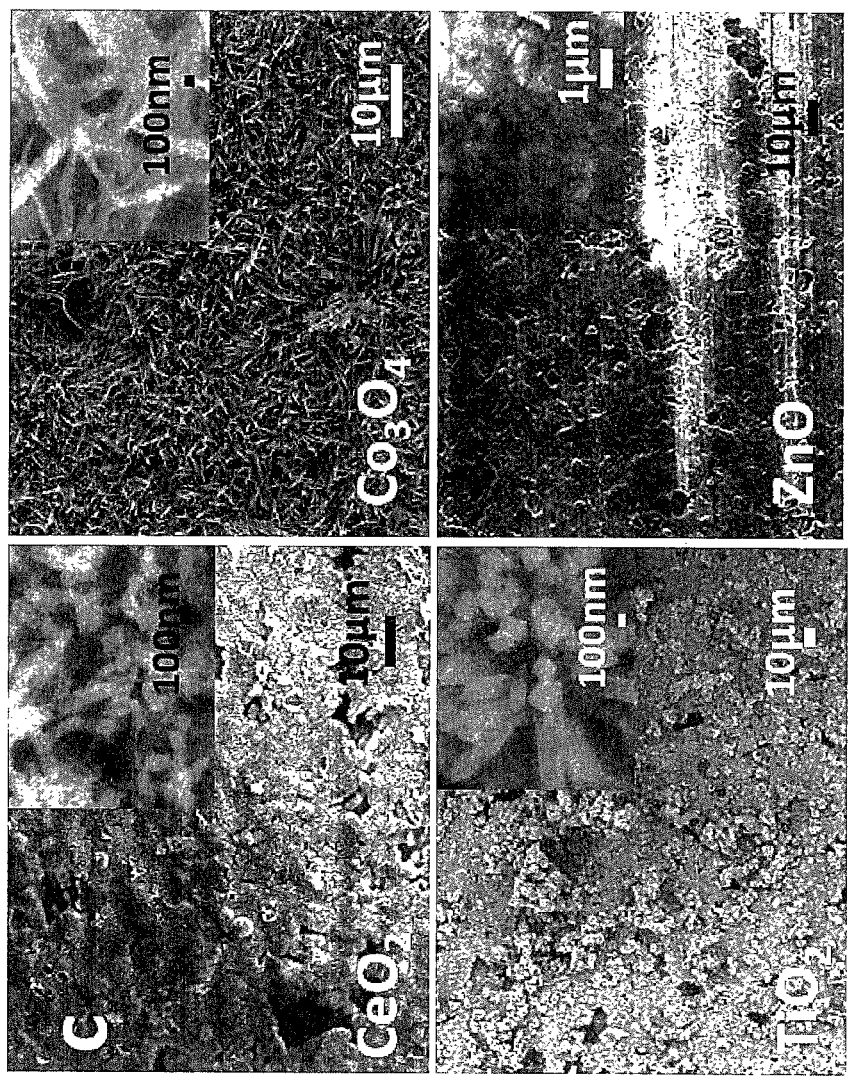
FIG. 30c, $CeO_2$ nanotubes array after TPR test; $Co_3O_4$ porous nanowire array after test; $TiO_2$ nanorod array after TPR test; and ZnO nanowires array after test.
Figure 31:
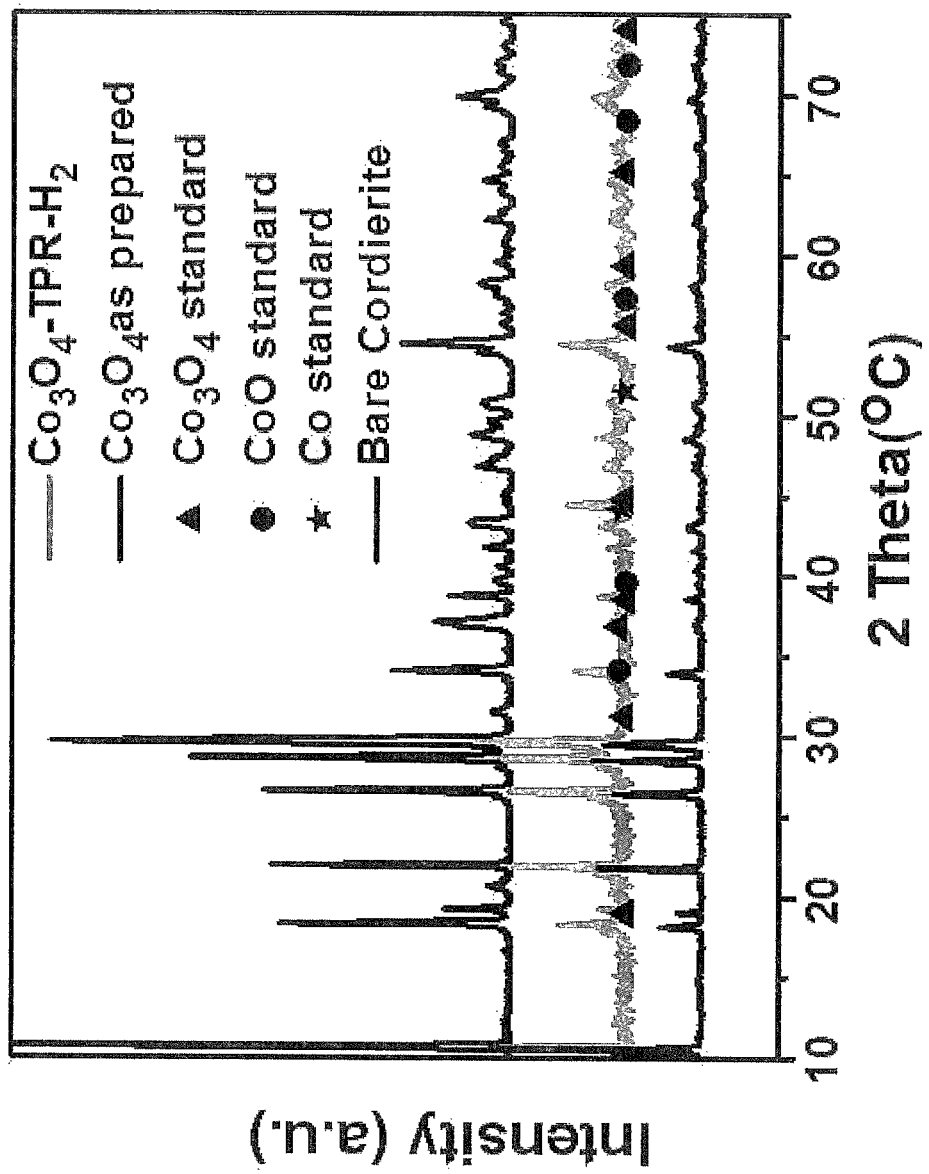
FIG. 31 shows XRD spectra of $Co_3O_4$ porous nanowire array on monolith substrate before and after TPR-$H_2$.

Thermal Stability in Reductive Atmosphere: Temperature Programmed Reduction (TPR) Under $H_2$ Temperature programmed $H_2$ reduction tests were carried out to evaluate the stability of metal oxide nanostructure arrays in reducing atmosphere. $TiO_2$ nanorods on cordierite monolith show high stability and inertness in $H_2$ atmosphere. There was no peak in the range of 20-750° C. and no structural change (as shown in FIGS. 30a and 30c, respectively). ZnO nanorods on monolith substrate started to be reduced at 450° C. with a peak centered at 550° C. The whole reduction window was in a range of between 450° C. and 650° C. TPR spectra of $Co_3O_4$ porous nanowires array on cordierite monolith and SEM image after TPR are shown in FIGS. 30b and 30c, respectively. There was a very large $H_2$ consuming peak in a range from 250-550° C. and centered at 350° C., which suggests that a reduction reaction may occur. No obvious structural changes were observed on the nanowire array structure under SEM. However, the XRD after TPR shows a Co peak in the spectrum that confirms that a certain amount of $Co_3O_4$ was reduced into metal Co in the TPR process. $CeO_2$ nanotube arrays on monolith substrates were also tested. There was a wide $H_2$ consuming peak in a range from 300-650° C. and centered at 400° C. and 550° C., respectively. No obvious structure changes were observed on the nanotube array structure under SEM. After TPR-$H_2$ testing, there seemed to be no ZnO left on the monolith substrate under SEM investigation. All ZnO nanorods were reduced into Zn in TPR process, and the Zn evaporated with the carrier flow in the process. Therefore, ZnO nanorod arrays are stable in reduced atmosphere below 450° C.

Pulsatile Flow and Mechanical (Ultrasonic) Vibration Stability.

Figure 32:
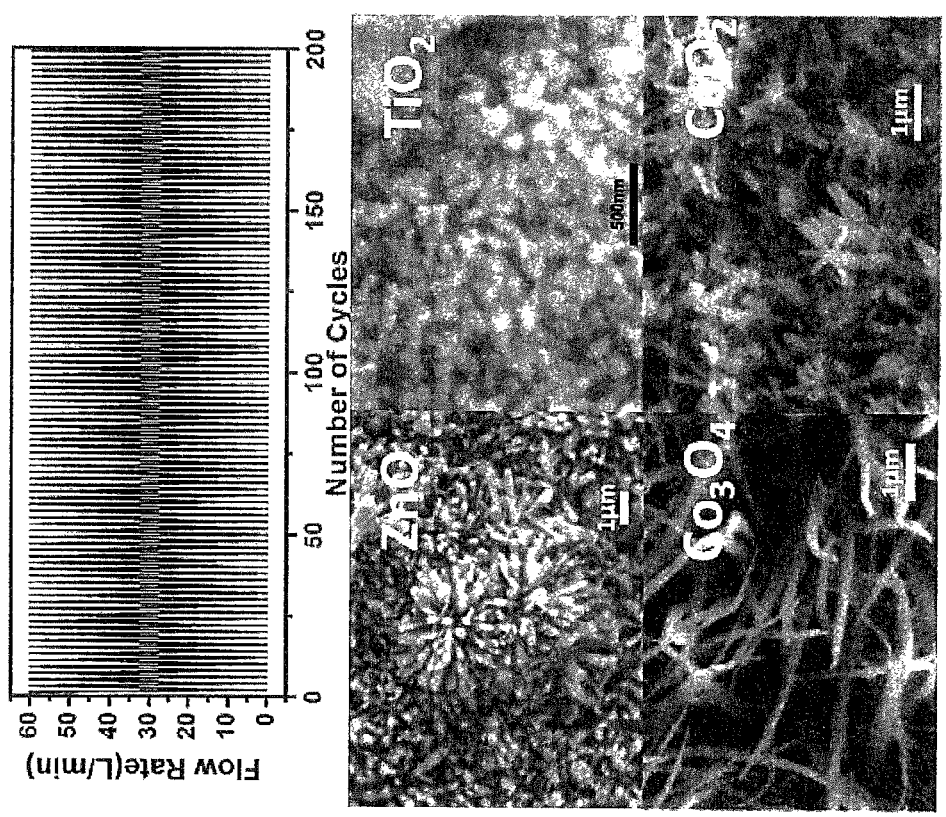
FIG. 32 shows pulsatile flow flushing flow-rate vs. cycles (top panel) and corresponding SEM images after testing (bottom panel): ZnO nanowires array; $TiO_2$ nanorod array after TPR test; $Co_3O_4$ porous nanowire array after TPR test; and $CeO_2$ nanotubes array after TPR test.

A pulsatile flow flushing set up was also introduced for testing the mechanical stability of the as-prepared nanostructure array monolith catalysts. During the test, air flow was switched between 0 and 60 L/min and controlled by a manual switch. 200 cycles were performed in each test. SEM was used to analyze the morphology change in a large scale after experiments. As shown in FIG. 32, all the as-prepared nanostructures exhibited high stability and maintained the array structure and morphology after 200 cycles of highly pulsatile air flow.

On the other hand, directly grown single crystal $TiO_2$ and ZnO nano-array monolithic catalysts showed great stability and vibration resistance to mechanical vibrations (>1 hr) introduced by Sonicator (42 KHz, 135 W) in both distilled water and ethanol, while $Co_3O_4$ porous nanowire and $CeO_2$ nanotube arrays showed some damage due to the polycrystalline nature and non-uniformity of thickness throughout the length of individual nanowire or nanotube.

CO Oxidation

Figure 33:
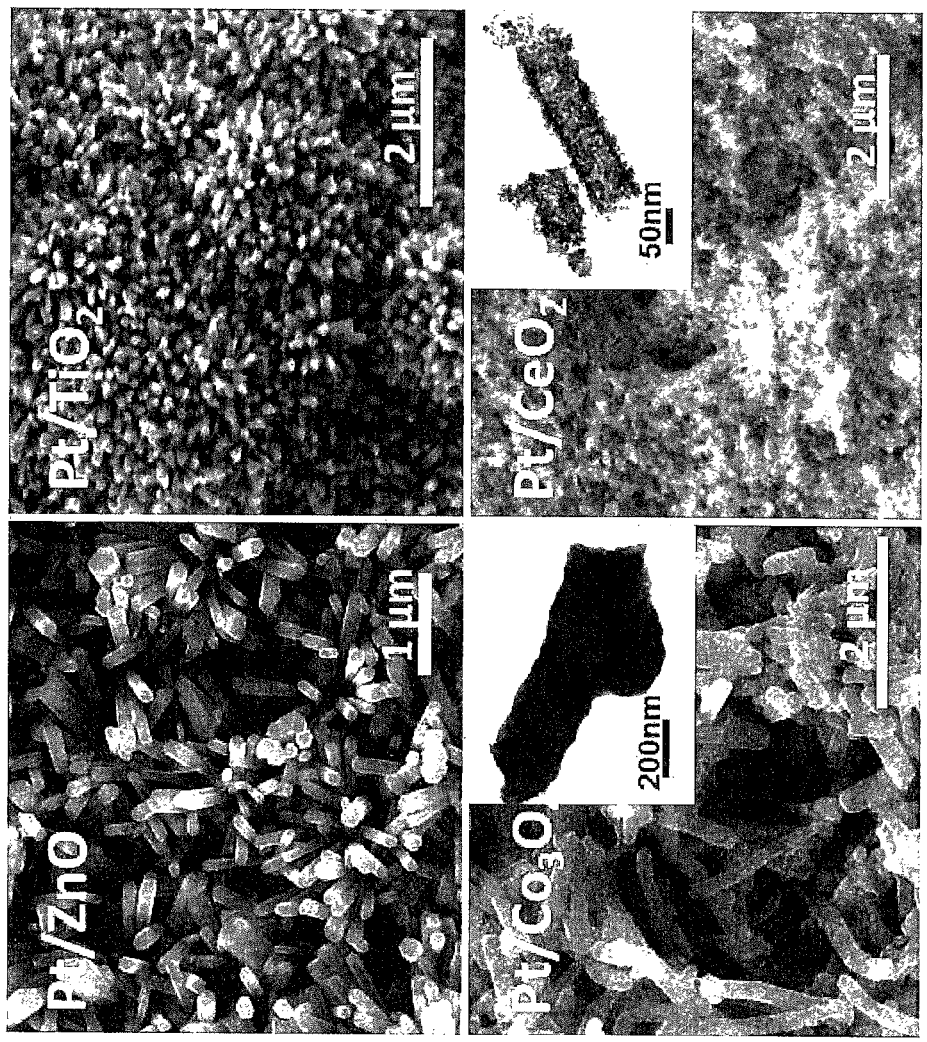
FIG. 33 shows SEM and TEM images of nanostructure array catalysts after CO oxidation light-off and catalytic stability test: Pt/ZnO nanorod array catalysts; Pt/$TiO_2$ nanorod array catalysts; Pt/$Co_3O_4$ porous nanowire array catalysts; inset: corresponding TEM image; and Pt/$CeO_2$ nanotubes array catalysts; inset: corresponding TEM image.

Morphology of Nano-Array Catalysts after CO Oxidation:

The structure of nanostructure array catalysts was characterized after CO oxidation light-off and stability tests. From the SEM images (FIG. 33), it can be seen that crystalline Pt/ZnO and $Pt/TiO_2$ nanorod array catalysts retained their array structure very well after 3 times repeat run of CO oxidation light-off test and 300° C. 24 hours CO oxidation stability test. However, serious array structural damage was observed on both $Pt/Co_3O_4$ porous nanowire array catalysts and $Pt/CeO_2$ nanotube array catalysts as shown in FIG. 33, respectively. As shown in inset TEM images, $Pt/Co_3O_4$ porous nanowire has turned into solid nanorod structure while the $Pt/CeO_2$ nanotube structure is still preserved. In summary, after the CO oxidation and stability test, the $Pt/CeO_2$ nanotube array monolithic catalyst lost its array structure as a whole but preserved the nanotube structure. Both the array structure and the porous nanowire structure were damaged for $Pt/Co_3O_4$ porous nanowire during the same process. However, the CO oxidation performance of $Pt/Co_3O_4$ porous nanowire did not decrease during the stability test, but the $Pt/CeO_2$ nanotube array decreased about 30%, which suggests that, in polycrystalline phase, $Pt/Co_3O_4$ is not as morphology sensitive as $Pt/CeO_2$ for the CO oxidation reaction. The results also hold the potential that the activity of as-prepared nanostructure array catalysts can be effectively improved by tuning the morphology and crystal structure.

Pt particle morphology and size distribution change on metal oxide nanostructure array before and after CO oxidation were also characterized by HRTEM. Interestingly, Pt nanoparticles preserve small size and good distribution on metal oxide nanostructure surface. It is widely accepted as particularly difficult to retain stable metal nanoparticles in the size range below 5 nm. It has also been reported that the TTAB-capped Pt on silicon wafer and Pt/MCF exhibited severe aggregation of Pt particles after CO oxidation at 300° C., which hampered the quantitative study of CO oxidation above the ignition temperature regime. See S. H. Joo, J. Y. Park, C.-K. Tsung, Y. Yamada, P. Yang, G. A. Somorjai, Nat. Mater. 2009, 8, 126. However, in this metal oxide supported Pt catalysts system (FIG. 34), Pt nanoparticles still maintained the particle size smaller than 5 nm after 24 h 300° C. CO oxidation stability tests, even though there was a slight size increase (from 2 nm to 3-4 nm for different catalyst systems). Moreover, the catalytic activity of metal oxide/Pt nanostructure array catalysts did not decrease (except $CeO_2$/Pt) after 24 h 300° C. on stream tests. The metal oxide-Pt interface may play an important role in the stability of as prepared nanostructure array catalysts.

Quantitative Analysis of Materials Usage and Catalytic Performance in Nano-Array Monolithic Catalysts.

Estimated Mass of Pt and Metal Oxide in Each Catalyst.

The mass of metal oxide nanostructure array on cordierite monolith substrate was estimated by a weighing method:

$$M(MO)=M_1-M_0$$

where $M_0$ is the mass of blank monolith before metal oxide nanostructure growth; $M_1$ is the mass of monolith substrate after metal oxide nanostructure growth. Mass of Pt was quantified by using statistical TEM EDS element ratio analysis results as reference:

$$M(Pt)=wt\% (Pt/MO) \times M(MO)$$

Wt % (Pt/MO) were obtained from statistical results of TEM EDXS analysis.

$Co_3O_4$ Porous Nanowires Array on Cordierite Monolith:

By measuring the mass difference before and after $Co_3O_4$ porous nanowires array loading, $Co_3O_4$ porous nanowires loaded on cordierite monolithic catalysts take 10% of the weight (statistical results) in the monolithic catalysts. The sample used for catalytic performance test was about 38.3 mg. Then the mass of $Co_3O_4$ porous nanowires array was about 3.83 mg.

Pt loading was controlled with $Pt:Co_3O_4$ weight ratio of 1% by controlling the total amount of Pt colloidal solution as 1 wt % of $Co_3O_4$ nano-array on monolith. Moreover, TEM EDXS results also confirmed the 1% weight ratio between Pt and $Co_3O_4$. As a result, Pt loaded on $Co_3O_4$ porous nanowires array should be no more than 0.0383 mg.

ZnO Nanorod Array on Cordierite Monolith:

The weight percentage of seed nanoparticles with respect to total mass of the dip-coated substrate was determined by the weighing method to be (1.57±0.06) %. To reduce the influence of substrate destroyed during the growing process, the weight loss was measured after etching of ZnO by using 50 mM HCl solution for 1 min. The weight percentage of deposited ZnO NR arrays with respect to total mass of the grown substrate was determined to be (3.8±0.2) %. Pt/ZnO nanorod array monolithic catalyst used in the test was 37.17 mg in mass. Then, the amount of ZnO nanorods on it was about 1.484 mg.

The same amount of Pt colloidal solution and loading procedure as $Pt/Co_3O_4$ loading were used for Pt/ZnO preparation. By TEM EDX analysis, the average weight ratio between Pt and ZnO was 2% (from statistical results), then the mass of Pt in ZnO nano-array monolithic catalysts was about 0.030 mg.

$CeO_2$ Nanotubes Array on Cordierite Monolith:

The mass of $CeO_2$ nanotubes loading on cordierite monolith was estimated according to the weight ratio of ZnO:$CeO_2$ in the composite nanostructure array from SEM EDXS analysis. The average weight ratio of ZnO:$CeO_2$ is about 3.53:1. The 1 μm ZnO nanorods loading amount is typically about 4% of the total monolith catalysts. Therefore, the loading of $CeO_2$ on cordierite monolith was about 1% of the whole monolith catalysts.

$Pt/CeO_2$ nanotubes array monolithic catalyst used in the test was 31.7 mg in mass. Then, the amount of $CeO_2$ nanotubes on it was about 0.317 mg.

The same amount of Pt and the same procedure was used for Pt/CeO$_2$ catalysts preparation as for Pt/ZnO. TEM EDX analysis results show that the average weight ratio between Pt and CeO$_2$ was 10% (from statistical results), so the mass of Pt in the monolithic catalysts was about 0.0317 mg.

TiO$_2$ Nanorod Array on Cordierite Monolith:

The mass of TiO$_2$ nanorods loading on cordierite monolith was estimated according to the law of mass conservation. Assuming that all Ti precursor 100% converted to TiO$_2$, the total mass of TiO$_2$ should be 250 mg. Actually, not all of the TiO$_2$ was loaded on the monolith substrate. There were TiO$_2$ precipitates on the bottom of the reactor, which were collected, dried and weighed. The result was about 203.5 mg in mass. There were 46.5 mg TiO$_2$ on 3.06 g cordierite monolith. Then, there were 0.4463 mg TiO$_2$ nanorod array loaded on 29.4 mg monolithic catalysts (about 6% of the total monolithic catalysts mass), which were used for the CO oxidation tests.

The same amount of Pt and the same procedure as applied to the above three catalysts were used for Pt/TiO$_2$ nano-array catalysts synthesis. As the statistical results of weight ratio between Pt and TiO$_2$ were 8% (from statistical results from TEM analysis), the mass of Pt in the monolithic catalysts was about 0.0357 mg.

Compared to Pt/ZnO and Pt/TiO$_2$ nanorod array catalysts, Pt/CeO$_2$ nanotube array and Pt/Co$_3$O$_4$ porous nanowire array exhibit higher CO oxidation performance, which is due to the promotion effect of Co$_3$O$_4$ and CeO$_2$ to Pt nanoparticles. In both Pt-loaded Co$_3$O$_4$ and CeO$_2$ catalytic systems, CO molecules mainly adsorb on the Pt sites, whereas O$_2$ could be more favorably adsorbed and activated on the cerium or cobalt sites, which may effectively improve the O$_2$ adsorption on supported catalysts and thus increase the catalytic activity. Besides, metal-metal oxide interactions may help enhance the catalytic activity as well. In Pt/ZnO and Pt/TiO$_2$ nanorod array monolithic catalysts, similar CO catalytic oxidation performance was achieved, which follows a Langmuir-Hinshelwood mechanism that both CO and O$_2$ adsorb on the Pt surface itself.

Statistical Data of Catalytic Performance and Materials Usage/Loading of Nano-Array Catalysts and Powder-Form Catalysts.

TABLE 7

Catalytic performance data of different metal oxide nano-array monolithic catalysts.

| Catalysts | Light-Off Temperature ($T_{10}$) (° C.) | 50% Conversion Temperature ($T_{50}$) (° C.) | 100% Conversion Temperature ($T_{100}$) (° C.) | Mass of Loading Pt/MO (mg/mg)* | K (Catalysts Activity) at 230° C. (mol/g$_{pt}$ · s) |
|---|---|---|---|---|---|
| 1 μm Pt/ZnO | 234 | 260 | 267 | 0.011/1.148 | 0.18 |
| 5 μm Pt/ZnO | 220 | 234 | 236 | 0.011/ | 0.78 |
| Pt/CeO$_2$ | 165 | 193 | 201 | 0.054/0.317 | 0.41 |
| Pt/Co$_3$O$_4$ | 168 | 195 | 205 | 0.038/3.83 | 0.58 |
| Pt/TiO$_2$ | 245 | 258 | 269 | 0.094/1.148 | 1.4 × 10$^{-2}$ |

*Loading mass of Pt were determined by using statistical TEM EDXS element ratio between Pt and Metal oxide During the isothermal CO oxidation test, the amount of Pt/CeO$_2$ activity site decreased along with the decrease of surface area caused by sintering effect, in which process CeO$_2$ nanotubes aggregated to each other leading to the loss of the original aligned array structure. SEM characterization on the Pt/CeO$_2$ nanotube array catalysts sample after CO oxidation and catalytic stability test showed that serious damage of nanotube array structure had happened to the catalysts and left a Pt/CeO$_2$ film on the surface of the cordierite monolith channel. Even though the CeO$_2$ nanotube was not seriously destroyed during the CO reaction, the Pt particle size increased slightly, which may lead to the decrease of catalytic activity.

TABLE 8

Catalytic performance data of various ZnO nano-array (nanorod (NR) nanoplate (NP)), and washcoated ZnO nanopowder monolithic catalysts

| Catalyst | $T_{10}$ (° C.) | $T_{50}$ (° C.) | $T_{100}$ (° C.) | Pt loading Ratio (g/L)* | K (catalysts activity, 230° C., mol/g$_{pt}$ · S) |
|---|---|---|---|---|---|
| 1 μm Pt/ZnO NR | 230 | 260 | 267 | 0.49 | 1.1 × 10$^{-3}$ |
| 5 μm Pt/ZnO NR | 220 | 234 | 236 | 0.51 | 4.1 × 10$^{-3}$ |
| Pt/ZnO NP | 195 | 235 | 242 | 0.28 | 5.8 × 10$^{-3}$ |
| Pt/ZnO Washcoated Powder | 260 | 280 | 290 | 0.37 | 5.6 × 10$^{-4}$ |

Washcoated ZnO powder monolithic catalysts were prepared by dip-coating ZnO powder directly purchased from Thermo-Fisher Company. The loading on ZnO washcoated powder were monitored to around 5 μm in thickness by SEM observation. Pt loading was conducted exactly the same parameter and process as Pt/ZnO nano-array catalysts.

The relevant teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A metal oxide nanorod array structure comprising:
   a honeycomb monolithic substrate having a surface and multiple channels;
   an interface layer bonded to the surface of the substrate; and a metal oxide nanorod array coupled to the substrate surface via the interface layer, wherein the metal oxide nanorod is formed of $TiO_2$, $CeO_2$, ZnO, $SnO_2$, $Al_2O_3$, $ZrO_2$, $Co_3O_4$, or $Ga_2O_3$.

2. The nanorod array structure of claim 1, wherein the metal oxide nanorod array is vertically aligned relative to the surface of the substrate.

3. The nanorod array structure of claim 2, wherein the metal oxide nanorod is formed of titania ($TiO_2$).

4. The nanorod array structure of claim 3, wherein the titania is brookite titania.

5. The nanorod array structure of claim 1, wherein the substrate is formed of plastic, silicon, ceramic or stainless steel.

6. The nanorod array structure of claim 4, wherein the substrate is formed of ceramic.

7. The nanorod array structure of claim 6, wherein the ceramic includes one of the following: cordierite, alumina, tin oxide, and titania.

8. The nanorod array structure of claim 1, wherein the metal oxide nanorod includes one of the following: ceria ($CeO_2$), zinc oxide (ZnO), tin oxide (SnO2), alumina ($Al_2O_3$), zirconia ($ZrO_2$), cobalt oxide ($Co_3O_4$), and gallium oxide ($Ga_2O_3$).

9. The nanorod array structure of claim 1, further including a perovskite $ABO_3$ (A=La, Ba, Sr, and/or Pb, B=Co, Cr, Fe, Mn, or Ni) shell over each metal oxide nanorod.

10. The nanorod array structure of claim 9, wherein the perovskite is a lanthanum-based transition metal oxide, $LaMO_3$ (M=Co, Cr, Fe, Mn, and Ni).

11. The nanorod array structure of claim 10, wherein the lanthanum-based transition metal oxide is lanthanum strontium cobaltate.

12. The nanorod array structure of claim 10, wherein the lanthanum-based transition metal oxide is lanthanum strontium manganate.

13. The nanorod array structure of claim 1, further including a metal oxide shell over each metal oxide nanorod.

14. The nanorod array structure of claim 13, wherein the shell includes one of the following metal oxides: ceria ($CeO_2$), zinc oxide (ZnO), tin oxide ($SnO_2$), alumina ($Al_2O_3$), zirconia ($ZrO_2$), cobalt oxide ($CO_3O_4$), and gallium oxide ($Ga_2O_3$).

15. The nanorod array structure of claim 1, further including an alkaline oxide shell over each metal oxide nanorod.

16. The nanorod array structure of claim 15, wherein the alkaline oxide shell includes at least one of the following oxides: barium oxide and potassium oxide.

17. The nanorod array structure of claim 1, further including a coating of metal particles over each metal oxide nanorod, the metal including at least one of the following: platinum, gold, palladium, rhodium, and ruthenium.

18. The nanorod array structure of claim 9, further including a coating of metal particles over each metal oxide nanorod, the metal including at least one of the following: platinum, gold, palladium, rhodium, and ruthenium.

* * * * *

UNITED STATES PATENT AND TRADEMARK OFFICE
CERTIFICATE OF CORRECTION

PATENT NO. : 9,855,549 B2
APPLICATION NO. : 14/347850
DATED : January 2, 2018
INVENTOR(S) : Pu-Xian Gao, Yanbing Guo and Zheng Ren It is certified that error appears in the above-identified patent and that said Letters Patent is hereby corrected as shown below:

In Column 40, Claim 14, Line 13, please delete "$CO_3O_4$" and insert -- $Co_3O_4$ --

Signed and Sealed this
Twenty-ninth Day of May, 2018

Andrei Iancu
*Director of the United States Patent and Trademark Office*